(12) United States Patent
Ho et al.

(10) Patent No.: US 9,216,390 B2
(45) Date of Patent: Dec. 22, 2015

(54) SYSTEMS, COMPOSITIONS, AND METHODS FOR FLUID PURIFICATION

(75) Inventors: W. S. Winston Ho, Columbus, OH (US); Hendrik Verweij, Upper Arlington, OH (US); Krenar Shqau, Columbus, OH (US); Kartik Ramasubramanian, Columbus, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 1057 days.

(21) Appl. No.: 13/184,433

(22) Filed: Jul. 15, 2011

(65) Prior Publication Data
US 2012/0031833 A1 Feb. 9, 2012

Related U.S. Application Data

(60) Provisional application No. 61/364,623, filed on Jul. 15, 2010.

(51) Int. Cl.
*B01D 39/00* (2006.01)
*B01D 39/14* (2006.01)
(Continued)

(52) U.S. Cl.
CPC .............. *B01D 69/10* (2013.01); *B01D 67/009* (2013.01); *B01D 67/0051* (2013.01);
(Continued)

(58) Field of Classification Search
CPC ........... B01D 2323/30; B01D 67/0006; B01D 69/12; B01D 69/10; B01D 71/024; B01D 15/10; B01D 2257/504; B01D 71/26; B01D 71/56; B01D 71/66; B01D 7/17; B29C 65/00; B29C 65/4845; B29C 65/521; B29C 66/71; B29C 33/3878; B29C 33/405; B29C 35/02

USPC .................. 210/490, 500.27, 500.25, 500.26, 210/500.42, 500.36, 640; 96/4, 10, 11; 95/45, 52, 51
See application file for complete search history.

(56) References Cited

U.S. PATENT DOCUMENTS 4,230,463 A * 10/1980 Henis et al. ........................ 95/47
4,690,999 A    9/1987 Numata et al.
(Continued)

OTHER PUBLICATIONS

Ho et al., "Reducing the Cost of CO2 Capture from Flue Gases Using Membrane Technology," Ind. Eng. Chem. Res., (2008), vol. 47, No. 5, pp. 1562-1568.
(Continued)

*Primary Examiner* — Ana Fortuna
(74) *Attorney, Agent, or Firm* — Meunier Carlin & Curfman LLC

(57) ABSTRACT

Disclosed herein are membranes comprising a substrate, a support layer, and a selective layer. In some embodiments the membrane may further comprise a permeable layer. Methods of forming membranes are also disclosed comprising forming a support layer on a substrate, removing adsorbed species from the support layer, preparing a solution containing inorganic materials of a selective layer, contacting the support layer with the solution, drying the membrane, and exposing the membrane to rapid thermal processing. Also disclosed are methods of fluid purification comprising providing a membrane having a feed side and a permeable side, passing a fluid mixture across the feed side of the membrane, providing a driving force for transmembrane permeation, removing from the permeate side a permeate stream enriched in a purified fluid, and withdrawing from the feed side a fluid that is depleted in a purified fluid.

17 Claims, 21 Drawing Sheets

(51) Int. Cl.
   *B01D 29/46*   (2006.01)
   *B01D 69/10*   (2006.01)
   *B01D 67/00*   (2006.01)
   *B01D 69/02*   (2006.01)
   *B01D 69/12*   (2006.01)
   *B01D 69/14*   (2006.01)
   *B01D 71/70*   (2006.01)
   *B01D 71/02*   (2006.01)
   *B01D 71/44*   (2006.01)
   *B01D 71/68*   (2006.01)

(52) U.S. Cl.
   CPC ....... *B01D 67/0069* (2013.01); *B01D 67/0072* (2013.01); *B01D 67/0079* (2013.01); *B01D 69/02* (2013.01); *B01D 69/105* (2013.01); *B01D 69/12* (2013.01); *B01D 69/148* (2013.01); *B01D 71/024* (2013.01); *B01D 71/028* (2013.01); *B01D 71/70* (2013.01); *B01D 71/022* (2013.01); *B01D 71/025* (2013.01); *B01D 71/44* (2013.01); *B01D 71/68* (2013.01); *B01D 2323/30* (2013.01)

(56) References Cited

U.S. PATENT DOCUMENTS

| | | | |
|---|---|---|---|
| 5,262,056 | A | 11/1993 | Koros et al. |
| 5,500,167 | A * | 3/1996 | Degen ............................ 264/41 |
| 5,603,983 | A * | 2/1997 | Clough et al. ............. 427/126.3 |
| 5,652,020 | A | 7/1997 | Collins et al. |
| 5,679,133 | A | 10/1997 | Moll et al. |
| 5,931,987 | A | 8/1999 | Buxbaum |
| 5,972,080 | A | 10/1999 | Nagata |
| 6,547,859 | B1 | 4/2003 | Mullhaupt et al. |
| 6,602,415 | B2 | 8/2003 | Koros et al. |
| 6,605,140 | B2 | 8/2003 | Guiver et al. |
| 7,547,393 | B2 | 6/2009 | Ramaswamy et al. |
| 7,549,393 | B2 * | 6/2009 | Kleinsasser ................... 119/52.4 |
| 7,718,153 | B2 | 5/2010 | Sobolevskiy et al. |
| 2004/0050250 | A1 * | 3/2004 | Pinnau et al. ...................... 95/45 |
| 2004/0244590 | A1 * | 12/2004 | Ma et al. ........................... 96/11 |
| 2005/0087491 | A1 * | 4/2005 | Hennige et al. ............... 210/640 |
| 2005/0214613 | A1 | 9/2005 | Sarkar et al. |
| 2007/0116995 | A1 | 5/2007 | Wilson |
| 2007/0125702 | A1 * | 6/2007 | Ramaswamy et al. ........ 210/490 |
| 2007/0245897 | A1 | 10/2007 | Besecker et al. |
| 2007/0272617 | A1 * | 11/2007 | Denney .......................... 210/744 |
| 2007/0284303 | A1 | 12/2007 | Drew et al. |
| 2008/0000350 | A1 | 1/2008 | Mundschau et al. |
| 2008/0168900 | A1 | 7/2008 | Ho |
| 2008/0173179 | A1 | 7/2008 | Tandon et al. |
| 2008/0210088 | A1 | 9/2008 | Pledger |
| 2008/0296225 | A1 | 12/2008 | Ho |
| 2009/0023050 | A1 | 1/2009 | Finnerty et al. |
| 2009/0123364 | A1 | 5/2009 | Forsyth et al. |
| 2009/0130477 | A1 | 5/2009 | Hou et al. |
| 2009/0131242 | A1 | 5/2009 | Liu et al. |
| 2009/0286904 | A1 | 11/2009 | Lee et al. |
| 2010/0071557 | A1 | 3/2010 | Seiler et al. |
| 2010/0092353 | A1 | 4/2010 | Noda |
| 2010/0121295 | A1 | 5/2010 | Collias et al. |
| 2012/0031833 | A1 * | 2/2012 | Ho et al. ........................ 210/488 |

OTHER PUBLICATIONS

Huang et al., "Carbon dioxide capture using a CO2-selective facilitated transport membrane," Ind. Eng. Chem. Res., (2008), vol. 47, No. 4, pp. 1261-1267.
Jha et al., "Characterization of silicone rubber membrane materials at low temperature and low pressure conditions," J. Membr. Sci., (2006), vol. 272, pp. 125-136.
Keiski et al., "Stationary and Transient Kinetics of High Temperature Water Gas Shift Reaction," Appl. Catal. A: General, (1996), vol. 137, pp. 349-370.
Kuzniatsova et al., "Micro-structural Optimization of Supported γ-Alumina Membranes," J. Membrane Sci., (2008), vol. 316, No. 1, pp. 80-88.
Lee et al., "Synthesis of Pd particle-deposited microporous silica membranes via a vacuum-impregnation method and their gas permeation behavior," J. Colloid and Interface Sci., (2008), vol. 325, pp. 447-452.
Li et al., "Synthesis and Properties of PMR Matrix Resins of Poly(pyrrolone-benzimidazole)s," High Performance Polymers, (2004), vol. 16, pp. 55-68.
Liu et al., "Synthesis and Characterization of New Polybenzimidazopyrrolones Derived from Pyridine-Bridged Aromatic Tetraamines and Dianhydrides," J. Polym. Sci. Part A: Polym. Chem., (2004), vol. 42, pp. 1845-1856.
Luiten et al., "Robust method for micro-porous silica membrane fabrication," J. Membr. Sci., (2010), vol. 348, pp. 1-5.
Matsuda et al., "Improvement of ethanol selectivity of silicalite membrane in pervaporation by silicone rubber coating," J. Membr. Sci., (2002), vol. 210, pp. 433-437.
Matsumiya at al., "Evaluation of Energy Consumption for Separation of CO2 in Flue Gas by Hollow Fiber Facilitated Transport Membrane Module with Permeation of Amine Solution," Separation and Purification Technology, (2005), vol. 46, pp. 26-32.
McCool et al., "Synthesis and characterization of silica membranes prepared by pyridine-catalyzed atomic layer deposition," Ind. Eng. Chem. Res., (2004), vol. 43, No. 10, pp. 2478-2484.
Merkel et al., "Gas sorption, diffusion, and permeation in poly(dimethylsiloxane)," J. Polym. Sci., Part B: Polym. Phys., (2000), vol. 38, pp. 415-434.
Merkel et al., "Power Plant Post-Combustion Carbon Dioxide Capture: An Opportunity for Membranes," J. Membr. Sci., (2010), vol. 359, pp. 126-139.
Mottern et al., "Processing and Properties of Homogeneous Supported γ-Alumina Membranes," in: Akin and Lin (Eds.), Proc. 8th Int. Conf. Inorganic Membranes, Jul. 18-22, 2004, Cincinnati, OH, USA, Adams Press, Chicago, pp. 26-29.
Mottern et al., "Textured Indium Tin Oxide Thin Films by Chemical Solution Deposition and Rapid Thermal Processing," Thin Solid Films, (2007), vol. 515, Nos. 7-8, pp. 3918-3926.
Mottern et al., "Permeation Porometry: Effect of Probe Diffusion in the Condensate," J. Membr. Sci., (2008), vol. 313, No. 1, pp. 2-8.
Nijmeijer et al., "Preparation and properties of hydrothermally stable γ-alumina membranes," J. Am. Ceram. Soc., (2001), vol. 84, No. 1, pp. 136-140.
Nomura et al., "Silicalite membranes modified by counterdiffusion CVD technique," Ind. Eng. Chem. Res., (1997), vol. 36, No. 10, pp. 4217-4223.
Petersen et al., "Capillary carbon molecular sieve membranes derived from Kapton for high temperature gas separation," J. Membr. Sci., (1997), vol. 131, pp. 85-94.
Robeson, L. M. "The Upper Bound Revisited," J. Membr. Sci., (2008), vol. 320, pp. 390-400.
Rochelle, G. T. "Amine Scrubbing for CO2 Capture," Science, (Sep. 25, 2009), vol. 325, pp. 1652-1654.
Schillo et al., "Rapid thermal processing of inorganic membranes," J. Membr. Sci., (2010), vol. 362, pp. 127-133.
Shekhawat et al., "A Review of Carbon Dioxide Selective Membranes: A Topical Report," National Energy Technology Laboratory, U.S. Dept. of Energy, (Dec. 1, 2003), DOE/NETL-2003/1200, (93 pages).
Shelley, S. "Capturing CO2: Membrane Systems Move Forward," Chem. Eng. Prog., (Apr. 2009), vol. 105, No. 4, pp. 42-47.
Shqau et al., "Preparation of defect-free porous alumina membrane supports by colloidal filtration," Proceedings of PCM 2005: International Conference on Porous Ceramic Materials, Brugge, Belgium, Oct. 20-21, 2005, (6 pages).
Shqau et al., "Preparation and properties of porous alpha-Al2O3 membrane supports," J. Am. Ceram. Soc., (2006), vol. 89, No. 6, pp. 1790-1794.
Utracki, L. A. (ed.), Polymer Blends Handbook, vol. 1, (2002), Kluwer Academic Publishers, Boston, MA, pp. 80-81.
Verweij, H. "Ceramic membranes: Morphology and transport," J. Mater. Sci., (2003), vol. 38, No. 23, pp. 4677-4695.

(56) References Cited

OTHER PUBLICATIONS

Verweij et al., "Micro-porous silica and zeolite membranes for hydrogen purification," MRS Bulletin, (Oct. 2006), vol. 31, No. 10, pp. 756-764.

Westre et al., "Surface diffusion of tetramethylsilane and neopentane on Ru(001)," Surface Science, (1990), vol. 233, pp. 293-307.

White et al., "Synthesis of Ultrathin Zeolite Y Membranes and their Application for Separation of Carbon Dioxide and Nitrogen Gases," Langmuir, (2010), vol. 26, No. 12, pp. 10287-10293.

Xomeritakis et al, "Tubular ceramic-supported sol-gel silica-based membranes for flue gas carbon dioxide capture and sequestration," J. Membr. Sci., (2009), vol. 341, pp. 30-36.

Zhang et al., "Selective defect-patching of zeolite membranes using chemical liquid deposition at organic/aqueous interfaces," Adv. Funct. Mater., (2008), vol. 18, pp. 3434-3443.

Zhang et al., "Supported Inorganic Membranes: Promises and Challenges," JOM, (Apr. 2009), vol. 61, No. 4, pp. 61-71.

Zhang et al., "Blocking defects in SAPO 34 membranes with cyclodextrin," J. Membr. Sci., (2010), vol. 358, pp. 7-12.

Benes et al., "CO2 Sorption of a Thin Silica Layer Determined by Spectroscopic Ellipsometry," AIChE J., (2001), vol. 47, No. 5, pp. 1212-1218.

Benes et al., "Multi-component lattice gas diffusion," Chem. Eng. Sci., (2002), vol. 57, No. 14, pp. 2673-2678.

Bhide et al., "Permeability of silicone polymers to hydrogen," J. Appl. Polym. Sci., (1991), vol. 42, No. 9, pp. 2397-2403.

Boffa et al., "Microporous niobia-silica membranes: Influence of sol composition and structure on gas transport properties," Microporous and Mesoporous Materials, (2009), vol. 118, pp. 202-209.

Bounaceur et al., "Membrane Processes for Post-Combustion Carbon Dioxide Capture: A Parametric Study," Energy, (2006), vol. 31, pp. 2556-2570.

Cassidy et al., "Atomic layer deposition as a tool to modify mesoporous silica membranes," ECS Transactions, (2008), vol. 16, No. 4, pp. 151-157.

Chiu et al., "Post Synthesis Defect Abatement of Inorganic Membranes for Gas Separation," J. Membrane Sci., (2011), vol. 377, No. 1-2, pp. 182-190.

Choi et al., "Grain boundary defect elimination in a zeolite membrane by rapid thermal processing," Science, (Jul. 31, 2009), vol. 325, pp. 590-593.

Ciferno et al., "Existing Plants, Emissions and Capture—Setting CO2 Program Goals," U.S. Dept. of Energy, National Energy Technology Laboratory, (Apr. 20, 2009), DOE/NETL-2009/1366 (41 pages).

De Lange et al., "Formation and characterization of supported microporous ceramic membranes prepared by sol-gel modification techniques," J. Membr. Sci., (1995), vol. 99, pp. 57-75.

Doong et al., "Sorption of Organic Vapors in Polyethylene," Ind. Eng. Chem. Res., (1991), vol. 30, pp. 1351-1361.

Doong et al., "Diffusion of Hydrocarbons in Polyethylene," Ind. Eng. Chem. Res., (1992), vol. 31, pp. 1050-1060.

Doong et al., "Prediction of Flux and Selectivity in Pervaporation through a Membrane," J. Membr. Sci., (1995), vol. 107, pp. 129-146.

Driscoll et al., "NETL Test Protocol—Testing of Hydrogen Separation Membranes," U.S. Dept. of Energy, National Energy Technology Laboratory, (Oct. 2008), DOE/NETL-200811335 (26 pages).

Favre, E. "Carbon Dioxide Recovery from Post-combustion Processes: Can Gas permeation Membranes Compete with Absorption?" J. Membr. Sci., (2007), vol. 294, pp. 50-59.

Feng et al., "A study of silicone rubberlpolysulfone composite membranes: correlating H2/N2 and O2/N2 permselectivities," Separation and Purification Technology, (2002), vol. 27, pp. 211-223.

Hao et al., "Upgrading Low-quality Natural Gas with H2S- and CO2-Selective Polymer Membranes, Part II. Process Design, Economics, and Sensitivity Study of Membrane Stages with Recycle Streams," J. Membr. Sci., (2008), vol. 320, pp. 108-122.

Hatlevik et al., "Palladium and palladium alloy membranes for hydrogen separation and production: history, fabrication strategies, and current performance," Sepatation and Purification Technology, (2010), vol. 73, No. 1, pp. 59-64.

Henis et al., "A novel approach to gas separations using composite hollow fiber membranes," Separation Science and Technology, (1980), vol. 15, No. 4, pp. 1059-1068.

Ho et al., "Membrane Handbook," Van Nostrand Reinhold, New York, NY, (1992), pp. 3-15; 19-24; 54-94.

\* cited by examiner

SYSTEMS, COMPOSITIONS, AND METHODS FOR FLUID PURIFICATION

CROSS REFERENCE TO RELATED APPLICATION

This application claims the benefit of U.S. Provisional Patent Application No. 61/364,623, filed Jul. 15, 2010, the entire content of which is incorporated herein by reference.

STATEMENT REGARDING FEDERALLY SPONSORED RESEARCH

This invention was made with government support under grant DGE0221678, awarded by the National Science Foundation, grants 22000109, DE-FG02-06ER15776, and 10020047, awarded by the U.S. Department of Energy, and grant LDRD 2007, awarded by PNNL/Battelle. The U.S. government has certain rights in the invention.

BACKGROUND

The present disclosure relates generally to membrane structures. More particularly, the disclosure relates to membrane structures having high flux and high selectivity. The disclosure also relates to methods of manufacturing membrane structures.

Porous membrane structures are extensively used in filtration, separation, catalysis, detection, and sensor applications. Membrane structures with extremely fine pore sizes may be required for filtration and separation applications. The selectivity of a membrane is typically determined by the membrane pore size. Highly selective membranes typically have small pores. However for a given thickness, the smaller the pore size, the smaller the membrane flux. Therefore, membrane layers with fine pores must be made thin to ensure sufficient permeate flux. Typically thin membranes with small pores are stacked on thicker substrates with coarser pores, which provide mechanical support but do not significantly increase the resistance to flow. In such membrane structures it is extremely difficult to get a defect-free interface between layers to ensure sufficient connectivity through the membrane structure. In spite of much effort, there is still a demand for membrane structures with fine pores exhibiting high permeance and high selectivity, along with methods to produce such membrane structures, especially on an industrial scale.

Inorganic membranes have been employed for a variety of gas separation applications, including hydrogen purification and $CO_2$ sequestration. Inorganic membranes possess good thermal stability, chemical resistance, and a high compressive strength, all of which are favorable for use in harsh operating conditions. In addition, dense and microporous membranes (pore size, $\varnothing_p$<2 nm) may have very high or even close to perfect gas selectivities. Inorganic membranes are usually prepared as a top layer on multilayer structures to provide the membrane with sufficient strength while keeping the separative top layer as thin as possible to reduce flow resistance. The selective membrane layers are generally prepared to a thickness of 1 to 10 µm, but may be less than 50 nanometers thick.

A major limiting factor to the application of supported inorganic membranes, however, is the frequent occurrence of defects which limits reproducibility, stability, and the separation performance of the membranes. Many thin microporous and dense gas separation membranes studied in the past have likely been affected by defects, leading to a large variation in the reported membrane performance, underestimation of selectivity, and overestimation of permeance. While microporous gas separation membranes have $\varnothing_p$~0.5 nm, defects in the membranes may have a size from ~4 nm to 1 µm. Such meso- (2-50 nm) and macro-defects (>50 nm) have a deleterious effect on the gas separation performance due to significant contributions of Knudsen flow, viscous flow, or both to the overall flow. These mechanisms result in a low selectivity or no selectivity at all. Permeance as a result of defects is much higher than that of a defect-free membrane area, and may dominate overall membrane permeance, artificially increasing permeance measurements. Since gas transport in membrane supports is generally in the Knudsen regime, the overall selectivity of a supported membrane with defects easily approaches Knudsen values. Leaks through defects may also reduce the driving force for microporous transport by a spreading of the feed composition in a resistive support over a large area just below the membrane. Support spreading effects lead to a reduction in the chemical potential gradient over an area much larger than the actual defect area.

Two approaches to producing inorganic membranes are gas phase synthesis and colloidal deposition. A common gas phase synthesis technique, chemical vapor deposition (CVD), makes use of gas phase precursors which undergo oxidation or thermal decomposition in a heated reaction chamber to deposit membrane layers. Colloidal synthesis usually starts with the preparation of a stabilized dispersion or colloid which is then coated onto membrane supports and heat-treated. CVD can be conducted in a self-repairing mode but produces relatively dense, low permeance membrane structures. In addition, CVD methods require significant investment in equipment, and are not easily incorporated in a viable, continuous fabrication process. Colloidal deposition may be conducted quickly under ambient conditions, compatible with continuous fabrication methods known to those of skill in the art. Thin, high permeance structures may be readily made via colloidal deposition methods known to those of skill in the art, however, colloidal methods are not self-repairing and often result in a substantial number of membrane defects.

Defects may arise as a result of imperfections in the deposition method, the deposition surface, or both. Membrane support surfaces which contain sufficiently large defects, may result in the formation of large, pinhole defects after deposition due to inadequate bridging or coverage of the latent structural defects. Defects of this type are more likely to occur for thin membrane layers.

In addition to the high susceptibility of gas phase and colloidal synthesis methods to support defects, both methods often also suffer from environmental contamination during membrane fabrication processes. Colloidal synthesis methods are also typically affected by defects from bubble generation during dispersion preparation, colloidal instability, and the removal of additives. In addition, the removal of templating agents in ceramic membranes, especially zeolites, during calcination may also lead to the formation of intercrystalline defects such as grain boundary defects and cracks.

Post-synthesis treatment of defective membranes has been used as a method to reduce the overall effect of defects on permeance, selectivity, and other associated properties. For example, palladium (Pd) nanoparticle impregnation of microporous silica membranes has been found to improve the $H_2/N_2$ selectivity at high temperatures. However, the observed selectivity increase was attributed mostly to the affinity of Pd to $H_2$. In related studies, the $He/N_2$ and $CO_2/N_2$ selectivities showed only minor improvements (10-20%). Atomic layer deposition (ALD) has been used post-synthesis on mesoporous silica membranes to remove large defects and to improve gas separation performance. Counter-diffusion chemical liquid deposition (CLD) for defect patching and CVD post-synthesis modification have both been used with limited success to reduce defects in zeolites membranes. More recently, rapid thermal processing (RTP) has been applied to zeolite membranes to reduce grain boundary defects from template agent burnout. Cyclodextrin was found to improve the $CO_2/CH_4$ selectivity when utilized to fill intercrystalline defects as compared to the selectivities achieved with untreated SAPO-34 membranes.

Another possible post-synthesis method for the reduction of membrane defects may be the coating of defective membranes with a permeable polymer. In such a method, the polymer coating must have a high permeance with respect to the selective membrane layer, but a much lower permeance than any of the meso/macro defects present in the pre-treated membrane. Such a method may lead to the reduction of defect flow contributions and support spreading effects without significantly adding to the overall flow resistance. Permeable polymer layers may be able to restore membrane performance to near intrinsic values, which may have numerous practical applications.

BRIEF SUMMARY

The present disclosure meets these and other needs by providing a membrane, which has, for example, high permeability, flux, selectivity, or a combination thereof.

Accordingly, one aspect of the disclosure is to provide a membrane. In one embodiment, the membrane includes a substrate, a support layer, and a selective layer. In some embodiments, the support layer may be formed, disposed, annealed, coated, or deposited on the substrate. In some embodiments, the support layer comprises a plurality of pores. In some embodiments, the membrane is continuous. Continuous may mean homogenous on a 1 nm scale.

In other embodiments, the selective layer may be formed, disposed, annealed, coated, or deposited on the substrate. In some embodiments, the selective layer may have a plurality of pores, wherein each of the pores is in fluid communication with at least one of the pores of the support layer.

In some embodiments the pores of the various layers may either be substantially connected or substantially unconnected. In some embodiments, the pores are unmodified.

In some embodiments, the substrate is fibrous. In some embodiments, the fibrous substrate may be a mesh, a woven or non-woven fibrous material, glass, fiberglass, a resin, a woven or non-woven fabric, a screen, or derivatives thereof known in the art. In one embodiment, the substrate is a polyester. In some embodiments the polyester is a polyester-based fabric.

In one embodiment, the support layer is a polymer. The support layer may comprise one or more layers. In some embodiments the membrane may comprise 1, 2, 3, 4, 5, 6, 7, 8, 9, 10, or more support layers. In some embodiments the at least one support layer is in communication with the substrate. In some embodiments additional support layers may be added to the first support layer that is in communication with the substrate. In some embodiments the first support layer may be coarse, porous, and thin. In some embodiments that support layers added to the first support layer may be finer, less porous, and thinner than the first support layer. It is to be understood that in some embodiments each additional support layer may be finer, less porous, and thinner than the previous support layer, wherein a bridge is formed between the coarse, porous layers of the support layer and the selective layer.

In some embodiments, the polymeric support layer may comprise an organic material or may be organic. In some embodiments, the support layer may comprise porous polymeric compositions. Examples of useful substrates include cross-linked polymers and copolymers, phase separated polymers, and porous condensation polymers such as polyamides, polyimides, polypyrrolones, polyesters, and polysulfones. In some embodiments, the organic polymer is selected from the group consisting of cross-linked polymers and copolymers, phase separated polymers and copolymers, porous condensed polymers, polyamides, polyimides, polypyrrolones, polyesters, sulfone-based polymers, polymeric organosilicones, fluorinated polymers, and polyolefinic species. In some embodiments, the polymer of the support layer is selected from the group consisting of cross-linked polymers and copolymers, phase separated polymers and copolymers, porous condensed polymers, polyamides, polyimides, polypyrrolones, polyesters, sulfone-based polymers, polymeric organosilicones, fluorinated polymers, and polyolefinic species.

In one embodiment, the selective layer comprises an inorganic material. In some embodiments, the inorganic material is selected from the group consisting of alumina, silica, titania, zirconia, metal oxides, transition-metal oxides, palladium, platinum, nickel, transition-metal catalysts, transition-metals adsorbed on non-reactive supports, zeolites, clays, metal alloys, composites of metal, composites of non-metals, and mixtures thereof.

In one embodiment, the membrane is further comprised of a permeable layer formed, disposed, annealed, coated, or deposited on the substrate. The permeable layer may also be considered an abatement layer throughout the specification. In some embodiments, the permeable layer comprises a plurality of pores, which may be interconnected, unconnected, or a combination thereof. In some embodiments, a portion or all of the pores of the permeable layer are in fluid contact with at least one of the pores of another layer of the membrane. The permeable layer may be in direct communication with the selective layer. In some embodiments, the permeable layer comprises an organic material. In some embodiments, the organic material of the permeable layer is an polymer.

In some embodiments, the polymer is operable to increase the selectivity of fluid separation by the membrane. In some embodiments, the organic polymer is selected from the group consisting of cross-linked polymers and copolymers, phase separated polymers and copolymers, porous condensed polymers, polyamides, polyimides, polypyrrolones, polyesters, sulfone-based polymers, polymeric organosilicones, fluorinated polymers, and polyolefinic species. In other embodiments, the polymeric organosilicone is selected from the group consisting of polydimethylsiloxane, polydiethylsiloxane, polydi-iso-propylsiloxane, polydiphenylsiloxane, and either partially fluorinated or perfluorinated derivatives thereof. In some embodiments, the membrane is selectively permeable for a fluid selected from the group consisting of hydrogen, helium, nitrogen, argon, carbon dioxide, carbon monoxide, oxygen, air, methane, hydrogen sulfide, sulfur dioxide, sulfur trioxide, nitrogen oxides, ammonia, fluorine, chlorine, bromine, hydrogen chloride, water, alcohols, gaseous hydrocarbons, non-gaseous hydrocarbons, gaseous olefins, non-gaseous olefins, and acetylene.

In one embodiment, a method of forming a membrane comprising: forming a support layer on a substrate; substantially removing water and other adsorbed species from the support layer; preparing a solution containing inorganic materials of a selective layer; contacting the support layer with the solution; drying the membrane to remove residual solvent; and exposing the membrane to rapid thermal processing. In some embodiments, the rapid thermal processing step may be replaced by deposition of seed particles (which may optionally be mixed with other particles), followed by epitaxial growth from a precursor medium. Examples are crystalline structures that can naturally grow as intrinsically micro-porous structures (e.g., zeolites). In some embodiments, the rapid thermal processing step may be replaced by deposition of seed particles (which may optionally be mixed with other particles), followed by densification with electroless deposition. Examples are pure metal membranes and multiple phase membranes that contain at least one metal phase. It should be understood that typical polymer supports degrade either thermally or chemically under conditions of conventional processing of inorganic membranes.

In some embodiments, rapid thermal processing refers to a manufacturing process in which a substrate or membrane is heated to elevated temperatures in several seconds or less and then slowly cooled back to ambient temperature to avoid cracking, breakage, or the development of imperfections as a result of thermal shock. In some embodiments, rapid thermal processing is conducted as the result of heating with a lamp or laser. In other embodiments, the lamp is an infrared lamp.

In some embodiments, the membrane forming includes a solution which contains at least one linking agent. In one embodiment, the previously described method includes preparing a solution containing at least one linking agent, and contacting the support layer with the solution to coat the support layer with the linking agent. In some embodiments, the selective layer has a pore size from about 0.1 to about 50 nm. In some embodiments, at least one step in the process may be or is performed as a continuous process. In other embodiments, at least one step may be or is performed as a batch process. In other embodiments, the previously described method affords a membrane which has high selectivity for a fluid which is selected from the group consisting of water, hydrogen, helium, nitrogen, argon, carbon dioxide, carbon monoxide, oxygen, air, methane, hydrogen sulfide, sulfur dioxide, sulfur trioxide, nitrogen oxides, ammonia, fluorine, chlorine, bromine, hydrogen chloride, gaseous hydrocarbons, non-gaseous hydrocarbons, gaseous olefins, non-gaseous olefins, and acetylene.

Disclosed herein is a method of fluid purification comprising: providing a membrane having a feed side and a permeable side, passing a fluid mixture comprising a mixture of fluids across the feed side of the membrane, providing a driving force for transmembrane permeation, removing from the permeate side a permeate stream enriched in a purified fluid as compared to the fluid mixture introduced to the feed side of the membrane, and withdrawing from the feed side a fluid that is depleted of the purified fluid. In some embodiments, the purified fluid is selected from the group consisting of water, hydrogen, helium, nitrogen, argon, carbon dioxide, carbon monoxide, oxygen, air, methane, hydrogen sulfide, sulfur dioxide, sulfur trioxide, nitrogen oxides, ammonia, fluorine, chlorine, bromine, hydrogen chloride, gaseous hydrocarbons, non-gaseous hydrocarbons, gaseous olefins, non-gaseous olefins, and acetylene. In other embodiments, the mixture of fluids is selected from the group consisting of refinery gas, petrochemical plant gas, natural gas, associated gases, atmospheric gases, biological gases, greenhouse gases, forming gases, and combustion gases.

BRIEF DESCRIPTION OF THE SEVERAL VIEWS OF THE DRAWINGS

The accompanying drawings, which are incorporated in and constitute a part of this specification, illustrate some embodiments disclosed herein, and together with the description, serve to explain principles of the disclosed embodiments.

DETAILED DESCRIPTION

Figure 1:
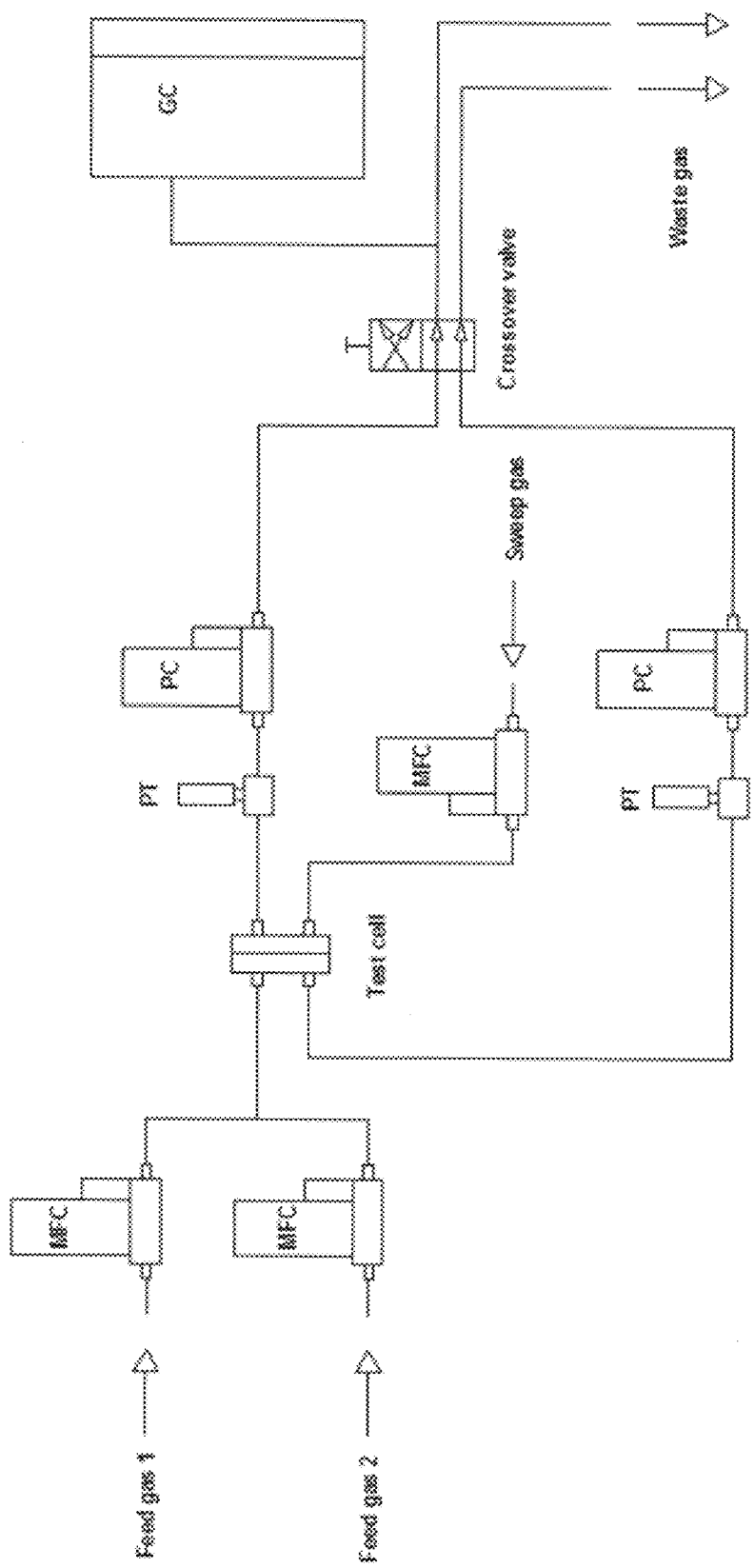
FIG. 1: Gas separation setup (MFC=mass flow controller, PC=pressure controller, PT=pressure transducer, GC=gas chromatograph).

The present embodiments will now be described by reference to some more detailed embodiments, with occasional reference to the accompanying drawings. These embodiments may, however, be embodied in different forms and should not be construed as limited to the embodiments set forth herein. Rather, these embodiments are provided so that this disclosure will be thorough and complete, and will fully convey the scope of the embodiments to those skilled in the art.

Unless otherwise defined, all technical and scientific terms used herein have the same meaning as commonly understood by one of ordinary skill in the art to which this disclosure belongs. The terminology used in the description of the embodiments herein is for describing particular embodiments only and is not intended to be limiting of the embodiments disclosed. As used in the description, the singular forms "a," "an," and "the" are intended to include the plural forms as well, unless the context clearly indicates otherwise. All publications, patent applications, patents, and other references mentioned herein are incorporated by reference in their entirety.

In the following description, like reference characters designate like or corresponding parts throughout the several views shown in the figures. It is also understood that terms such as "top," "bottom," "outward," "inward," "first," "second," and the like are words of convenience and are not to be construed as limiting terms. Furthermore, whenever a particular aspect of the embodiments is said to comprise or consist of at least one of a number of elements of a group and combinations thereof, it is understood that the aspect may comprise or consist of any of the elements of the group, either individually or in combination with any of the other elements of that group.

Unless otherwise indicated, all numbers expressing quantities of ingredients, reaction conditions, and so forth used in this disclosure are to be understood as being modified in all instances by the term "about." Accordingly, unless indicated to the contrary, the numerical parameters set forth in this disclosure are approximations that may vary depending upon the desired properties sought to be obtained by the present disclosure. At the very least, and not as an attempt to limit the application of the doctrine of equivalents to the scope of any claims, each numerical parameter should be construed in light of the number of significant digits and ordinary rounding approaches.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Every numerical range given throughout this specification will include every narrower numerical range that falls within such broader numerical range, as if such narrower numerical ranges were all expressly written herein.

For the purposes of understanding the embodiments, the term "substantially unconnected pores" is to be understood to be a porous layer in which pore connections are limited to, at most, a first-order branched structure. A "first-order branched structure" as the term is used herein comprises one or more main stem pores from which one or more branch pores radiate, where a branch pore has no junctions with any other pore aside from its junction with its main stem pore. Note that the term "substantially unconnected pores" includes, in addition to first-order branched structures, structures with completely isolated pores, as in a structure comprising parallel, substantially unconnected channels. Of course, one skilled in the art will recognize that an occasional defect is to be expected in fabricating such structures, and so a structure containing occasional defects (such as, for example, a small number of branch pores which join to other branch pores in violation of the above definition or a small amount of connectivity between otherwise parallel, substantially unconnected pore channels) will still be considered a structure with substantially unconnected pores if the number of defects is not sufficient to substantially alter the performance of the structure relative to what would be expected for a defect-free structure.

Schematic representation of a membrane structure according to one embodiment of the present disclosure is shown in FIG. 1. The membrane structure of FIG. 1 includes a support layer having a plurality of pores and a selective layer having a plurality of pores disposed on the support layer. Typically, each of the pores of the selective layer may be in fluid communication with at least one of the pores of the support layer. The distinct connection between the layers establishes a registry between layers of the membrane structure and ensures high flux.

In some conventional membrane structures, the porous layers are sandwiched together to form a membrane structure. In such structures, the establishment of fluid communication among pores of different layers is accomplished by probability, the chances that pores will align in the structure as one layer is coated onto or otherwise applied to the other layer. This dependence on probability to establish pore alignment results in a large number of misaligned pores that end up isolated from, or substantially occluded from, the rest of the structure. Any such defect or other irregularity at the interface may reduce the flux through the membrane structure. Therefore, achieving a more definite connectivity between the layers is significant to a membrane's performance for separator or filter applications. The membrane structures of the present disclosure have been designed to substantially mitigate such connectivity problems.

It should be appreciated by one of skill in the art that the instant disclosure teaches a general inventive concept and that numerous potential permutations of the membranes disclosed herein exist and are encompassed by the instant disclosure. Further, it is understood by one of skill in the art that the term "on the substrate" in respect to multilayer shall be defined as any spatial relationship including directly contacting the substrate; indirectly contacting the substrate; in proximity to the substrate; mixed deposition patterns, in which a portion of a layer is in contact with the substrate and another portion of the same layer is not in direct contact with the substrate due to an intervening layer, structure, or linking agent; or combinations thereof.

Various substrate configurations are suitable including flat disk, tube, spiral wound, and hollow fiber. The selection of substrate configuration will depend on the particular application and fabrication concerns. Pretreatment of the substrate may be necessary to remove water or other adsorbed species using methods appropriate to the substrate and the adsorbate. Examples of absorbed species are, for example, water, alcohols, porogens, and surfactant templates.

The total thickness of a membrane is chosen such that the structure is mechanically robust, but not so thick as to impair permeability. In one embodiment, the selective layer has a thickness of 50 to 500 nanometers. In another embodiment, the selective layer has a thickness of 0.5 to 50 micrometers. The selective layer may also have a thickness of 0.5-25, 0.5-10, 0.5-5, 0.5-1, 1-50, 1-25, 1-10, 1-5, 5-50, 5-25, 5-10, 10-50, 10-25, 25-50, 0.5, 1, 2, 3, 4, 5, 6, 7, 8, 9, 10, 15, 20, 25, 30, 35, 40, 45, or 50 nanometers. In another embodiment, the selective layer has a thickness of 10 to about 100 nanometers. The selective layer may also have a thickness of 1-500, 1-400, 1-300, 1-200, 1-100, 1-50, 1-25, 1-10, 1-5, 5-500, 5-400, 5-300, 5-200, 5-100, 5-50, 5-25, 5-10, 10-500, 10-400, 10-300, 10-200, 10-100, 10-50, 10-25, 25-500, 25-400, 25-300, 25-200, 25-100, 25-50, 50-500, 50-400, 50-300, 50-200, 50-100, 100-500, 100-400, 100-300, 100-200, 200-500, 200-400, 200-300, 300-500, 300-400, 400-500, 1, 2, 3, 4, 5, 6, 7, 8, 9, 10, 15, 20, 25, 50, 75, 100, 200, 300, 400, or 500 nanometers. In some embodiments the selective layer may have a thickness of 1-100, 1-75, 1-50, 1-25, 1-10, 1-5, 5-100, 5-75, 5-50, 5-25, 5-10, 10-100, 10-75, 10-50, 10-25, 25-100, 25-75, 25-50, 50-100, 50-75, 75-100, 1, 2, 3, 4, 5, 6, 7, 8, 9, 10, 15, 20, 25, 50, 75, or 100 nanometers.

In some embodiments, the median pore size of the permeable layer is chosen so that the pores in the permeable layer do not hinder the permeance of the fluid through the membrane structure. The thickness and pore dimensions of the permeable layer are chosen such that the flow resistance through the permeable layer is lower than or equal to the flow resistance through the selective layer. In some embodiments, the selective layer has a pore size from about 0.1 to about 50 nm. In some embodiments the selective layer has a pore size of 0.1-25, 0.1-15, 0.1-10, 0.1-5, 0.1-1, 1-50, 1-25, 1-15, 1-10, 1-5, 5-50, 5-25, 5-15, 5-10, 10-50, 10-25, 10-15, 15-50, 15-25, 25-50, 0.1, 0.5, 1, 2, 3, 4, 5, 6, 7, 8, 9, 10, 15, 25, or 50 nm.

The permeable layer may comprise any polymer that is desirably chemically stable under the operating conditions. Suitable polymers that may be used include, but are not limited to, polysulphones, polyethersulphones, cellulose acetates, polyamides, polyimides, polypyrrolones, crosslinked polyimides, polyether ketones, polyetherether ketones, polyetherimides, silicone rubbers, nitrile rubbers, neoprene rubbers, silicones, polycarbonates, polyarylenes, polyphenylene ethers, polyolefin elastomers, polybutadienes, vinyl polymers, polyalkalyenes, fluoropolymers, polymeric organosilicones, combinations thereof, and copolymers thereof. In one embodiment, the permeable layer comprises polymeric organosilicones. In another embodiment, the polymeric organosilicone is polydimethylsiloxane (PDMS). In a preferred embodiment, the polymer is operable to increase the selectivity of fluid separation by the membrane. In some embodiments, the use of an organic polymer on the substrate as a support layer facilitates easy production at high volume.

In some embodiments, the membrane may be modified to achieve specific properties. For example, in gas separation applications, the membrane may have desirably high permeability, high selectivity, high thermal stability, high hydrophobicity, high hydrophilicity, and high chemical resistance to feed streams. In some embodiments, the membranes are resistant to feed streams and corrosive impurities in feed streams, such as ammonia, chlorine, hydrogen chloride, bromine, sodium chloride, water, nitrous oxides, sulfurous oxides, sulfides, mercury, derivatives thereof, and mixtures thereof.

In some embodiments, the performance of the selective layer may be improved by surface modification, chemical grafting, blending, or coating. For example, hydrophobic components may be added to the permeable layer to alter the properties of the permeable layer in a manner that facilitates greater fluid selectivity without significant alterations to membrane permeability. In some embodiments, lending inorganic particles into the polymeric support layer may lead to increases in mechanical strength without alteration membrane selectivity, permeability, or flexibility. The chemical modifications may be achieved by methods known in the art, such as irradiation, or low-energy electron beam pulsing.

Materials of the support, selective, and permeable layers are chosen based upon end use application of the membrane. In some embodiments, the support layer includes crosslinked polymers and copolymers, phase separated polymers and copolymers, porous condensed polymers, polyamides, polyimides, polypyrrolones, polyesters, sulfone-based polymers, polymeric organosilicones, fluorinated polymers, and polyolefinic species. In other embodiments, the support layer may be composed of polymeric organosilicone is selected from the group consisting of polydimethylsiloxane, polydiethylsiloxane, polydi-iso-propylsiloxane, polydiphenylsiloxane, and either partially fluorinated or perfluorinated derivatives thereof.

In some embodiments, the selective layer is comprised of organic materials. In other embodiments, the selective layer includes alumina, silica, titania, zirconia, metal oxides, transition-metal oxides, palladium, platinum, nickel, transition-metal catalysts, transition-metals adsorbed on non-reactive supports, zeolites, clays, and mixtures thereof.

In some embodiments, the permeable layer includes crosslinked polymers and copolymers, phase separated polymers and copolymers, porous condensed polymers, polyamides, polyimides, polypyrrolones, polyesters, sulfone-based polymers, polymeric organosilicones, fluorinated polymers, and polyolefinic species. In other embodiments, the permeable layer may be composed of polymeric organosilicone is selected from the group consisting of polydimethylsiloxane, polydiethylsiloxane, polydi-iso-propylsiloxane, polydiphenylsiloxane, and either partially fluorinated or perfluorinated derivatives thereof. In an exemplary embodiment, the permeable layer is polydimethylsiloxane (PDMS).

Such multilayer structures have the advantages of thermal and chemical stability, good erosion resistance, high-pressure stability, good flexibility, and high permeance. In all previous embodiments, it should be understood that any of the layers may include one or more sublayers. It should also be appreciated that the arrangement of the support layer, the selective layer, and the permeable layer may change in relation to one another based upon the end based application of the membrane of interest. In some embodiments, from bottom to top, a membrane possesses a structure of the following order; substrate, support layer, selective layer, and optionally the permeable layer. In other embodiments, the permeable layer must be present on top of the selective layer to reduce the overall influence defects have upon permeability and selectivity. In additional embodiments, the permeable layer will restore the selectivity and permeability of said membrane to near intrinsic values. In some embodiments, the permeable layer will restore the selectivity and permeability of said membrane to the intrinsic values of a defect-free membrane.

In another embodiment, the sublayer exposed to the surface such as the sublayer has a coarser pore size than a sublayer disposed beneath it such as a sublayer. In all the above embodiments, the selective layer may include more than two sublayers depending on the requirement of the end use application. The thickness and pore dimensions of each of the layers are chosen depending on the end use application. The flow resistance of the layers with larger pores is less than or equal to the flow resistance of the layer with the smallest pores. Thus the flux through the membrane structure may be modified by tuning the pore diameters of different sublayers.

In one embodiment, a membrane structure comprises a support layer having a plurality of pores, and a selective layer disposed on the support layer. The selective layer comprises an inorganic material having a plurality of pores. Each of the pores is in fluid communication with at least one of the pores of the support layer. In another embodiment, the membrane comprises: a support layer having a plurality of pores; a first sublayer disposed on the support layer, the first sublayer comprising an inorganic material having a plurality of pores; a second sublayer disposed on the first sublayer, the second sublayer comprising an inorganic material having a plurality of pores. The pores of the second sublayer may be in fluid communication with at least one of the pores of the support layer.

In one embodiment, a membrane structure comprises a selective layer having a plurality of pores, and a permeable layer disposed on the selective layer. The permeable layer comprises an organic material having a plurality pores. Each of the pores may be in fluid communication with at least one of the pores of the selective layer. In another embodiment, the membrane comprises: a selective layer having a plurality of pores; a first sublayer disposed on the selective layer, the first sublayer comprising an organic material having a plurality of pores; a second sublayer disposed on the first sublayer, the second sublayer comprising an organic material having a plurality of pores. The pores of the first sublayer may be in fluid communication with at least one of the pores of the selective layer.

In one embodiment, post-synthesis membrane coating with PDMS has shown to be effective for imperfect microporous silica and zeolite Y membranes. In other embodiments, addition of a permeable layer to a membrane comprising a substrate, a support layer, and a selective layer reduced the overall effect of defects in the membrane. In other embodiments, $H_2/CO_2$, $CO_2/N_2$, and $CO_2/CH_4$ gas selectivities were found to be significantly improved, ascribed to the reduction of flow through defects. This was supported by calculations with a flow resistance description. In one embodiment, the $CO_2/N_2$ separation values of >1000 are much higher than those reported earlier in the literature for sol-gel silica membranes (~80), which was highly unexpected. For example, modified silica membranes showed good $H_2/CO_2$ separation at low temperatures. In one embodiment, the $H_2/CO_2$ selectivity of 66 was achieved, which is slightly below the value measured previously for sol-gel niobia-silica membranes (~70), that value was obtained at higher temperatures (200° C.) where $H_2$ mobility is higher. Application of the 150 nm top PDMS layer was found to make only a small contribution when compared to intrinsic membrane resistance.

In some embodiments, PDMS modification allows near-intrinsic separation performance values to be obtained for highly selective inorganic membranes. In other embodiments, the PDMS defect abatement method is expected to be directly applicable to industrial applications; the only restriction may be the temperature limitations of PDMS (up to ~250° C.). In other embodiments, higher operating temperatures (>300° C.) may be reached by using more stable gas permeable polymers such as amorphous fluoropolymers.

In some embodiments, the $CO_2/CH_4$ selectivity of modified silica membranes may be useful for the purification of natural gas mixtures which currently cannot be used because of high concentrations of $CO_2$. In some embodiments, membranes may be rendered commercially viable if the permeance is improved and if they are prepared on polymer supports with RTP. The $H_2/CO_2$ separation performance is also of interest for pre-combustion $H_2$ separation in integrated gasification combined cycle (IGCC) power plants. In other embodiments, polymeric organosilicone coatings may provide mechanical protection.

In one embodiment, thin supported inorganic membranes offer great potential for energy-efficient gas separations such as $H_2$ from coal gas, $CO_2$ from flue gas, $O_2$ from air, and olefins from parafins. These separations are of major importance in current and future energy conversion and chemical production. State of the art separations contribute very significantly to energy dissipation to the extent that current technologies become unsustainable and future technologies unviable. Ideal membrane separation can be performed without dissipation. This requires very thin (<100 nm), and at the same time, highly selective membranes. Both requirements are mutually exclusive in state-of-the-art membranes; this is known as the Robeson limit. Only thin, dense, or microporous (pore diameter between 0.5 and 2 nm) membranes will be able to break the Robeson limit. The chemistry of these materials can be either organic or inorganic but inorganic compositions generally lead to higher thermal stability. The very thin membranes must be deposited on a graded porous support. This support can be either organic polymeric or inorganic, and can be chosen and designed such that they add little to the overall mass transfer resistance. Organic polymeric supports are much cheaper than inorganic supports but limited to operation at <400° C. and mild chemical conditions. This implies that, while economic feasibility often dictates the use of polymeric supports, inorganic supports will be considered primarily for higher temperatures and harsh chemical conditions. State-of-the-art deposition methods of <1 μm thick membranes leads almost unavoidably to pinhole defects. These defects are pores that connect both sides of the membrane with diameters between 4 nm and 1 μm. They have an order of magnitude higher permeance than the membrane structure, and effectively bring selectivity back to uninteresting levels. This is enhanced by a "spreading effect" in which the feed mixture accumulates over a large area around the defect at the support side.

Disclosed herein is a process which relies upon the deposition of a thin layer of polydimethylsiloxane (PDMS) on an inorganic membrane, which fully restores the intrinsic membrane selectivity. In some embodiments, there are fewer or no defects in the permeable layer and it is very unlikely that they coincide with the inorganic membrane defects. In some embodiments, 500 nm thick PDMS has a transport resistance, much lower than that of all known micro-porous membranes. In other embodiments, low transport resistance implies that the permeable layer does not impede the intrinsic permeance of membranes. In one embodiment, PDMS is fully non-selective; it fills or covers connected pinhole defects which effectively reduces their permeance by more than one order of magnitude. In another embodiment, this also removes the "spreading effect," and restores the selectivity to the near-intrinsic value.

Example 1

γ-Alumina-Polysulfone Composite Membrane (from an Aqueous Sol) Covered by a Poly(dimethylsiloxane) (PDMS) Defect Abatement Layer A Boehmite sol in water with ~1 wt % concentration was prepared by hydrolysis of aluminum tri-sec-butoxide (ATSB) at 90° C. in a mixture with an ATSB:$H_2O$ molar ratio of 1:100, followed by peptization and purification (T. A. Kuzniatsova, M. L. Mottern, K. Shqau, D. Yu, H. Verweij, "Micro-structural optimization of supported γ-alumina membranes," *J. Membrane Sci.*, 316 [1] 80-88 (2008).). 1 mL sol was spin-coated on a polysulfone support (molecular weight cut-off of ~50 kDa) placed on a thin circular metal plate, followed by overnight drying at room temperature, and rapid thermal processing (RTP) to transform Boehmite to the γ-alumina phase. This treatment was carried out 3× with spin coating conditions as follows: 1) 500→3000 rpm, 2) 500→1700→3000 rpm, and 3) 500→1700→3000 rpm. The sol was spread at 500 rpm during each coating, in the $2^{nd}$ and $3^{rd}$ treatment the speed increased to and kept at 1700 rpm for 10 sec, and each coating was finished and dried for ~2 minutes at 3000 rpm. In RTP, the sample on the metal plate was heated to 400° C. in 4 sec followed by quick natural cooling to room temperature. In the final step, the membrane was spin-coated with a PDMS solution to plug defects in the inorganic layer (W. V. Chiu, I.-S. Park, K. Shqau, J. C. White, M. C. Schillo, W. S. W. Ho, P. K. Dutta, and H. Verweij, "Post synthesis defect abatement of inorganic membranes for gas separation," *J. Membrane Sci.*, 377[1-2] 182-190 (2011).). 10 ml PDMS solution was prepared by mixing 2.5 g Dow Corning Sylgard 184 PDMS with the matching crosslinker/catalyst solution in the weight ratio of 10:1 in heptane. For the spin-coating of PDMS, 1 ml solution was evenly spread on the already formed membrane, and then the spinning speed was increased to 1000 rpm in 10 sec, and kept at 1000 rpm for a minute to drain and dry the sample. After drying for an hour, the PDMS layer was cured for an hour at 100° C.

To measure $CO_2$ permeance and the $CO_2/N_2$ selectivity, the membrane was placed in a permeation cell enclosed inside a temperature controlled chamber. The cell comprises an upstream chamber to contact the feed against the upstream side of the membrane along with a downstream chamber to sweep the permeate from the downstream side of the membrane. The active membrane area in the cell was 5.75 $cm^2$. The membrane was exposed to a feed comprising 25% $CO_2$ and 75% $N_2$ at a total pressure of 1.24 atm and a flow rate of 60 scc/min. The permeate side was swept by Ar gas at a pressure of 1.1 atm and a flow rate of 30 scc/min. The temperature was kept at 55° C. A $CO_2$ permeance of >35 GPU with a $CO_2/N_2$ selectivity of >20 was obtained. A similar structure without alumina layer membrane gave a $CO_2$ permeance of >170 GPU with a $CO_2/N_2$ selectivity of <5.5. It is thus clear that the inorganic layer is the major contributor to selectivity of the composite membrane.

Example 2

γ-Alumina-Polysulfone Composite Membrane (from an $H_2O$/Iso-Propanol (IPA) Sol) and Covered by a Poly(Dimethylsiloxane) (PDMS) Defect Abatement Layer A Boehmite sol in water with ~1 wt % concentration was prepared by hydrolysis of aluminum tri-sec-butoxide (ATSB) at 90° C. in a mixture with an ATSB:$H_2O$ molar ratio of 1:100, followed by peptization and purification. It was dialyzed with water of pH ~3.5 to remove any salts present. The sol was then diluted ~0.4 wt % by adding IPA. The IPA addition resulted in better wetting of the polysulfone surface, and improved sol homogeneity. 1 mL sol was spin-coated on a polysulfone support (molecular weight cut-off of ~50 kDa) placed on a thin circular metal plate, followed by overnight drying at 40° C. in $H_2O$-saturated air, and rapid thermal processing (RTP) as in example 1 to transform the Boehmite to γ-alumina phase. After the sol was evenly spread on polysulfone, the spinning speed was increased from 250 to 1000 rpm in 10 sec, and kept at 1000 rpm for a minute to drain and dry the sample. In RTP, the sample on the metal plate was heated to 400° C. in 4 sec, followed by quick natural cooling. A PDMS defect abatement coating was applied as in example 1.

The permeation measurements were conducted as in example 1. A $CO_2$ permeance of >51 GPU with a $CO_2/N_2$ selectivity of >16 was obtained. A similar structure without alumina layer membrane gave a $CO_2$ permeance of >160 GPU with a $CO_2/N_2$ selectivity of <7. It is thus clear that the inorganic layer is the major contributor to selectivity of the composite membrane.

Example 3

γ-Alumina-Polysulfone Composite Membrane from an $H_2O$/Iso-Propanol Sol with Poly(Vinylpyrrolidone) (PVP) Addition, Covered by a Poly(Dimethylsiloxane) (PDMS) Defect Abatement Layer A 0.4 wt % sol in water and IPA was made as in example 2. This sol was then mixed with a 3 wt % PVP-K15 solution in water of pH=2 in a volume ratio of 3 sol:2 PVP solution. Spin-coating with 1 ml sol, and RTP were performed as in example 2. The thus formed composite membrane was immersed in IPA at room temperature for 24 hours to remove the soluble PVP. The PVP addition had the effect of making the γ-alumina layer more porous and/or increase its pore size. The membrane was then dried for a couple of hours inside a clean hood to remove the volatile IPA. A PDMS defect abatement coating was applied as in example 1.

The permeation measurements were conducted as in example 1. A $CO_2$ permeance of >151 GPU with a $CO_2/N_2$ selectivity of >11 was obtained. A similar structure without alumina layer membrane gave a $CO_2$ permeance of >160 GPU with a $CO_2/N_2$ selectivity of <7. It is thus clear that the inorganic layer does contribute to selectivity of the composite membrane. The PVP removal method can help in tuning the selectivity-permeance trade-off; in other words, this method can increase the $CO_2$ permeance while maintaining the selectivity.

Example 4

γ-Alumina-Polysulfone Composite Membrane from an $H_2O$/Iso-Propanol Sol with Poly(Vinylpyrrolidone) Addition, Covered by a Poly(Dimethylsiloxane) (PDMS) Defect Abatement Layer Using a PDMS Spin Coating Frequency of 3500 rpm A composite membrane was made as in example 3 but with a spin-coating speed of 3500 rpm instead of 1000 rpm for the PDMS layer. This is done to reduce the thickness of the PDMS layer.

The permeation measurements were conducted as in example 1. A $CO_2$ permeance of >90 GPU with a $CO_2/N_2$ selectivity of >19 was obtained. A similar structure without alumina layer membrane gave a $CO_2$ permeance of >250 GPU with a $CO_2/N_2$ selectivity of <6.5. It is thus clear that the inorganic layer is the major contributor to selectivity of the composite membrane. Also, the PVP removal method can help in tuning the selectivity-permeance trade-off in such membranes.

Example 5

γ-Alumina-Polysulfone Composite Membrane from an $H_2O$/Iso-Propanol Sol with Poly(Vinylpyrrolidone) (PVP) Addition, Covered by a Poly(Dimethylsiloxane) (PDMS) Defect Abatement Layer Using IPA Dissolution of PVP at 50° C., and a PDMS Spin Coating Frequency of 3500 rpm A composite membrane was made as in example 3 but with a temperature of 50° C. to dissolve PVP instead of room temperature.

The permeation measurements were conducted as in example 1. A $CO_2$ permeance of >235 GPU with a $CO_2/N_2$ selectivity of >8 was obtained. A similar structure without alumina layer membrane gave a $CO_2$ permeance of >250 GPU with a $CO_2/N_2$ selectivity of <6.5. It is thus clear that the inorganic layer does contribute to selectivity of the composite membrane. Also, the PVP removal method can help in tuning the selectivity-permeance trade-off in such membranes.

Example 6

Aluminum Tri-Sec-Butoxide (ATSB) Modified γ-Alumina-Polysulfone Composite Membrane Covered by a Poly(Dimethylsiloxane) (PDMS) Defect Abatement Layer A composite membrane of γ-alumina on poly-sulfone was made as in example 4 but with the spin coat and RTP procedure repeated 4 times. An ATSB solution was prepared by mixing overnight: ATSB, acetyl acetone and IPA in the mole ratio of 10:3.5:200. It was then diluted with IPA in a volume ratio of 1 ATSB solution: 5 IPA. 1 ml of thus obtained solution was spin coated on the γ-alumina membrane using a speed of 1000 rpm for 15 sec, and 3000 rpm for 20 sec. The membrane was then hydrolysed by keeping it under humid conditions at 55° C. for 24 hours. It was then dried in an oven at ~70° C. for 2 hours. The membrane was then treated by the RTP four times consecutively with the same RTP conditions. In the final step, the membrane was spin-coated with a PDMS solution to plug defects in the inorganic layer. The PDMS solution was prepared by mixing 2.5 g Wacker Dehesive 944 PDMS with the matching crosslinker and catalyst solutions in a weight ratio of 10:0.1:0.05 in 20 ml heptane. The Wacker formulation is more permeable than the Sylgard formulation. Spin coating, drying and curing was done as in example 4.

The permeation measurements were conducted as in example 1. A $CO_2$ permeance of >29 GPU with a $CO_2/N_2$ selectivity of >17 was obtained. A similar structure without alumina layer membrane gave a $CO_2$ permeance of >550 GPU with a $CO_2/N_2$ selectivity of <5.5. It is thus clear that the inorganic layer does contribute majorly to the selectivity of the composite membrane.

Example 7

Aluminum Tri-Sec-Butoxide (ATSB) Modified γ-Alumina-Poly(Ethersulfone) Composite Membrane with poly(dimethylsiloxane) (PDMS) Defect Abatement and Gutter Layers A PDMS solution was made as in example 6. A poly (ethersulfone) support (molecular weight cut-off of 300 KDa) was spin-coated with the PDMS solution to form a "gutter layer". The poly(ethersulfone) support is more permeable that the poly(ethersulfone) support. This is favorable for overall properties but also leads to unwanted clogging by sol particles. Hence a highly permeable gutter layer is applied. 1 ml of coating PDMS solution was spread on a support that was mounted on a spin coater. This was followed by centrifugal draining and drying at 1000 rpm for 10 sec and then 3500 rpm for ~1 minute. After drying for an hour, the PDMS layer was cured for an hour at 100° C. A Boehmite sol was made as in example 2 but with a dilution with IPA to 0.1 wt %. 1 ml sol was evenly spread on PDMS-coated poly(ethersulfone) mounted on a spin coater, followed by increasing the spinning speed 250 to 1000 rpm in 10 sec, where it was kept for a minute to drain and dry the sample. This coating procedure was repeated ten times with ~15 minutes for drying between each coating step. This was followed by drying overnight at 40° C. in $H_2O$-saturated air. An ATSB solution was prepared and applied as in example 6. A PDMS defect abatement coating was applied as in example 6.

The permeation measurements were conducted as in example 1 but with a feed gas flow rate of 70 scc/min and an Ar sweep gas flow rate of 50 scc/min. A $CO_2$ permeance of >440 GPU with a $CO_2/N_2$ selectivity of >10 was obtained. A similar structure without alumina layer membrane gave a permeance of >3400 GPU with a $CO_2/N_2$ selectivity of <5. It is thus clear that the inorganic layer does contribute majorly to the selectivity of the composite membrane while the more permeable support with gutter layer increases permeance compared to the cases described in Examples 1-6.

Example 8

γ-Alumina-Poly(Ethersulfone) Composite Membrane (from an $H_2O$/Iso-Propanol (IPA) Sol) with a UV-Ozonated Poly(Dimethylsiloxane) (PDMS) Defect Abatement and Gutter Layers A Boehmite sol and PDMS solution were prepared as in example 7. The poly(ethersulfone) support (molecular weight cut-off of 300 KDa) was mounted on a glass plate, and dip-coated with a PDMS solution to form a gutter layer: a certain amount of coating PDMS solution was evenly spread horizontally on the support surface, followed by vertical gravitational draining After drying for an hour, the PDMS layer was cured for an hour at 100° C. This layer was then UV-ozonated for 18 minutes. This treatment made the PDMS layer hydrophilic which is favorable for inorganic layer formation. The inorganic layer was made by evaporation of an evenly spread sol on the PDMS-coated poly(ethersulfone) support, followed by overnight drying at room temperature in IPA-saturated air. A PDMS defect abatement coating was applied as in example 6.

The permeation measurements were conducted as in example 7. A $CO_2$ permeance of >330 GPU with a $CO_2/N_2$ selectivity of >7.5 was obtained. A similar structure without alumina layer membrane gave a $CO_2$ permeance of <245 with a $CO_2/N_2$ selectivity of <3. It is thus clear that the inorganic layer does contribute majorly to the selectivity of the composite membrane.

Example 9

Zeolite Y Membranes for Separation or $CO_2$, and $H_2$ from Mixtures

A solution with molar composition of 0.037 $Na_2O$: 1.0$Al_2O_3$:3.13 $(TMA)_2O$:4.29$SiO_2$:497$H_2O$ was utilized to convert zeolite seed layers deposited on a polysulfone support into a continuous membrane by hydrothermal secondary growth. The solution was prepared by mixing 152 g $H_2O$, 4.58 g $Al(OH)_3$ and 53.6 g TMAOH, which was then added to 13.85 g Ludox SM-30 colloidal silica under vigorous stirring. Upon mixing, a moderately viscous gel was formed, which is then aged while stirring for 2 hours. The polymer supported zeolite seed layers were placed face up in a 125 mL Teflon-lined Parr digestion vessel at a 45° angle, filled to 80% of total vessel volume. The vessel was heated at 90° C. prior to quenching in cold water. The membranes prepared had a thickness of 0.2 ... 0.6 μm with $CO_2$ permeance of 300-1000 GPU. The selectivities for $CO_2/N_2$, $CO_2/H_2$ were >1000 and ~30, respectively.

Example 10

Pt/CGO Dual Phase Nano-Composite Membranes for O2 Separation

In Gadolinium-doped cerium oxide (CGO) and Pt metal dense nano-composite membranes $O^{2-}$ ions and electrons are transported separately through the Pt and CGO phases, respectively. This results in net $O_2$ transport that is ideally selective w.r.t. any other gas. To realize the required bipercolative structure, a porous CGO/Pt membrane was prepared by colloidal deposition of CGO/Pt precursor nano-particles, followed by RTP treatment, and creating a dense structure by electroless deposition (ED) of additional Pt. The total synthesis route comprises:

sonochemical preparation of CGO nanoparticle (Ø~5 nm) precursor dispersion;

Pt/PVA nanoparticle (Ø~21 nm) synthesis by reduction of chloro-platinic acid with Alcohol/aldehyd. PVA acts as capping agent;

preparation of supported mesoporous CGO-Pt membrane on polysulfone by spin-coating and rapid thermal processing; and ED densification of the mesoporous CGO-Pt layer.

The ED treatment resulted in a dense Pt-CGO composite structure, virtually leak-tight for non-permeable gases at room temperature. The measured He permeance was <3×10$^{-10}$ mol/(s·Pa·m$^2$). $O_2$ permeation measurements on ceramic supports showed stable $O_2$ permeance values of 7×10$^{-9}$ mol/(s·Pa·m$^2$) at 250° C. and 2×10$^{-8}$ mol/(s·Pa·m$^2$) at 350° C. with 1 atm air at the feed side and 1 atm He+20 ppm $O_2$ at the permeate side. These values are a major improvement with respect to state-of-the-art dense $O_2$ membranes.

Example 11

Thin Dense Pd Alloy (PdA) Membranes on Meso-Porous Nano-Composite Pd/$ZrO_2$ for $H_2$ Purification A 33% $Pd(O)_x$-67% $ZrO_2$ 1 wt % aqueous sol was spin-coated on a polysulfone support placed on a thin circular porous stainless steel plate, followed by drying overnight at room temperature, and then rapid thermal processing (RTP) to transform the palladium precursor to active metallic palladium. The thus formed layer appeared to greatly accelerate nucleation of PdA by electroless deposition (ED). A deposition time of <10 minutes was obtained for a homogeneous deposition of a 100-200 nm thick PdA. This structure is fully stable with very high permeance at low temperatures.

The sample with nucleation layer was immersed into an electroless deposition (ED) solution containing, 4 g/L $Pd(NH_3)_4Cl_2H_2O$; 40 g/L $Na_2EDTA$; 200 mL/L 28% $NH_4OH$; 5 mL/L (1 mol/l) $NH_2$—$NH_2$, and alloy precursors. The ED bath resulted in a dense PdA composite structure being virtually leak-tight for non-permeable gases at room temperature. The measured He permeance was <3×10$^{-10}$ mol/(s·Pa·m$^2$). $H_2$ permeation measurements on ceramic supports showed stable $H_2$ permeance values of 10$^{-6}$ mol/(s·Pa·m$^2$) at 260° C. and 2×10$^{-6}$ mol/(s·Pa·m$^2$) at 320° C. with 1 atm pure hydrogen at the feed side and vacuum (3 kPa) at the permeate side.

Example 12

Thin Meso-Porous Membranes for Water Purification

A purified ~10 wt % aqueous sol of Cerium-Gadolinium Oxide (CGO) precursor was prepared by sonochemical precipitation of aqueous ammonium cerium nitrate at ~100 W with a Ce:Gd molar ratio of 10:1. After removal of unreacted chemicals by dialysis the sol was spin-coated on a polysulfone support mounted on a metal/glass plate. The spin-coating procedure comprises the following three consecutive steps:

spreading of the sol at 500 rpm for 30 seconds;

formation of a uniform layer at 1000 to 1700 rpm for 15 seconds; and drying process 3000 rpm for 10 seconds.

The final structure was obtained by RTP. Purified titania and stannia sols in 2-propanol were prepared by solvothermal conversion of metal halide (or alkoxide). Large agglomerates were removed by high speed centrifugation. The sols were deposited on a polysulfone support by the procedure mentioned for CGO. Aqueous salt rejection measurements of 100 ... 250 nm thick membranes revealed a fully stable performance. 64% and 58% NaCl rejection was obtained with titania and stannia membranes, respectively, for 0.001M NaCl at pH ~4. 91% and 98.7% $CaCl_2$ rejection was obtained with titania and ceria membranes, respectively, for 0.001M $CaCl_2$ at pH ~4.

Novel Membrane Concepts

Figure 17:
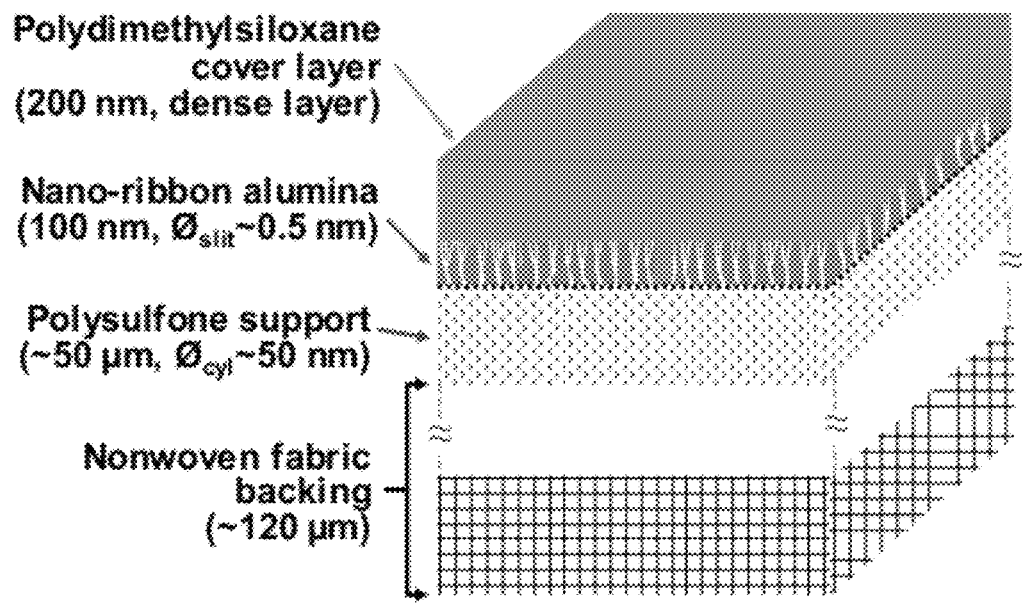
FIG. 17: Supported flexible inorganic membrane concept; Ø is the pore dimension; the other numbers are the thickness.

Disclosed herein is a general inventive concept related to novel Polymer/Pd Alloy Composite Membrane, FIG. 17. In some embodiments, the Polymer/Pd Alloy Composite Membranes may be made in a continuous fabrication process as used for commercial spiral-wound polymer membrane modules. In some embodiments, the membrane may operate at temperatures of 25-700° C. In some embodiments, the membrane may operate at temperatures of 100-500° C. In some embodiments, the membrane may operate at temperatures of 300-500° C. In some embodiments, the membrane may operate at temperatures of 100-300° C. In other embodiments, the separation function is provided by a thin sulfur-stable Pd/Au alloy membrane, grown stress-free with uniform thickness on a $ZrO_2$/Pd porous nano-composite coupling layer, supported on a nano-porous polymer layer. In some embodiments, the support layer provides excellent non-metal/metal adhesion and abundant nucleation sites to grow thin metal layers by electroless deposition.

In one embodiment, the material for the nanoporous support layer is of the polypyrrolone type. For example, polypyrrolone polymers may be synthesized from oxydiphthalic anhydride (ODPA) and tetraminobiphenyl (TABP), resulting in a polyamic acid prepolymer that is soluble in DMF or NMP. In some embodiments, after fabrication into the nanoporous structure via phase inversion, it is dried, imidized and converted thermally (~350° C.) into polypyrrolone. This material, with stable multiaromatic ring conjugated structures in the polymer backbones, can be operated potentially up to 500° C. or higher since it is similar to the polypyrrolones with a thermal degradation temperature as high as 579° C. reported in the literature. The nanoporous support layer made via the phase inversion process has an integrally skinned structure with the nanoporous skin layer on the top of the open porous support matrix. The integrated support may be about 100 μm thick.

In some embodiments, a thermally stable amorphous fluorinated (AF) copolymer cover layer that is composed of poly[4,5-difluoro-2,2-bis(trifluoromethyl)-1,3-dioxole-co-tetrafluoroethylene]. There are two AF copolymers made by DuPont, called AF 1600 and AF 2400, containing 65% and 87% dioxole, respectively. In other embodiments, the cover layer is a caulking coating, and its function is protection and defect abatement. In some embodiments, the permeable layer has a higher permeance than the Pd alloy but a lower permeance than any pinholes in the membrane. In some embodiments, the properties of the permeable layer allows membrane selectivity to remain at near ideal values.

The membrane may be a combination of the selectivity of Pd alloy membranes and the cost price/flexibility of polymer materials. In some embodiments, no adverse effects are expected of any coal syngas contaminants. It is believed that the membrane is transformative, and it has great potential to make hydrogen from coal to be affordable and cost-effective.

In some embodiments, the process to produce the advanced membrane will be scaled to industrial levels. In some embodiments, transport studies have been carried out on small membrane specimens. A casting and coating machine for continuous fabrication of a polymer-supported membrane with a width of 14-21 inches may be used to produce the described membranes for industrial applications. The casting machine is used for the fabrication of nanoporous polypyrrolone as the membrane support whereas the coating machine is for the continuous fabrication of the selective Pd/Au alloy layer and amorphous fluorinated (AF) copolymer cover layer. The membrane may be fabricated into modules with a high packing density similar to those for reverse osmosis and gas separation. Thus, the costs of the novel membrane and modules will be in line with those for reverse osmosis and gas separation, and are significantly lower than those for fully inorganic membranes. Membrane modules may be used to demonstrate that a Polymer/Pd composite membrane may be used for the purification of coal syngas to high purity hydrogen.

An initial cost estimate for the proposed membrane shows an attractive cost of $0.31/kg $H_2$ for the purification of Test 2A coal syngas to high purity hydrogen, which is much lower than the cost of state-of-the-art Pd membranes at about $1.55/kg $H_2$. This process may achieve the desired results of the producing hydrogen of greater than 95% along with $CO_2$ capture.

State-of-the-art high temperature polymer membranes (e.g., polyimide and polypyrrolone), cannot achieve the high selectivity for high purity hydrogen whereas amine-containing polymer membranes are not suitable for operation at 300-500° C. State-of-the-art inorganic membranes (e.g., Pd alloys), are too expensive due to batch synthesis and low flexibility for fabrication of high surface area/volume modules. State-of-the-art Pd alloys also suffer from sulfur poisoning due to stress-corrosion in an inhomogeneous membrane structure with varying adhesion and thickness. The proposed membrane will overcome all the shortcomings of the polymer and inorganic membranes.

The development of the conceptually novel Polymer/Pd Alloy Composite Membrane may alleviate prohibitive costs associated with the high throughput production of high purity gases that can be made in a continuous fabrication process as used for commercial spiral-wound polymer membrane modules. The membrane is expected to operate at temperatures of 300-500° C. The separation function is provided by a thin Pd alloy membrane grown on a $ZrO_2$/Pd porous nano-composite coupling layer, which is supported on a nanoporous thermally-stable polymer layer, and provided with a cover layer as discussed before. A water gas shift catalyst may also be incorporated when the membrane is built into a spiral-wound module that can be operated as a cost-effective membrane reactor with syngas feed.

In some embodiments, $CO_2$ capture in coal-fired power plants may be conducted with the membranes described herein. PDMS is slightly $CO_2$ selective but its major functions are: mechanical protection and integrity, minimizing membrane pore blocking by water, and most importantly, abating adverse effects of membrane defects. The support provides strength, a smooth deposition surface, and a non-selective high permeance. The membrane layer comprises micro-porous γ-alumina with a slit-shaped pore morphology, made by introducing small alumina polymers in the meso-pores of state-of-the-art γ-alumina. The membrane is the first that combines exceptionally high $CO_2$ permeance with high $CO_2$/$N_2$ selectivity and the full operational stability needed for energy-efficient $CO_2$ capture. With the materials we propose, there are no adverse effects expected of any flue gas contaminants. Thus, the costs of the novel membrane and modules will be in line with those for reverse osmosis and gas separation, and are significantly lower than those for fully inorganic membranes (e.g., silica and Pd).

Post-Synthesis Defect Abatement

In some embodiments, the simple, fast, and cost-effective defect abatement of inorganic gas separation membranes may be achieved by application of a continuous permeable layer. In some embodiments, the permeable layer diminishes defect flow and is stable at a wide range of operating conditions. In other embodiments, a thin layer of polydimethyl siloxane (PDMS) may be applied to defective microporous silica and zeolite Y membranes.

For example, after application of PDMS, the $H_2$/$CO_2$ and $CO_2$/$N_2$ binary gas separation performance of both silica and zeolite membranes has been found to improve significantly due to reduction in defect flow. In a specific embodiment, at 30° C., $CO_2$ selectivity of the silica membrane for a 1:1 $CO_2$/$N_2$ mixture improved from 1.5 to 835 after application of PDMS. In one embodiment, at elevated temperatures, $N_2$ in the permeate could no longer be detected by gas chromatography, which translates to a selectivity of >1000. In one embodiment, there was also an improvement in the selectivity for a 1:1 $H_2$/$CO_2$ mixture at 30° C. from 1.9 without, to 66 with PDMS modification.

In other embodiments, similar effects were observed for supported zeolite Y membranes. In one embodiment, the selectivity at 30° C. of a zeolite Y membrane for a 1:1 $CO_2$/$N_2$ mixture was found to increase from ~0.93 before, to >1000 at 30° C. after modification with PDMS. In some embodiments, in addition to improved separation factors, a reduction in the overall permeance occurred due to reduced defect flow contributions. In an exemplary embodiment, the $H_2$ permeance at 130° C. decreased from $8.5 \times 10^{-8}$ mol/($m^2$ s Pa) for the uncoated silica membrane to $6.6 \times 10^{-9}$ mol/($m^2$ s Pa) after PDMS application. In some embodiments, the $CO_2$ and $N_2$ permeance values at 130° C., however, decreased by almost two orders of magnitude. In other embodiments, the decrease in overall permeance due to defect abatement is supported by transport calculations assuming simple expressions for solution-diffusion through the membrane and Knudsen flow through the defects. For example, calculations have shown that the application of PDMS leads to a decrease in the overall permeance but an increase in the $H_2$ selectivity for a wide range of defect area fractions ($<10^{-4}$).

It is known in the art that inorganic membranes have been employed for a variety of gas separation applications, including hydrogen purification and $CO_2$ sequestration. In some embodiments, inorganic membranes possess good thermal stability, chemical resistance, and a high compressive strength, all of which are favorable for use in harsh operating conditions. In additional embodiments, dense and microporous membranes (pore size, $\varnothing_p$<2 nm) may have very high or even close to perfect gas selectivities. In typical embodiments, inorganic membranes are usually prepared as a top layer on multilayer structures to provide the membrane with sufficient strength while keeping the separative top layer as thin as possible to reduce flow resistance. In other embodiments, the selective membrane layers are generally prepared with thickness of 1 to 10 μm, but may be less than 50 nanometers thick.

A major limiting factor to the application of supported inorganic membranes, however, is the frequent occurrence of defects which limits reproducibility, stability and the separation performance of the membranes. In some embodiments, thin microporous and dense gas separation membranes have been affected by defects, leading to a large variation in the reported membrane performance, underestimation of selectivity, and overestimation of permeance. In some embodiments, microporous gas separation membranes have $\varnothing_p$~0.5 nm and defects in the membranes may have a size from ~4 nm to 1 μm. In other embodiments, meso- (2-50 nm) and macro-defects (>50 nm) have a deleterious effect on the gas separation performance due to significant contributions of Knudsen and/or viscous flow to the overall flow. These mechanisms result in a low selectivity or no selectivity at all. Permeance as a result of defects is much higher than that of defect-free membrane area, and may dominate overall membrane permeance, artificially increasing permeance measurements. Leaks through defects may also reduce the driving force for microporous transport by a spreading of the feed composition in a resistive support over a large area, just below the membrane. Support spreading effects lead to a reduction in the chemical potential gradient over an area much larger than the actual defect area.

In some embodiments, coating defective membranes with a permeable layer to cover defects is a possible post treatment method. In some embodiments, the permeable layer must have a high permeance with respect to the intrinsic membrane layer, but a much lower permeance than either meso- or macro-defects. In other embodiments, membrane coating leads to a reduction of defect flow contributions and support spreading effects without significantly adding to the overall flow resistance. In some examples, coating may restore membrane performance to near intrinsic values.

In some embodiments, a polymer that has been found to be particularly suitable for defect abatement is silicone rubber, which was first applied to composite polymer membranes. In some embodiments, silicone rubber serves as a highly permeable polymer that is inert and stable at temperatures up to ~250° C. In other embodiments, silicone rubber has been found to be compatible with applications in pervaporation, moderate temperature $H_2$ separation, $CO_2$ separation, and olefin/paraffin separation. It is known in the art that polydimethylsiloxane (PDMS) rubber, oxidizes at temperatures around 290° C. while a more stable silicone rubber blend, polymethylphenylsiloxane, begins to oxidize at 375° C. Typically, the more stable polymers, however, are also less permeable due to bulkier functional groups. In some applications, silicone rubber is easy to deposit as thin layers allowing for large scale, commercially viable defect abatement.

In some embodiments, silicone rubber post-treatment has been applied to silicalite pervaporation membranes, and carbon molecular sieve membranes. In silicalite membrane studies, silicone rubber application only improved the ethanol/water separation slightly, most likely because large defects were present which could not be completely covered. In the carbon membrane study, the application of PDMS showed a significant improvement in the $H_2/N_2$ and $He/N_2$ selectivity at low temperatures, but $CO_2/N_2$ selectivity only improved marginally (up to ~10). This behavior has been ascribed to the reduction of surface and Knudsen diffusion through defects, which have a more pronounced effect at low temperatures. In some embodiments, amorphous microporous silica membranes revealed the benefits of PDMS coatings for $CO_2$ gas separation. In one embodiment, the $CO_2/CH_4$ separation factor for a defective silica membrane at 30° C. and ~14 bar feed pressure was found to improve from ~1 to ~60 after coating with PDMS. In another embodiment, the $CO_2$ permeance decreased after application of PDMS, from $1.5 \times 10^{-7}$ to ~$7.0 \times 10^{-9}$ mol/($m^2$ s Pa), which was attributed to the reduction in defect flow.

Silica Membrane Structure

Figure 3:
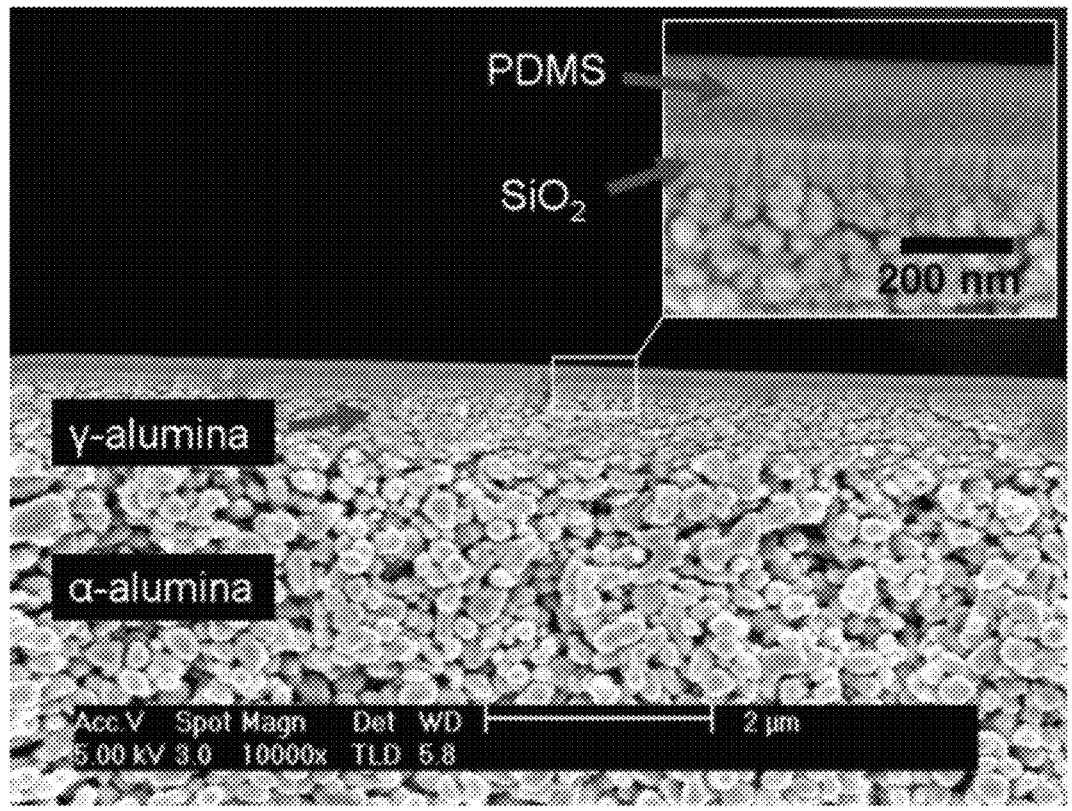
FIG. 3: SEM cross section of a PDMS coated silica membrane supported on γ-alumina/α-alumina support.

A multi-layer silica membrane prepared with a PDMS top coating is shown in FIG. 3. From the SEM cross section, the thickness of the γ-alumina intermediate layer on top of the α-alumina support was estimated to be about 580 nm. Under higher magnification, a continuous PDMS layer with a thickness of ~150 nm can be seen on top of a ~80 nm silica membrane layer. The granular appearance of the membrane layers in the inset of FIG. 3 is due to the conductive gold coating used for SEM analysis.

The γ-alumina intermediate layer prepared by RTP was previously found to have a lower porosity and pore size compared to membranes prepared by conventional thermal processing. The smaller pore size is believed to increase capillary suction during dip coating of the silica membrane layer, consequently leading to increased infiltration of the silica sol into the γ-alumina intermediate layer. The increased effective thickness of the silica layer along with the lower porosity of γ-alumina from RTP lead to increased flow resistance compared to conventional membranes. However, it also led to membranes with no support limitations which made them more sensitive to defect leaks. Consequently they were found very suitable for the investigation of defect abatement by deposition of PDMS.

Gas Transport

Figure 4:
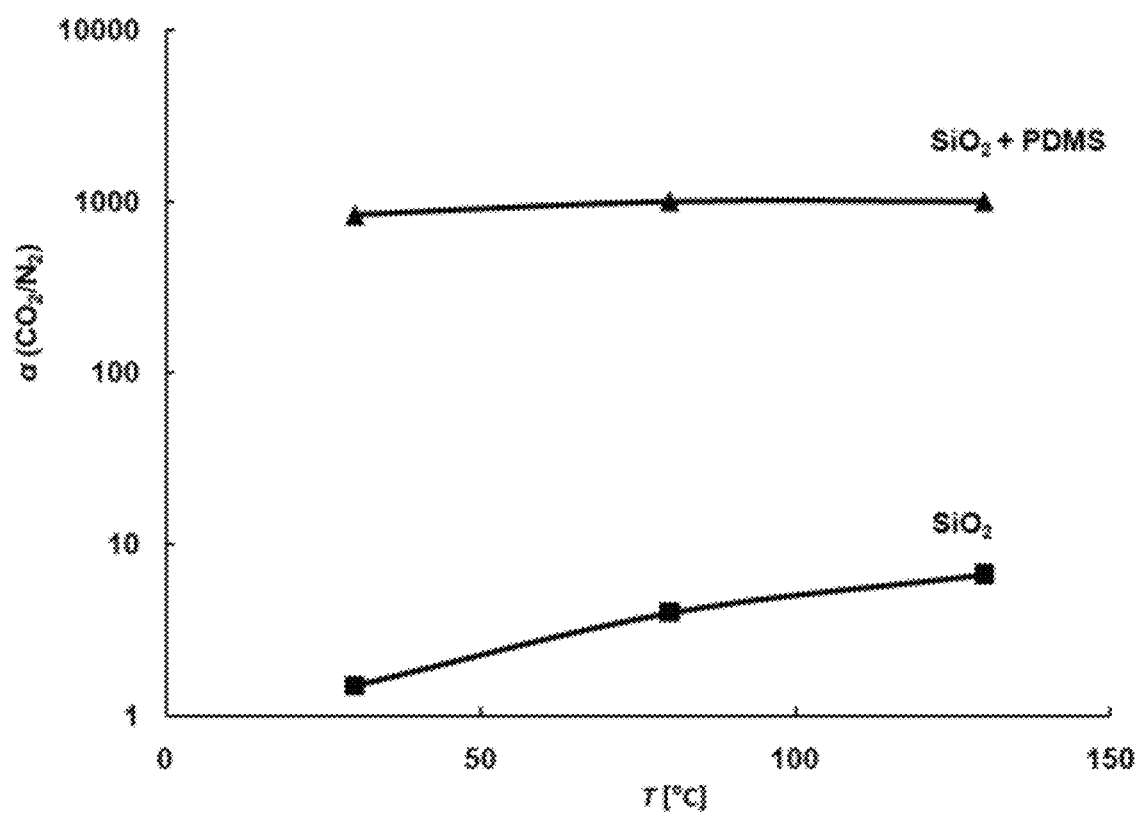
FIG. 4: Temperature dependence of $CO_2/N_2$ gas separation for silica and PDMS coated silica membranes with $p^f=3$ bar.
Figure 5:
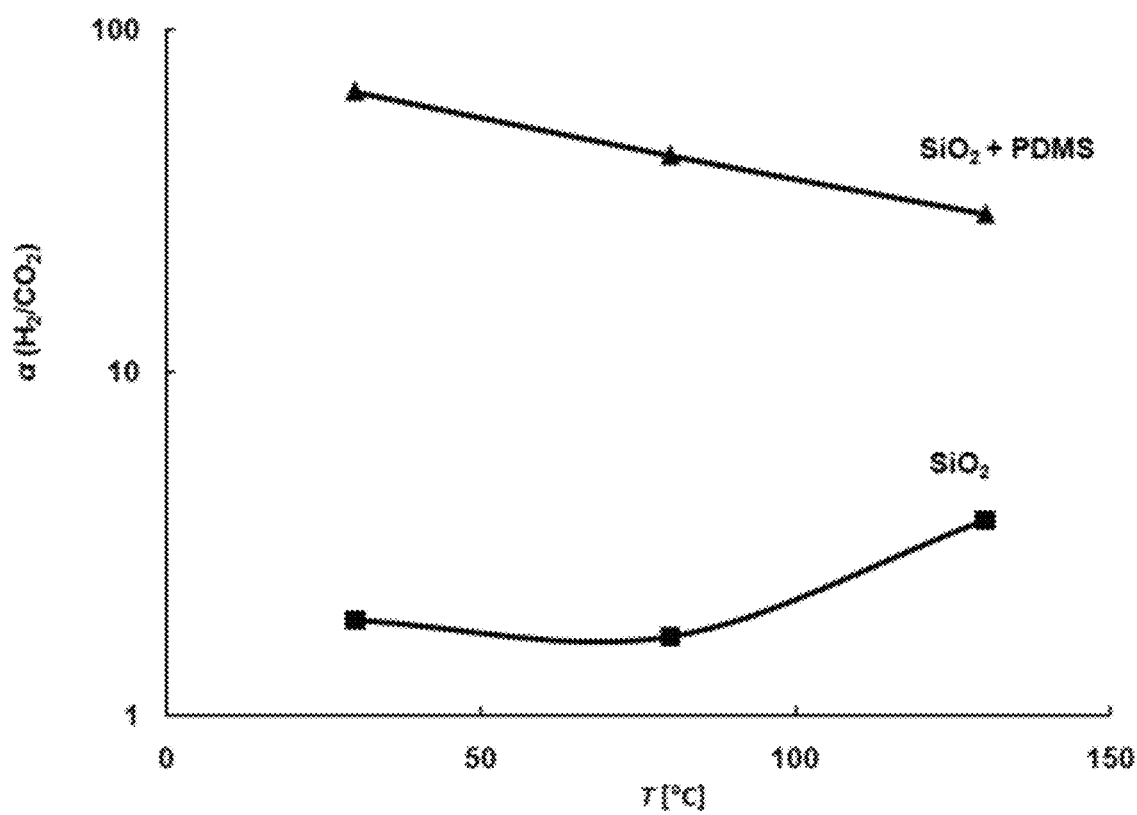
FIG. 5: Temperature dependence of $H_2/CO_2$ gas separation for silica and PDMS coated silica membranes with $p^f=3$ bar.
Figure 6:
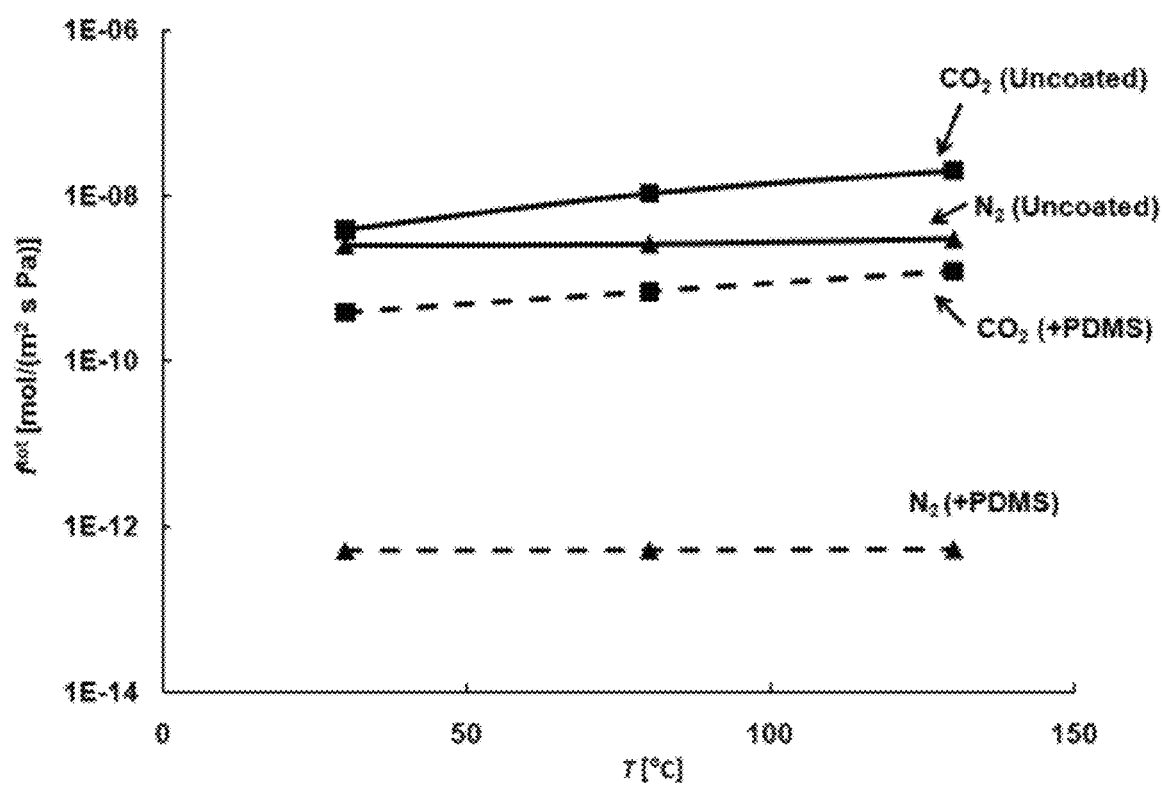
FIG. 6: Temperature dependence of $CO_2/N_2$ mixed gas permeance for silica and PDMS coated silica membranes with $p^f=3$ bar.
Figure 7:
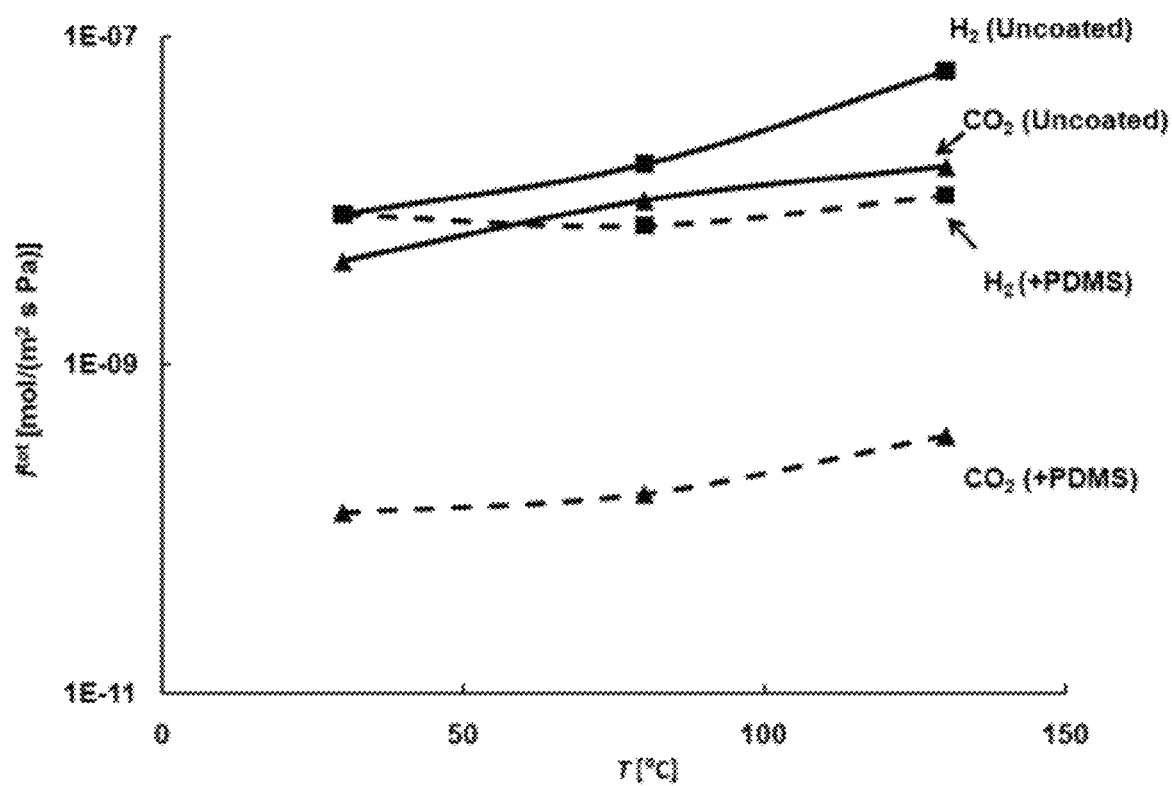
FIG. 7: Temperature dependence of $H_2/CO_2$ mixed gas permeance for silica and PDMS coated silica membranes with $p^f=3$ bar.
Figure 9:
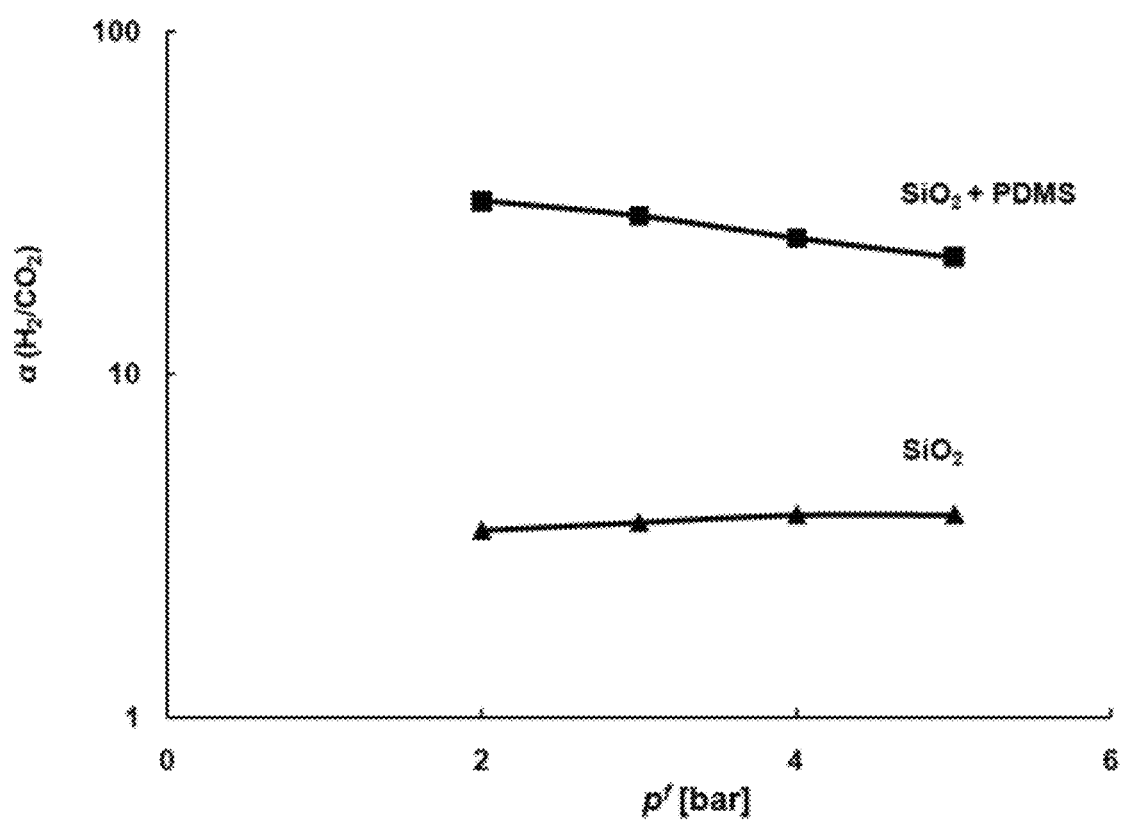
FIG. 9: Pressure dependence of $H_2/CO_2$ gas separation for silica and PDMS coated silica membranes at 130° C.
Figure 10:
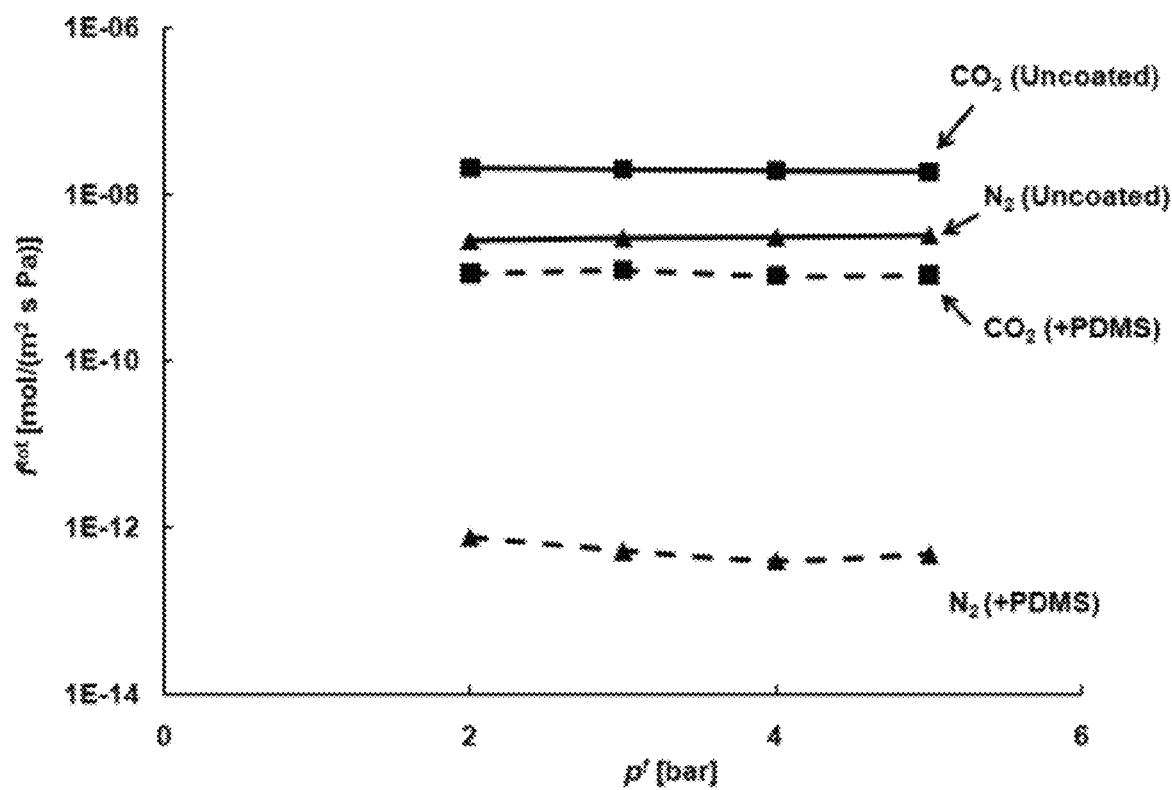
FIG. 10: Pressure dependence of $CO_2/N_2$ mixed gas permeance for silica and PDMS coated silica membranes at 130° C.
Figure 11:
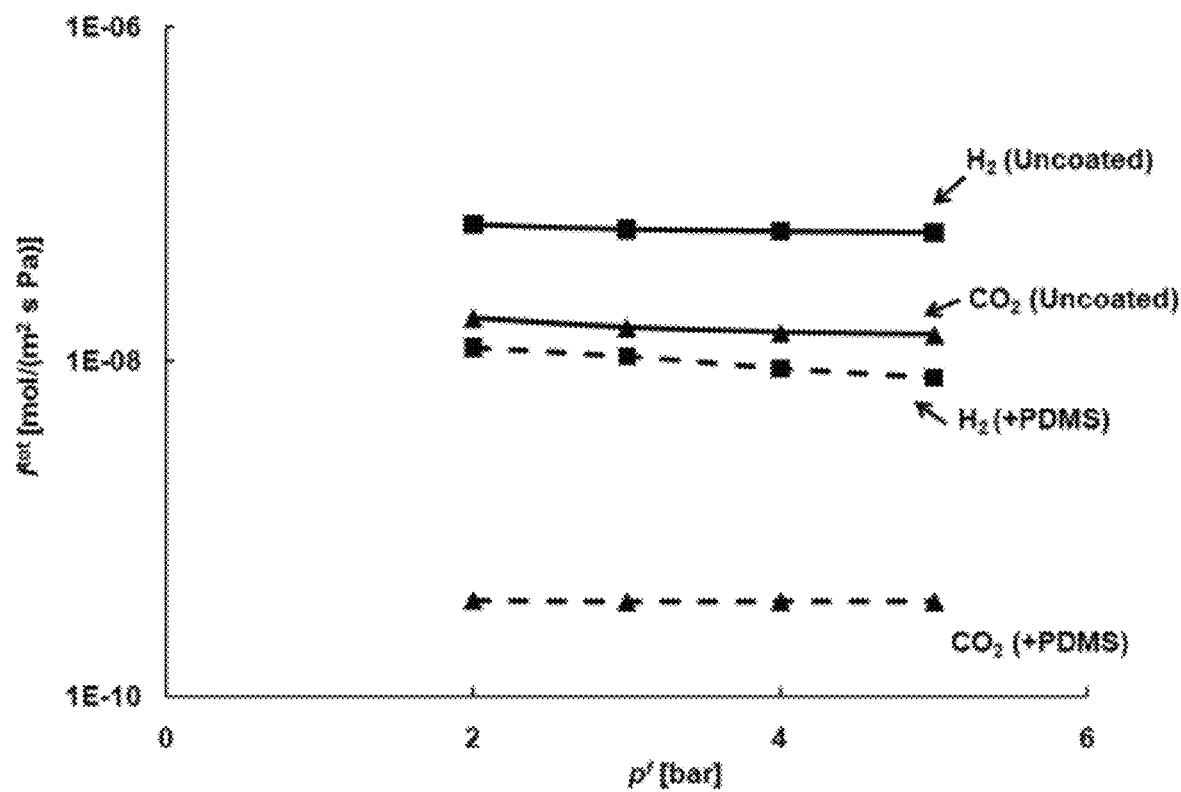
FIG. 11: Pressure dependence of $H_2/CO_2$ mixed gas permeance for silica and PDMS coated silica membranes at 130° C.

The silica membrane tested was not optimized and thus contained a significant amount of defects. As a result gas permeation for all gas species contained contributions of Knudsen diffusion through defects and microporous diffusion through the defect-free membrane area. Viscous flow contributions were generally ignored because defects with Ø>100 nm were not observed and because the surface pore size of the underlying support layer was ~40 nm. Gas separation testing of the unmodified membrane at 130° C. and 2 bar feed pressure, resulted in $\alpha_{CO_2,N_2}$=7.5 and $\alpha_{H_2,CO_2}$=3.5, respectively. The fact that $\alpha_{CO_2,N_2}$ was larger than the ideal Knudsen selectivity $\alpha_{CO_2,N_2}^{Kn}$=0.8, indicated that at least some micropore diffusion of $CO_2$ occurred. But, regardless, the selectivity of the untreated membranes was very low due to defect leaks. $CO_2$ micropore transport was significantly higher than that for $N_2$ due to a more favorable combination for $CO_2$ of mobility in, and affinity for silica. In addition, $\alpha_{H_2,CO_2}$ was found to be slightly less than the ideal Knudsen selectivity $\alpha_{H_2,CO_2}^{Kn}$=4.7, which may be also due to the high affinity of $CO_2$ to the membrane relative to $H_2$. The temperature dependence of $\alpha_{CO_2,N_2}$ and $\alpha_{H_2,CO_2}$ is shown in FIGS. 4 and 5, respectively. The corresponding mixed gas permeance values for $CO_2/N_2$ and $H_2/CO_2$ mixtures are given in FIGS. 6 and 7, respectively. $\alpha_{CO_2,N_2}$ was found to increase with increasing temperature, which is ascribed to a combination of the decreasing $N_2$ Knudsen defect flow, and increasing $CO_2$ flow through the micropores. The increase in $CO_2$ flow is due to a favorable combination of increased mobility and decreasing concentration with temperature. $\alpha_{H_2,CO_2}$ did not change with temperature until 130° C. where it increased slightly in agreement with literature data for higher temperatures. Both $\alpha_{CO_2,N_2}$ and $\alpha_{H_2,CO_2}$ showed little variation with pressure, (see FIGS. 8 and 9 for $CO_2/N_2$ and $H_2/CO_2$, respectively). The corresponding permeance values for $CO_2/N_2$ and $H_2/CO_2$ mixtures are given in FIGS. 10 and 11, respectively. The small decrease of $\alpha_{CO_2,N_2}$ with feed pressure is ascribed to viscous flow through some larger defects, possibly sealing leaks.

Figure 8:
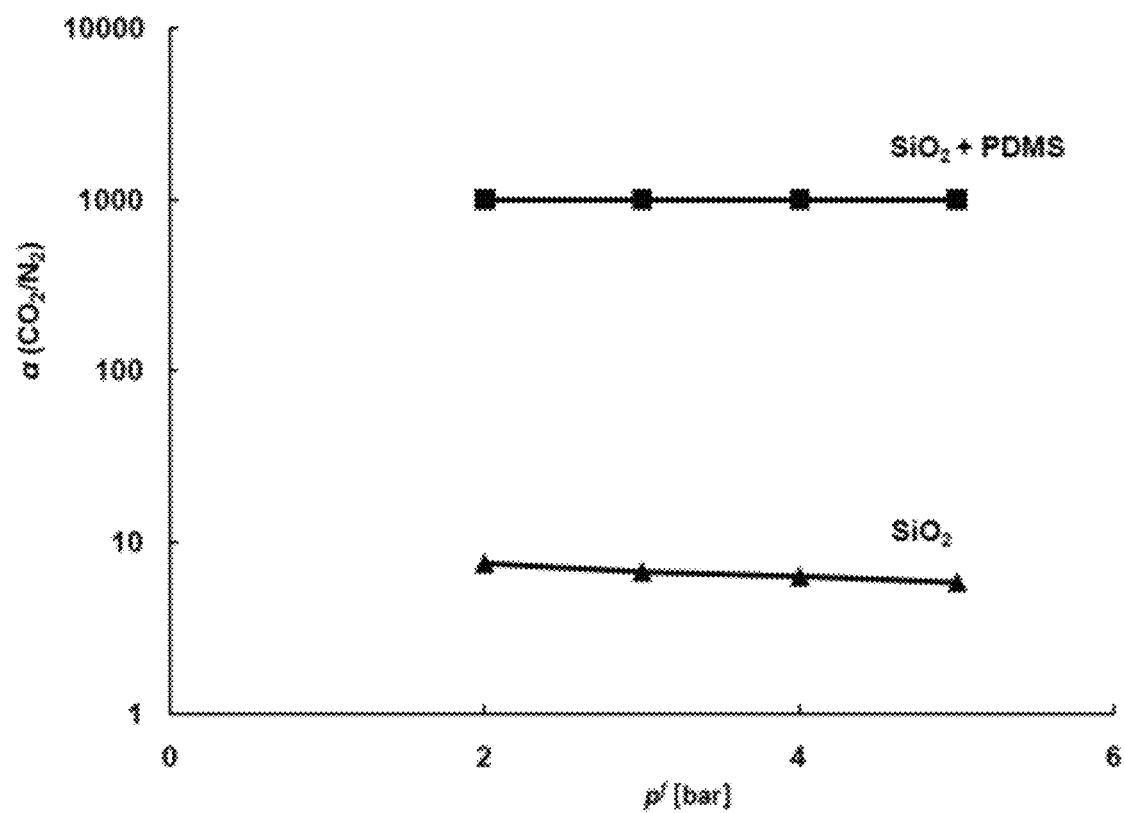
FIG. 8: Pressure dependence of $CO_2/N_2$ gas separation for silica and PDMS coated silica membranes at 130° C.

The PDMS coating on silica membranes was found to significantly improve $\alpha_{CO_2,N_2}$ and $\alpha_{H_2,CO_2}$ for the silica membranes. As shown in FIG. 4, the PDMS coated silica membrane exhibits a very high $\alpha_{CO_2,N_2}$ of >1000 for T=80 and 130° C. At elevated temperatures, the permeating $N_2$ is below the detection limit of the gas chromatograph. This shows that there is little flow through, now plugged, defects and that apparently the intrinsic permeance of $N_2$ is very low. This is supported by silica sorption data (given in table 1) that show that in the temperature regime of 50 to 150° C. and 100–250 kPa pressure $CO_2$ adsorbs ~10-100× the amount of $N_2$ under the same conditions. $\alpha_{H_2,CO_2}$ was found to be as high as 66 at 30° C. But with increasing temperature, $\alpha_{H_2,CO_2}$ was found to decrease, unlike the uncoated membrane. As shown in FIG. 8, there is no detectable pressure dependence for $\alpha_{CO_2,N_2}$. $\alpha_{H_2,CO_2}$ was found to decrease slightly with an increase in $p^f$, which was attributed to leaks through the O-ring seals. Since the membrane supports used in this study were not totally flat from processing, there may have been some leaks due to imperfect O-ring sealing. The improvement in separation performance after application of the PDMS layer is only partly due to the presence of PDMS since the $CO_2/N_2$ gas selectivity for pure PDMS is ~10 at room temperature. While synergistic effects of PDMS with the silica membranes cannot be excluded from the transport measurements, they are considered unlikely since the pore size of amorphous silica membranes (~0.5 nm) is much less than the cross-sectional size for the PDMS molecules. The lower limit for the PDMS cross-sectional size can be approximated by the hard sphere diameter for tetramethylsilane, which was previously estimated to be ~0.8 nm. As a result, PDMS is not able to penetrate the membrane micropores. Hence, the overall improvement in selectivity is primarily caused by a reduction in the defect flow.

TABLE 1

Single gas permeance for untreated and post-treated silica membranes at 130° C.

|  | $f_{i,m}^{ut}$ [mol/(m² s Pa)] | $f_{i,m}^{pt}$ [mol/(m² s Pa)] |
|---|---|---|
| $H_2$ | 8.5. × 10⁻⁸ | 6.6 × 10⁻⁹ |
| $CO_2$ | 1.3 × 10⁻⁸ | 1.8 × 10⁻¹⁰ |
| $N_2$ | 3.5 × 10⁻⁹ | 4.4 × 10⁻¹¹ |

The single gas permeation results of the coated and uncoated silica membranes at 130° C. are given in table 2. $f_{H_2}^{tot}$ and $f_{CO_2}^{tot}$ for the PDMS coated silica membrane were found to be 6.6×10⁻⁹ and 1.8×10⁻¹⁰ mol/(m² s Pa), respectively. This implied that $\alpha_{H_2,CO_2}^s$37, which is much greater than the ideal Knudsen value of 4.7 and similar to a $\alpha_{H_2,CO_2}$=32 obtained from $H_2/CO_2$ mixture separation at 130° C. $\alpha_{CO_2,N_2}^s$=4.1, however, was much less than $\alpha_{CO_2,N_2}$, indicating that there is preferential adsorption of $CO_2$ that caused hindrance of $N_2$ transport in the case of $CO_2/N_2$ mixture separation. The fact that this effect was not observed for $H_2/CO_2$ mixture separation is ascribed to a much higher mobility of $H_2$ with respect to $N_2$. $f_{H_2}^{tot}$ and $f_{CO_2}^{tot}$ for the uncoated silica membrane at 130° C. were measured to be 8.5×10⁻⁸ and 1.3×10⁻⁸ mol/(m² s Pa), respectively. The silica membrane $f_i^{tot}$ values are approximately 20× lower than those for the bare supports (1.5×10⁻⁶ and 3.3×10⁻⁷ mol/(m² s Pa) for $H_2$ and $CO_2$, respectively); therefore, the support resistance contributes only a small portion to the overall flow resistance. The significant permeance reduction after PDMS modification is believed to be due to the plugging of defects with PDMS in the silica membrane, reducing the flow contributions through defects to the overall permeance. While $f_{H_2}^{tot}$ decreased by ~10-fold $f_{CO_2}^{tot}$ decreased by almost 100-fold. The thin top layer of PDMS (150 nm), however, provided only a small permeance reduction, estimated to be <5% for $H_2$ and <1% for $CO_2$. This estimation is made assuming that there is no infiltration of PDMS into the supporting membrane layers through macro/meso defects, which could significantly increase the overall flow resistance.

TABLE 2

Gas sorption data for unsupported silica at 30° C. determined by high pressure thermal gravimetric analysis [25].

| Gas | Q (p₁ = 1.0 bar) [mol/kg] | Q (p₁ = 2.5 bar) [mol/kg] |
|---|---|---|
| $CO_2$ | 1.2 | 2.0 |
| $H_2$ | 0.048 | 0.12 |
| $N_2$ | <0.001 | <0.001 |

TABLE 3

Single gas permeance for untreated and post-treated silica membranes at 130° C.

|  | $f_{i,m}^{ut}$ (mol s⁻¹ m⁻² Pa⁻¹) | $f_{i,m}^{pt}$ (mol s⁻¹ m⁻² Pa⁻¹) |
|---|---|---|
| $H_2$ | 8.5. × 10⁻⁸ | 6.6 × 10⁻⁹ |
| $CO_2$ | 1.3 × 10⁻⁸ | 1.8 × 10⁻¹⁰ |
| $N_2$ | 3.5 × 10⁻⁹ | 4.4 × 10⁻¹¹ |

Figure 12:
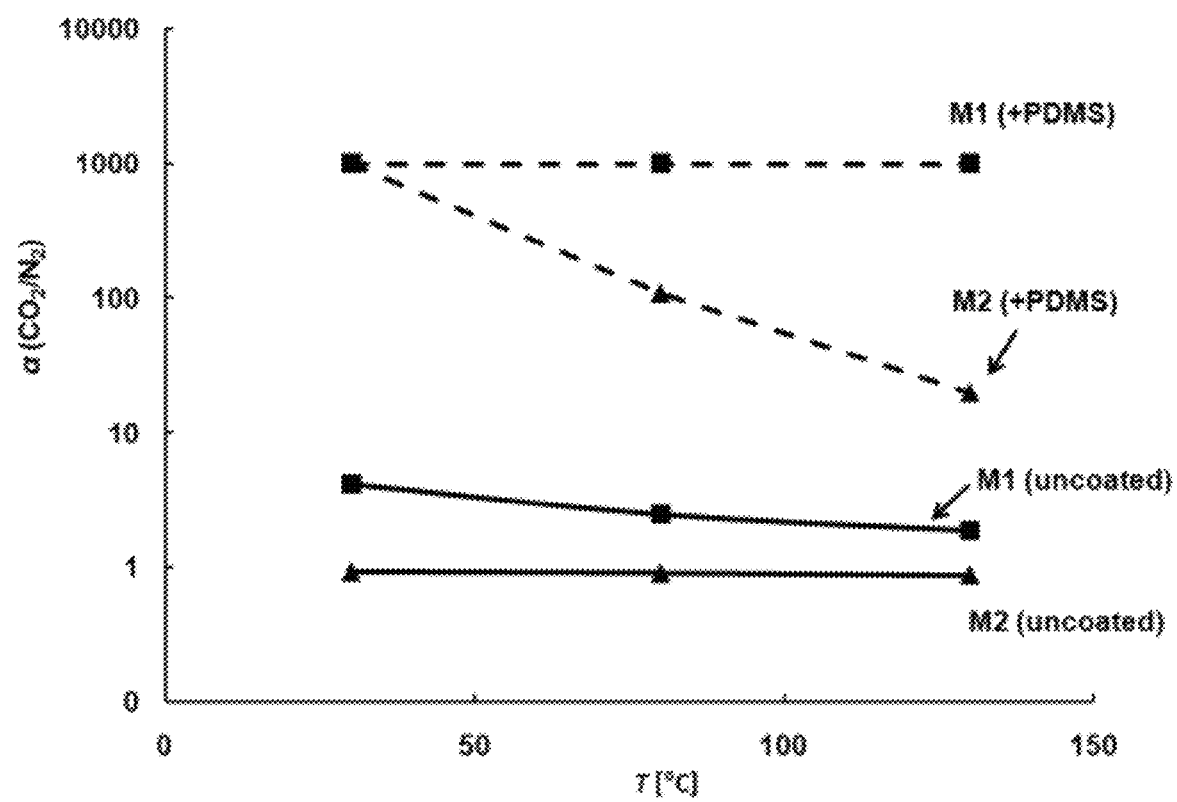
FIG. 12: Temperature dependence of $CO_2/N_2$ gas separation for uncoated and PDMS-coated zeolite Y membranes with $p^f=1.5$ bar.

The $CO_2/N_2$ separation data for two untreated and PDMS-treated defective zeolite membranes is summarized in FIG. 12. As was the case for the silica membrane results, $\alpha_{CO_2,N_2}$ improved significantly after coating with PDMS. The uncoated membrane separation was fairly low with $\alpha_{CO_2,N_2}$ up to ~4 at 30° C., indicating the presence of defects. Defect-free zeolite Y membranes (without PDMS) were previously found to have $\alpha_{CO_2,N_2}$>550. After modification, $N_2$ in the permeate stream was below the detection limit of the GC for membrane 1 at all measured pressures, which led us to express selectivity as $\alpha_{CO_2,N_2}$>1000. Membrane 2, which originally had a lower $\alpha_{CO_2,N_2}$ than that of membrane 1 without modification, exhibited similar performance at 30° C. after coating with PDMS. As was observed for the silica membranes, $f_{CO_2}{}^{tot}$ and $f_{N_2}{}^{tot}$ for the zeolite membranes decreased after PDMS application due to a reduction in defect flow. $f_{CO_2}{}^{tot}$ at 30° C. and $p^f$=1.5 bar for membrane 2 decreased from $6.3\times10^{-8}$ mol/(m² s Pa) to $6.2\times10^{-9}$ mol/(m² s Pa) after coating with PDMS. On the other hand, $f_{N_2}{}^{tot}$ decreased from $7.1\times10^{-8}$ mol/(m² s Pa) to $<5\times10^{-12}$ mol/(m² s Pa) after PDMS application. Thus $\alpha_{CO_2,N_2}$ was significantly improved due to the large decrease in $f_{N_2}{}^{tot}$ relative to that for $f_{CO_2}{}^{tot}$ with the PDMS coating.

Figure 13:
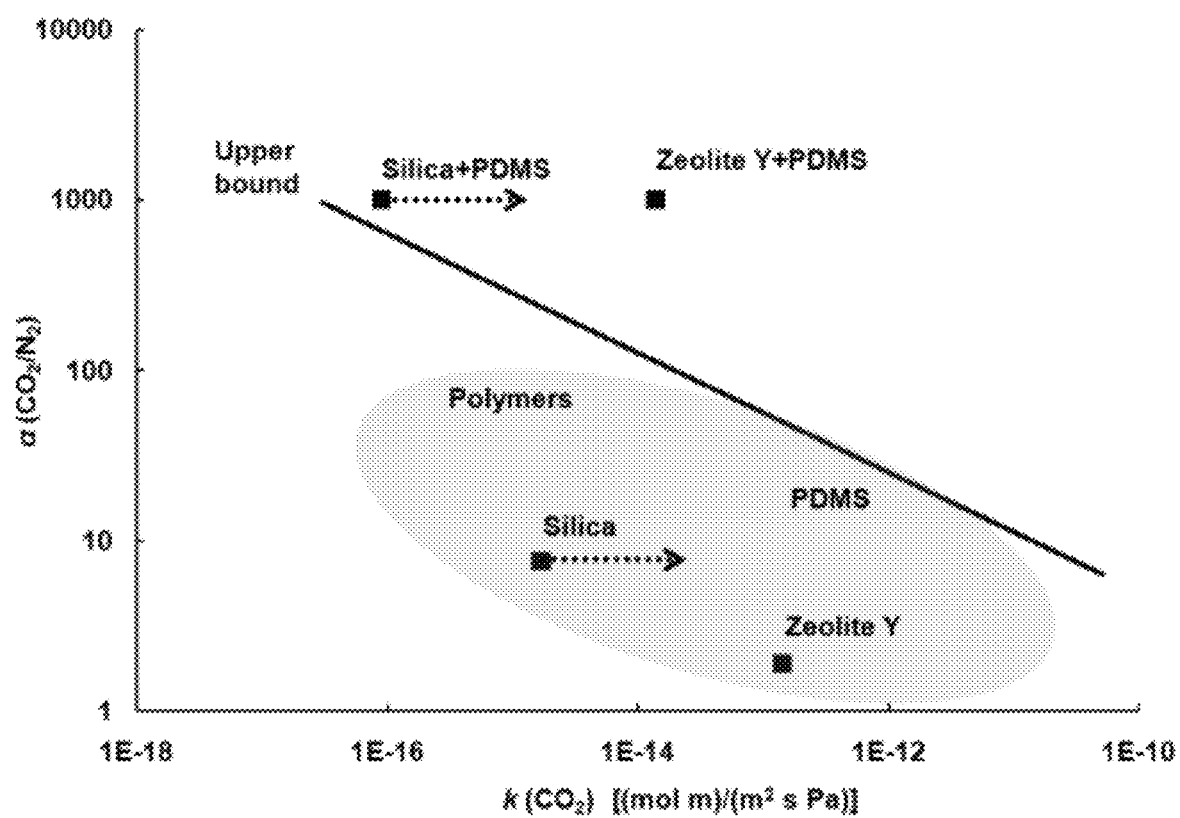
FIG. 13: $CO_2/N_2$ separation results for silica and zeolite membranes at 130° C. compared to the Robeson upper bound. Dashed lines indicate estimated silica values using a possible range of effective thicknesses due to intermediate layer infiltration.
Figure 14:
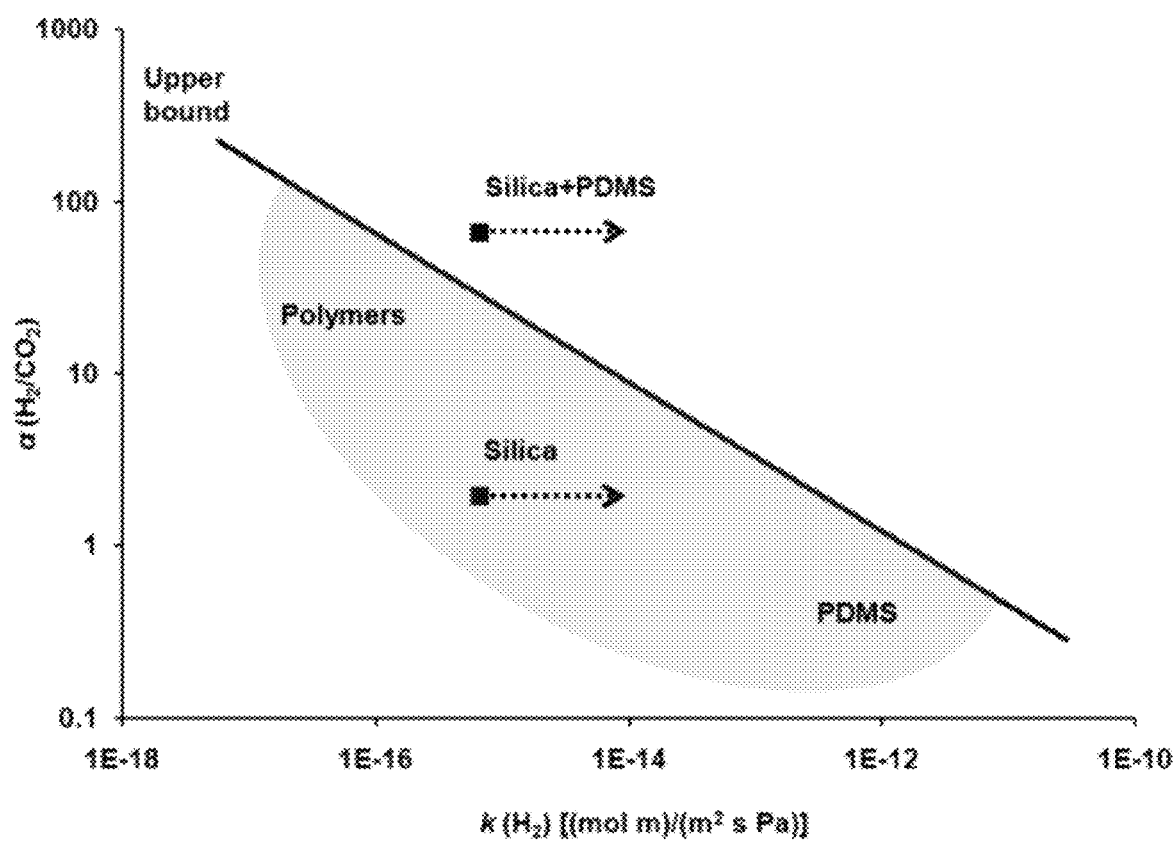
FIG. 14: $H_2/CO_2$ separation results for silica membranes at 30° C. compared to the Robeson upper bound. Dashed lines indicate estimated values using a possible range of effective thicknesses due to intermediate layer infiltration.

Comparison of the silica and zeolite $CO_2/N_2$ separation data to Robeson's upper bound is shown in FIG. 13. Both membranes were measured at 130° C., with $p^f$=2 bar and 1.5 bar for the silica and zeolite membranes, respectively. Pure PDMS membrane values obtained from the literature have been included as a reference. The data for the silica and zeolite membranes without PDMS modification were found to lie below the upper bound line due to significant defect flow. However the data for the membranes with PDMS modification data are well above the upper bound despite a drop in permeability. This is based on a worst-case calculation where it is assumed that the silica membrane thickness is 80 nm as was directly observed in the SEM-cross-section. The actual intrinsic permeability is expected to be much higher since the amorphous silica material has a strong tendency to penetrate in the intermediate support layer. This results in a significant increase of the effective thickness by $X_p \times \tau_p/\phi_p$, where $X_p$ is the penetration depth, and $\tau_p$ and $\phi_p$ are the intermediate layer tortuosity and porosity, respectively. For the γ-alumina intermediate layer, $\tau_p$ and $\phi_p$ are taken to be 4 and 0.37, respectively. It was previously found, for instance, that silica sol infiltrated the γ-alumina intermediate layers up to a depth of 109 nm with X-ray photoelectron spectroscopy, corresponding to an added effective thickness of ~1.2 µm. Hence we indicated in FIG. 13 a range of $CO_2$ permeability values for effective silica membrane thicknesses between 80 nm and 1.2 µm. Since infiltration effects do not occur for the zeolite membranes, the zeolite data shown are representative of these membranes and clearly demonstrate the potential for microporous membranes. Similar results were found for the $H_2/CO_2$ separation for uncoated and PDMS-coated silica membranes, as shown in FIG. 14; PDMS values from the literature have been added for comparison. Thus, PDMS modification can result in defective inorganic membranes that are competitive with state-of-the-art polymer membranes, or can even exceed their performance. Facilitated transport membranes have been found to have very high $CO_2/N_2$ selectivities (up to 496) as well as high $CO_2$ permeabilities (~2× $10^{-12}$ (mol m)/(m² s Pa)). However, contrary to the microporous inorganic membranes considered here, these membranes are not stable in the presence of $SO_2$ which is required for carbon capture applications.

Transport Calculations

The effect of a PDMS layer on the selectivity of defective silica membranes was estimated using a series/parallel resistance description which has been applied to composite polymer membranes. In this description the flow resistance, $R_l$, of each layer of the structure is taken analogous to an electrical resistor as $$R_l = \frac{1}{f_l}$$

Figure 2:
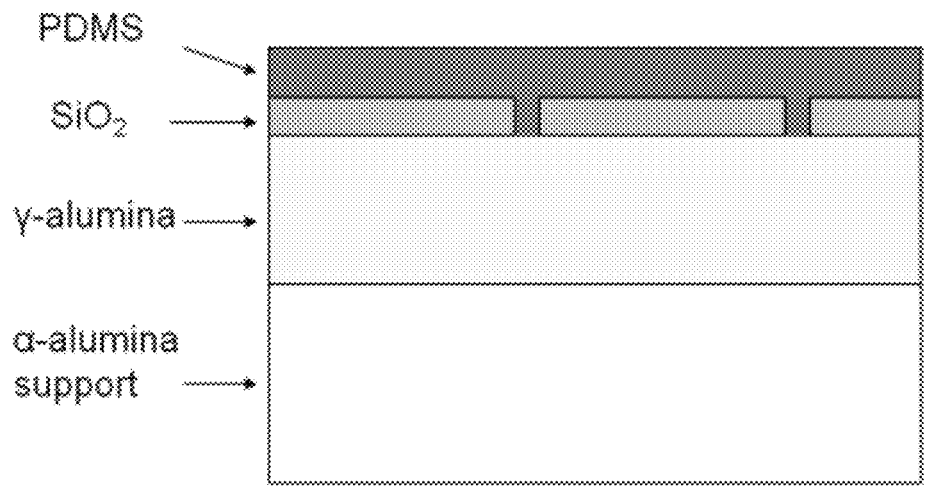
FIG. 2: Schematic of a PDMS coating on a multi-layer membrane.

When calculating selectivities, it is assumed that both gas species have little sorption affinity to the membrane so that the transport of different species is independent of each other. A 4-layer membrane structure is considered, as shown in FIG. 2.

In this structure, the defects in the membrane run through the membrane layer as straight cylindrical channels and are completely filled with PDMS. The total permeance through the multi-layer membrane structure, $f_l^{tot}$, is then found as $$\frac{1}{f_l^{tot}} = \frac{1}{f_{l,u}} + \frac{1}{f_{l,Int}} + \frac{1}{f_{l,m}^{pt}} + \frac{1}{F_{l,PDMS}} \qquad (1)$$

where $f_{l,u}$, $f_{l,Int}$, $f_{l,m}^{pt}$, and $f_{l,PDMS}$ are the permeance values for the support, intermediate, post-treated membrane, and PDMS layers, respectively. Considering flow perpendicular to the membrane surface, $f_{l,m}^{pt}$ is obtained from the permeance through the defect-free membrane area, $f_{l,m}^0$, and the permeance through the PDMS filled defects, $f_{l,m}^{def}$, occurring in parallel $$f_{l,m}^{pt} = (f_{l,m}^{def} - f_{l,m}^0)\phi^{def} + f_{l,m}^0 \qquad (2)$$

where $\phi^{def}$ is the effective defect area fraction. Use of (2) implies that spreading effects in the diffusion profiles near the defect in the other layers are ignored. This assumption was justified by the fact that actual defect sizes show a wide distribution that is generally unknown. Hence, effective defect size is assumed.

While large processing defects such as ~1 µm bubbles can be easily observed with SEM, smaller defects are very difficult to detect and quantify. This is due to the low probability of finding the defects at high magnification and interference from conductive coatings and charging effects. Permporometry is often proposed as a method for quantification of defect size and/or concentration. However little work has been published that demonstrates unambiguously the use of this approach. In a recent paper we ascribed this to an interference of support effects that applies to most supported membrane designs. The presence of defects is thus determined through gas transport data. Since the actual defect sizes are known to be <100 nm from microscopic observation, the mechanism of transport for membranes without PDMS is well described by Knudsen diffusion:

$$f_{l,m}^{Kn} = \frac{\emptyset_{def}}{3X} \sqrt{\frac{8}{\pi RTM_l^{mol}}} \qquad (3)$$

where $f_l^{Kn}$ is the Knudsen permeance, $\emptyset_{def}$ is the effective defect size, X is the membrane thickness, and $M_l^{mol}$ is the molar mass. For the purpose of demonstration by calculation, $\emptyset_{def}$ is taken as 20 nm and T=130° C. A typical defect size of 20 nm was assumed because defects of this size are difficult to detect by SEM; in addition, this size is near the maximum size for self-organizing effects (i.e., particle packing). But to demonstrate the broader applicability of the concept we proposed, we also performed calculations for sizes in the 2-40 nm range. Similar to the case of the PDMS coated membrane, the total permeance through the untreated membrane layer, $f_{l,m}^{ut}$, is obtained by combining $f_{l,m}^{0}$ and $f_{l,m}^{Kn}$ in parallel $$f_{l,m}^{ut} = (f_{l,m}^{Kn} - f_{l,m}^{0})\phi^{def} + f_{l,m}^{0} \quad (4)$$

The $H_2$ and $CO_2$ permeabilities for PDMS, $k_{l,PDMS}$, were determined by measuring the single gas permeance at 130° C. of a PDMS film supported on an $\alpha$-$Al_2O_3$ support and normalizing for the PDMS thickness. The latter was found to be ~2 μm from spectroscopic ellipsometry (W-VASE, J.A. Woollam Co. Inc.). The measured permeance values were corrected for the support flow resistance by application of Eq. 1. $\phi^{def}$ was calculated using Eqs. 2, 3, and 4. $f_{l,m}^{0}$ was obtained by substituting the calculated $\phi^{def}$ value back into Eq. 2. Silica membrane and PDMS layer thickness values of the multilayer membrane were obtained from SEM analysis of the membrane cross section.

Figure 15:
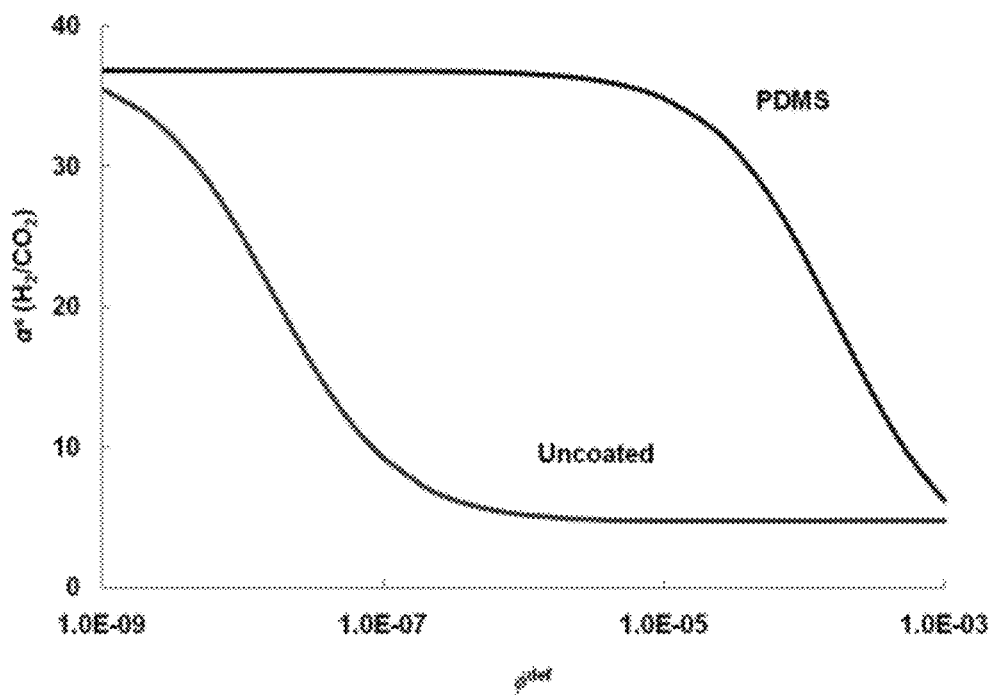
FIG. 15: Calculated $H_2/CO_2$ selectivity for PDMS-coated and uncoated silica membranes at 130° C. ($\varnothing_{def}=20$ nm).

Using an estimated effective defect size of 20 nm, the defect area fraction of the silica membranes was calculated to be $\phi^{def}$~$2\times10^{-6}$, and the defect-free $H_2$ and $CO_2$ permeance values for the silica membrane at 130° C. were estimated to be $f_{H_2,m}^{0}$~$6.7\times10^{-9}$ and $f_{CO_2,m}^{0}$~$1.8\times10^{-10}$ mol/(m² s Pa), which are nearly the same as the permeance values measured for the PDMS-coated silica membranes. This indicates that the PDMS modification of the silica membrane leads to defect-free, intrinsic behavior. Calculations were also performed with a range of defect sizes (40 to 2 nm), resulting in $\phi^{def}$ for the silica membranes ranging from ~$1\times10^{-6}$ to ~$1\times10^{-5}$. The $\alpha_{H_2,CO_2}^{s}$ and $f_{l}^{tot}$ values calculated with the resistance description are given in FIGS. 15 and 16. As shown in FIG. 15 for a defect size of ~20 nm, $\alpha_{H_2,CO_2}^{s}$ for the uncoated membrane decreases rapidly once $\phi^{def}$>$10^{-8}$ (~$3\times10^{7}$ defects/m²) to approach the Knudsen selectivity value. The plateau at higher $\phi^{def}$ is due to the support resistance which becomes dominant at large defect concentrations. On the other hand, the addition of PDMS maintains the intrinsic selectivity for $\phi^{def}$<$10^{-5}$ (~$3\times10^{10}$ defects/m²).

Figure 16:
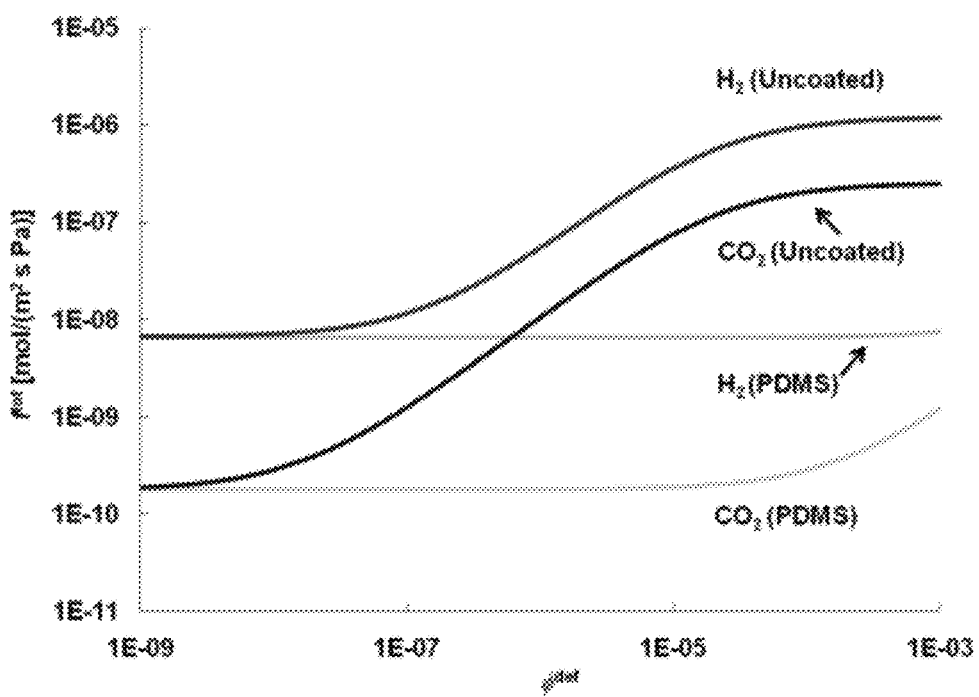
FIG. 16: Calculated $H_2$ and $CO_2$ permeances for PDMS-coated and uncoated silica membranes at 130° C. ($\varnothing_{def}=20$ nm).

The individual gas permeances for the composite membrane are given in FIG. 16. As shown in the figure, $f_{H_2}^{tot}$ for the PDMS coated membrane changes only slightly with increasing $\phi^{def}$. The addition of PDMS, however, significantly reduces $f_{H_2}^{tot}$ and $f_{CO_2}^{tot}$ at higher $\phi^{def}$ when compared to the uncoated membrane. This is due to a reduction of the Knudsen flow contribution through the defective areas of the membrane. For $\phi^{def}$~$1\times10^{-6}$, $f_{H_2}^{tot}$ decreases from $5\times10^{-8}$ mol/(m² s Pa) for the uncoated membrane to $7\times10^{-9}$ mol/(m² s Pa) for the PDMS-coated membrane. $f_{CO_2}^{tot}$, however, decreases to a greater extent from $1\times10^{-8}$ mol/(m² s Pa) for the uncoated membrane to $2\times10^{10}$ mol/(m² s Pa) for the coated membrane. This trend is in agreement with the measured single gas permeance values (see table 1). It is also observed that $f_{H_2}^{tot}$ and $f_{CO_2}^{tot}$ both approach the support permeance values for $\phi^{def}$>$10^{-4}$.

Membrane Synthesis

Preparation of $\alpha$-alumina membrane supports was carried out using a colloidal filtration method described previously. Disc-shaped membrane supports with a thickness of ~2 mm and a diameter of 42.5 mm were made by colloidal consolidation of a stabilized AKP30 $\alpha$-alumina (Sumitomo Chemical Corp.) dispersion, followed by drying and sintering at 950° C. This resulted in supports with a bulk porosity of ~35%, a bulk pore size of ~100 nm, a surface pore size of ~40 nm, and a very low surface roughness of ~30 nm.

The $\alpha$-alumina supports were modified with an intermediate layer of $\gamma$-alumina to obtainer a smoother deposition surface and smaller pore size to promote silica membrane formation. A Boehmite sol was first prepared by the hydrolysis of aluminum tri-sec butoxide (ATSB), peptization with $HNO_3$, and purification by centrifugation. The sol was then mixed with 3 wt % polyvinyl alcohol (PVA, $M_w^{mol}$~72 kg/mol, Sigma-Aldrich) in a 3:2 volume ratio and dip coated onto the $\alpha$-$Al_2O_3$ supports using a MEMDIP1 apparatus (Pervatech BV, Netherlands). After drying for 1 h at 110° C., the membranes were calcined by a rapid thermal processing (RTP) method in an effort to reduce heat treatment time and improve productivity. RTP was done with a RTP 600XP bench-top system (Modular Process Technology Corp.) using a 10° C./s heating rate and 3 min. residence time at 700° C. in a dried-air flow and 100 kPa chamber pressure.

Silica membranes were prepared by dip coating with a silica sol prepared by the hydrolysis and acid-catalyzed condensation of tetraethoxysilane (TEOS) with molar composition 1:3.8:0.085:6.4 $TEOS:EtOH:HNO_3:H_2O$. The membranes were calcined at 400° C. for 3 h with 0.5° C./min. heating and cooling rates. Zeolite Y membranes were synthesized on $\alpha$-alumina flat supports by a seeding and secondary growth method, discussed elsewhere.

A PDMS top coating was prepared with Sylgard® 184 (Dow Corning Corporation). A base resin was mixed with the accompanying cross-linking agent and diluted in heptane in a weight ratio 1:0.1:16 base:cross-linker:heptane. A weight ratio of 1:0.1:5 was used for coating the zeolite membranes. The PDMS solution was filtered with a 0.2 μm polypropylene syringe filter before spin coating with a WS-400B-6NPP-LITE spin coater (Laurell Technologies Corp). The PDMS coating was dried at room temperature for approximately 1 h and cured at 100° C. for 1 h.

Pd20Au Alloy Membrane Synthesis

Precursor colloids for $ZrO_2$ and Pd were prepared by sonochemical precipitation of simple aqueous salt solutions with a bicene surface stabilizer. This resulted in transparent sols with 2 wt % equivalent solid content and a typical particle size of 3 nm. The sols were mixed for a target $Pd/ZrO_2$ volume ratio of 30/70 and 1 wt % equivalent solid content. Initially the sol mixtures were deposited on optically smooth, defect-free supported $\gamma$-alumina membranes (GAM). More recently we deposited them on a polysulfone membrane (PSF) to establish the feasibility of making rugged membranes on flexible polymer supports. Mixed sol deposition on the GAM occurred by dip-coating to form a ~100 nm precursor composite layer by a film or slip cast mechanism. Mixed sol deposition on the PSF occurred by spin-coating to form a ~50 nm precursor layer by solvent evaporation. Dispersant removal or the layer on GAM occurred by conventional thermal processing (CTP) at 600° C. For PSF dispersant removal was done by rapid thermal processing (RTP) using a ramp rate of 100° C./sec, a top temperature of 400° C., 1 minute hold time and natural cooling within 5 minutes.

Activation/reduction of the Pd on GAM occurred by CTP in forming gas at 400° C. For the layer on PSF this was done by aqueous hydrazine/ammonia reduction at ambient conditions for 5 minutes. Pd layers of 0.2 . . . 2 μm were deposited by electroless deposition also using reduction by aqueous hydrazine/ammonia for 10 . . . 40 minutes. This was followed by electroless deposition of Au with a layer thickness such that a Pd20Au composition was achieved after annealing. For the GAM supported layers the alloy was formed and annealed by CTP in 1 atm $H_2$ at 450° C. For the polymer supported layers alloy formation is accomplished by RTP in forming gas using a ramp rate of 100° C./sec, a top temperature of 450° C., 3 minute hold time and natural cooling within 5 minutes. All membrane formation steps on polymer supports are fully compatible with a continuous coating and local heat-treatment process; a wide range of other alloys is possible. The Pd20Au membranes on GAM could be made reproducibly, and had the properties, presented before. For the membranes on PSF we established that they could be prepared easily with a defect-free metallic appearance and perfectly adhesive, even after significant flexing.

Membrane Scale-Up and Continuous Membrane Fabrication

It may be possible to scale up the membrane disclosed herein. Transport studies have thus far been carried on small membrane specimens. A casting and a coating machine may be set-up for the continuous fabrication of a polymer-supported membrane with a width of 14 to 21 inches. The casting machine may comprise an unwinding device, casting trough and knife (with an adjustable gap setting), coagulation bath (e.g., for nanoporous polypyrrolone), and take-up device. For example, it may be used for the continuous fabrication of a nanoporous polypyrrolone membrane support.

A coating machine may comprise an unwinding device, dip coating trough for $ZrO_2$/Pd porous nano-composite coupling layer precursor sol, Pd, or Au electroless plating solution, first drier, infra-red heater for the rapid thermal processing (RTP) effect, thin-film casting assembly for amorphous fluorinated copolymer layer, second drier, and take-up device.

These machines are versatile and capable of operating under conditions similar to those used in commercial membrane manufacturing. In setting up the membrane fabrication machine, one may install a chiller for providing chill water for quenching in the coagulation bath for fabrication of nanoporous polypyrrolone membrane support. One may also install an activated carbon system and ventilation ducting equipment for handling vapors from the organic solvents used in the polymer solutions (i.e., dimethylforamide (DMF) or N-methylpyrrolidone (NMP) for polypyrrolone prepolymer and Fluorinert (e.g., perfluorohexane ($C_6F_{14}$) or tetradecafluorohexane) for amorphous fluorinated copolymer cover layer). This machine may be used to study the continuous fabrication and scale-up of membrane with an optimal composition up to a 21 inches in width and 1500 feet length, for example.

Membrane Scale-Up

Based on the lab synthesis procedure, the scale up of the polymer-Pd alloy composite membrane may be achieved using the continuous membrane fabrication machine. With the dip coating trough of this machine, a layer of the solution of $ZrO_2$/Pd porous nano-composite coupling layer precursor sol is deposited on a nanoporous polypyrrolone support (about 50 nm pore size). It is dried first at about 120° C. for ~8 minutes in the first drier of the coating machine to remove the solvent, water, and then calcined through a rapid thermal processing (RTP) technique for the $ZrO_2$/Pd coupling layer on the polymer support using the infrared heater of the coating machine at about 400° C. for 1 min. On the $ZrO_2$/Pd porous nano-composite coupling layer is then first deposited with a layer of Pd via electroless plating using the dip coating trough of this machine. Drying in the first drier of the coating machine (at ~100° C./8 min) removes any residual solvent. A layer of Au is then deposited on the Pd layer via electroless plating using the dip coating trough of this machine. Removal of any residual solvent using the first drier of the coating machine (at ~100° C./8 min) is followed by the RTP technique to form the Pd/Au alloy on the $ZrO_2$/Pd coupling layer using the infrared heater of the coating machine at about 400° C. for 1 min. Finally, applying a top layer of amorphous fluorinated copolymer, e.g., AF 2400 (poly[4,5-difluoro-2,2-bis(trifluoromethyl)-1,3-dioxole-co-tetrafluoroethylene] with 87% dioxole) on the Pd/Au alloy membrane through solution casting using the thin-film casting assembly of the coating machine and drying in the second drier of the machine (at ~100° C./8 min) produces the target polymer-Pd alloy composite membrane.

Membrane Characterization

Analysis of the silica membrane cross section was done with scanning electron microscopy (Sirion, FEI Company). Binary gas separation testing was performed using a setup built in-house and shown in FIG. 1. This setup uses a two-line feed gas input and a He sweep on the permeate side with flow rates controlled by mass flow controllers (Brooks Instruments). Membranes were placed inside a stainless steel test cell and sealed with Viton O-rings. The feed and permeate pressures were controlled by monitoring the pressure with Baratron® transducers (MKS Pressure Measurement & Control Products), and adjusting the flow with Brooks pressure controllers. The feed and permeate streams were analyzed with a CP4900 gas chromatograph (Varian Inc). Flow and pressure programming, and data acquisition were done with a PC with LabVIEW™ instrumentation hardware and software (National Instruments Corporation). Separation measurements were conducted with 1:1 $CO_2/N_2$ and 1:1 $H_2/CO_2$ gas mixtures with 100 sccm total feed flow and a 100 sccm He sweep. Mechanical feed pressures, $p^f$, of 2-5 bar were used while maintaining the mechanical permeate pressure, $p^p$, at 1 bar. The separation factor, $\alpha_{l_1,l_2}$, for a binary gas mixture is defined as $$\alpha_{l_1,l_2} = \frac{c_{l_1}^p / c_{l_2}^p}{c_{l_1}^r / c_{l_2}^r},$$

where $c_l^p$ and $c_l^r$ are the molar concentrations of species $l_1$ and $l_2$ in the permeate and retentate, respectively.

Single gas permeation testing of the silica membranes was done using a non-stationary technique with a dead-end configuration. Membranes were placed inside a stainless steel test cell and evacuated with a scroll pump (Varian Inc.). The feed side of the test cell was then pressurized to ~2 bar with either $H_2$, $N_2$, or $CO_2$. Gas permeating through the membrane was allowed to fill a 1 L stainless steel reservoir. The permeate pressure was measured over time with a Baratron® absolute pressure transducer while maintaining a constant feed pressure. Pressure data was recorded with a PC using LabVIEW software. Assuming ideal gas behavior, the permeance, $f_l$, was determined by non-linear regression using $$\ln\left(\frac{p^f}{P^f - p^p}\right) = \left(\frac{RTA}{V_{res}}\right) f_l t \tag{0}$$

where A is the membrane test area, R is the gas constant, and T is the temperature, $V_{res}$ is the reservoir volume, and t is the elapsed time from the introduction of the feed gas. The perm-selectivity, $\alpha_{l_1,l_2}^s$, is calculated from the single gas permeance values as $$\alpha_{l_1,l_2}^s = \frac{f_{l_1}}{f_{l_2}}.$$

Residual test cell leaks were determined by inserting a aluminum blank into the cell, pressurizing the cell with $H_2$ to 4 bar feed pressure at room temperature, and monitoring the permeate pressure. No detectable $H_2$ flow was measured for ~7 days, which pertains to a $H_2$ leak rate of $<10^{-13}$ mol/($m^2$ s Pa).

Novel Polymer/Pd Alloy Composite Membranes Synthesized

We have demonstrated Pd20Au alloy membranes (with an atomic ratio of 80/20) on $\alpha$-$Al_2O_3$ supports with a $ZrO_2$/Pd coupling layer. These membranes had a Sievert permeance $f_{H_2,Pd}^{\vee} = 1.7 \times 10^{-3}$ mol/($m^2 s\sqrt{Pa}$) at 350° C., and an effective thickness of ~2 μm. The $H_2$ flux is $$j_{H_2} = f_{H_2,Pd}^{\vee}(\sqrt{p_{H_2}^f} - \sqrt{p_{H_2}^p}) \tag{5}$$

The membranes were fully stable for >100 hrs under $H_2$ permeation testing up to 350° C., a feed pressure of 150 kPa and vacuum at the permeate side. In addition, they were fully stable after 48 hrs treatment at 500° C. in an $N_2$ atmosphere with 500 ppm $H_2S$ by volume and a total pressure of 101 kPa.

The RFP specifies a feed pressure, $p_{H_2}^f$, of 690 kPa (100 psi) and a permeate pressure, $p_{H_2}^p$ of <200 kPa (30 psi). All this results in a calculated flux of 0.65 mol/($m^2 \cdot s$) or an apparent permeance of $1.3 \times 10^{-6}$ mol/($m^2 \cdot s \cdot Pa$) or 4000 GPU. $f_{H_2,Pd}^{\vee}$ increases with temperature and 1/thickness. Since we expect to be able to make PdA membranes of 200 nm thickness, Sievert permeances as high as $f_{H_2,Pd}^{\vee} = 2 \times 10^{-2}$ mol/($m^2 s \sqrt{Pa}$) may be possible, corresponding to apparent permeances as high as $1.6 \times 10^{-5}$ mol/($m^2 \cdot s \cdot Pa$) or 48,000 GPU at the RFP conditions.

Technical Approach

As described earlier, we have synthesized novel polymer/Pd—Au alloy composite $H_2$-permeable membranes. We have used the membrane data obtained as the input to the model developed for the purification of Test 2A coal syngas and the WGS membrane model for CO conversion and purification of Test 3 coal syngas to produce high purity $H_2$. From the modeling, we have shown the feasibility of achieving >95% recovery along with >90% $CO_2$ capture and >95% $CO_2$ concentration in the retentate acid gas stream for sequestration. In other words, the novel membrane has given not only effective $H_2$ purification and recovery but also effective $CO_2$ capture for sequestration. This project is very likely to achieve the desired results as our initial experiments have successfully demonstrated the key concepts of the proposed membrane and our initial modeling work has shown the feasibility of the membrane process for achieving >95% $H_2$ recovery along with $CO_2$ capture.

Membranes

Figure 18:
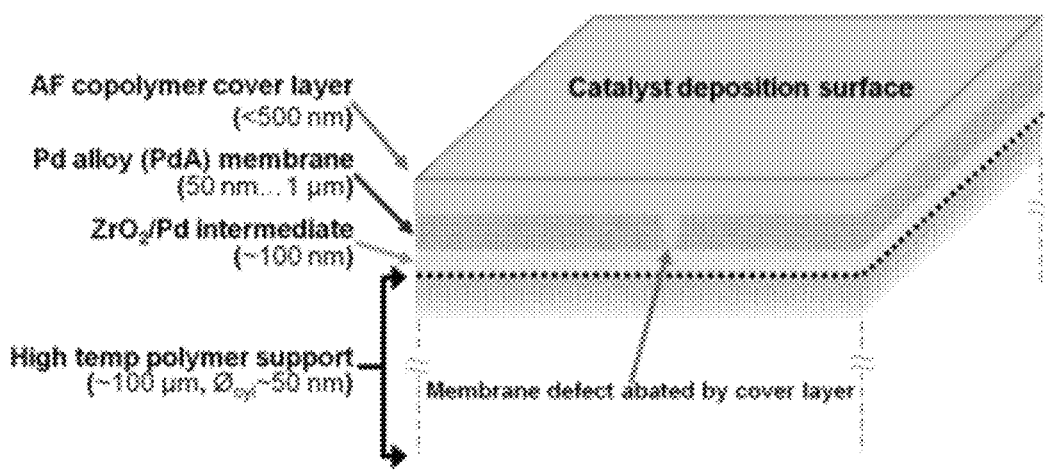
FIG. 18: Polymer/Pd alloy membrane structure with from top to bottom: amorphous fluorinated (AF) copolymer cover, Pd alloy membrane, meso-porous coupling layer, and nanoporous high temperature polymer support layer. Ø is the pore dimension; the other numbers are the thicknesses.
Figure 19:
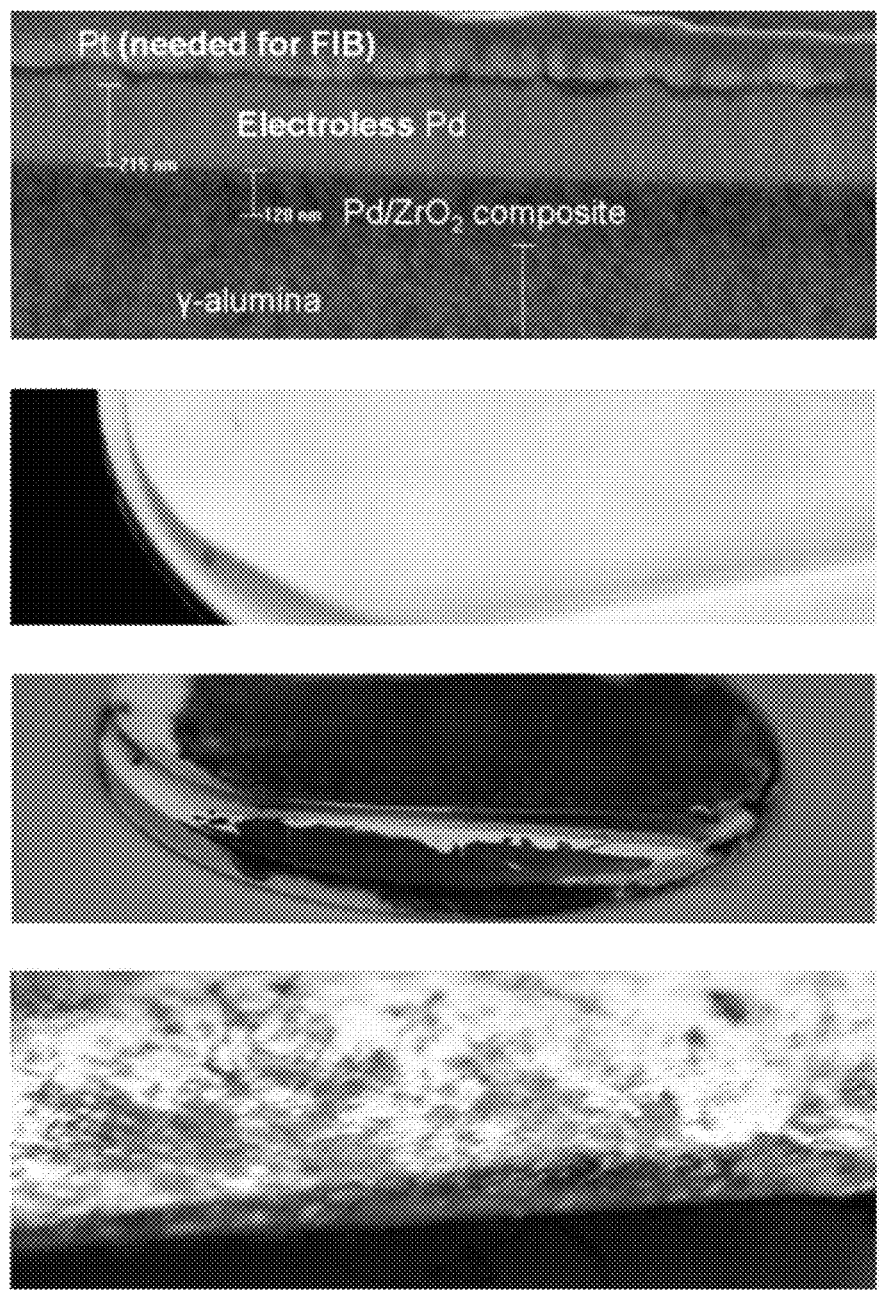
FIG. 19: From top to bottom: 1) Cross-section of a 200 nm thick Pd membrane on GAM; 2) PSF with coupling later on α-$Al_2O_3$ support; 3) completed Pd membrane on PSF, curled on purpose to test adhesion. The metallic appearance could not be captured at the camera angle used. 4) edge of a Pd on PSF membrane showing the metallic appearance.

It is possible to make membranes that meet all requirements, by using a cost-effective nanoporous polysulfone support (about 50 nm pore size), depositing a very thin, highly selective, yet permeable inorganic membrane, and applying a polydimethylsiloxane (PDMS) top layer, see FIG. 18. The PDMS layer is slightly $CO_2$ selective but its major functions are: mechanical protection and integrity, minimizing membrane pore blocking by water, and most importantly, abating adverse effects of membrane defects on selectivity. The multi-layer support provides strength, a smooth deposition surface, and a high non-selective permeance. The selective membrane layer comprises micro-porous $\gamma$-alumina with a slit-shaped pore morphology, made by introducing small alumina polymers in the meso-pores of state-of-the-art $\gamma$-alumina.

The membrane is the first that combines exceptionally high $CO_2$ permeance with high $CO_2/N_2$ selectivity and the full operational stability needed for energy-efficient $CO_2$ capture. We have already demonstrated a first-time ever combination of the selectivity and stability of inorganic micro-porous membranes and the cost/flexibility of polymer materials. With the materials disclosed herein, there are no adverse effects expected of any flue gas contaminants.

The membrane technology to result from this disclosure is innovative. There is no existence of such a technology at this time. No technical papers on such a technology can be found in the literature at this time either. The membrane is also innovative in view of the new membrane composition and exceptionally high performance.

The novel membrane can be fabricated continuously like commercial reverse osmosis and gas separation membranes. It can also be fabricated into modules with a high packing density similar to those for reverse osmosis and gas separation. Thus, the costs of the novel membrane and modules should be in line with those for reverse osmosis and gas separation and are significantly lower than those for fully inorganic membranes (e.g., silica and Pd).

Membrane Concept

Figure 21:
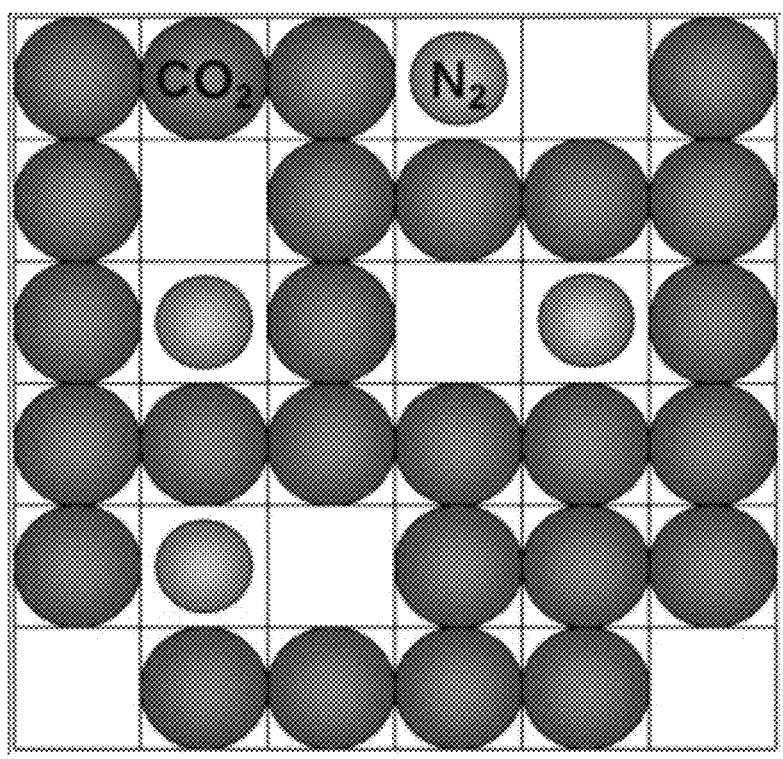
FIG. 21: Preferential sorption of $CO_2$ results in a percolative network that is virtually impermeable to other gases.

The membrane can meet the requirements for transport properties, stability, and costs because of a favorable combination of the following characteristics that we recently established, discovered, or observed:

The possibility to achieve high permeance and selectively for $CO_2$ in micro-pores when it shows preferential sorption selectivity with respect to all other gases. The mechanism is explained in FIG. 21 where it is identified as the type II mechanism. When the $CO_2$ occupies >60% of the available micro-pore sites, it forms a slowly changing percolative network that is virtually impermeable for other molecules. This effect is particularly pronounced in a 2-dimensional arrangement as occurs in a slit-shaped micro-pore geometry. It has been demonstrated for the present membranes, and recently defect-free zeolite Y membranes that showed ideal selectivity with respect to $N_2$ and even >35 with respect to $H_2$.

Figure 22:
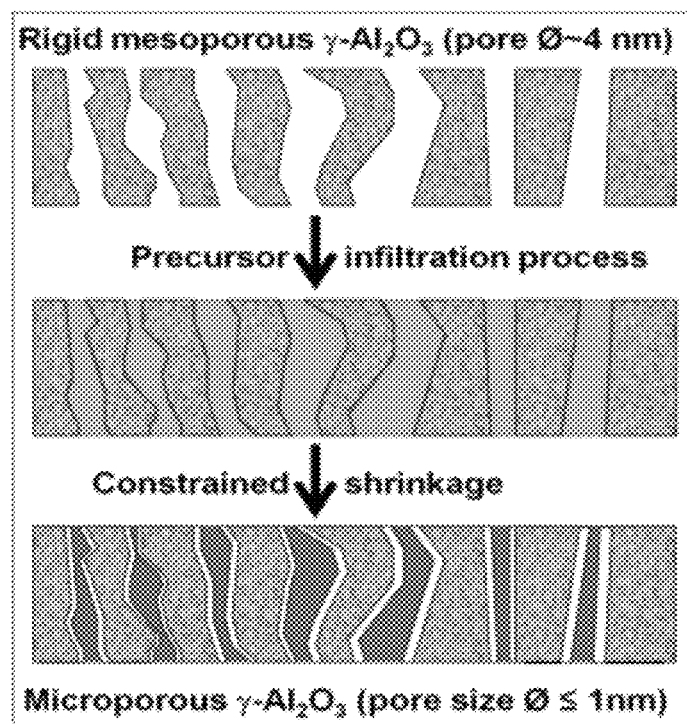
FIG. 22: Formation of microporous γ-alumina by shrinkage of oxidic precursor inside a meso-porous scaffold.

The possibility to achieve a combination of high-flux and high mobility by realizing thin membranes with a slit-like morphology as shown in FIG. 22; $\gamma$-alumina has a moderate affinity for $CO_2$. The proximity of the two slit walls ensures enhanced affinity and micro-porous "type II" behavior that is even more pronounced in a planar arrangement.

Figure 23:
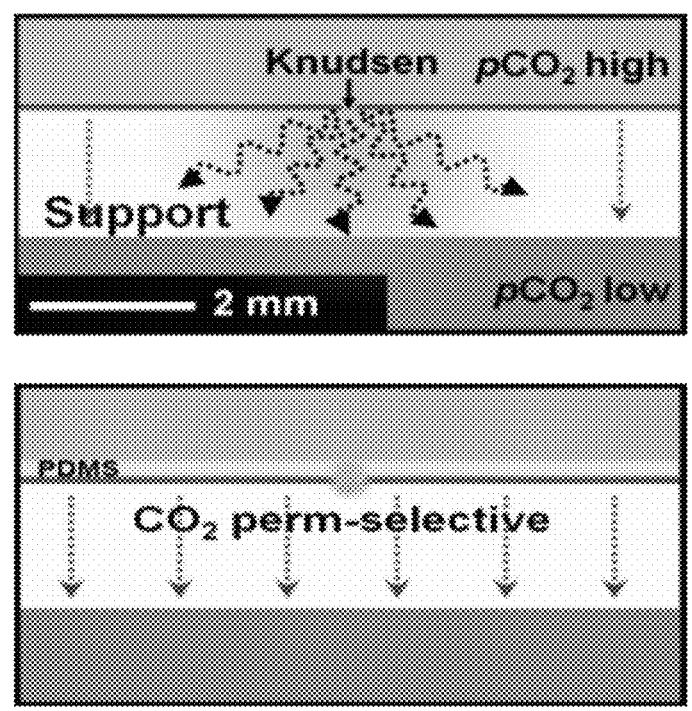
FIG. 23: Upper: a defect in the membrane causes a severe non-selective leak that saturates the support with feed mixture. This effectively removes the driving force and selectivity over a much larger area. Only a few such defects (>1/cm$^2$) result in an overall selectivity ~1. Lower: PDMS diminishes the gas leak so that support saturation no longer occurs; since it is very permeable compared to the normal membrane, intrinsic selectivity is virtually restored.

The favorable effect of PDMS on measured selectivity. Minimal amounts of defects in supported membranes completely remove selectivity because they cause a quick saturation of the support with feed which removes the driving force. The PDMS effectively blocks the defect permeation without affecting selective membrane permeation, see FIG. 23. It also has a stabilizing and protecting function for the micro-porous membrane, and blocks water in the feed stream.

The favorable effect of $CO_2$ on removing $H_2O$ molecules from micro-pores. $H_2O$ normally blocks micro-pores in hydrophilic membranes but $CO_2$ is able to activate and remove it, likely by a chemical bonding mechanism.

The possibility to make inorganic membranes <500 nm thin and nearly defect-free in very fast wet-chemical deposition and thermal processing. Meso-porous $\gamma$-alumina membranes are well-known and relatively easy to make starting from dip coating of purified Boehmite dispersions. More recently, it was discovered that the thermal consolidation of such membranes can be done with Rapid Thermal Processing (RTP), known from the semiconductor industry. This reduces the thermal treatment time from 10 hrs to 1 minute and results in a crack-free more homogeneous membrane structure with smaller pores of 2-3 nm $\emptyset_p$. Micro-porous modification with inorganic polymers occurs within the nano-pores with, equally fast, wet-chemical modification and thermal processing steps.

The possibility to make inorganic membranes on cost-effective polymer supports, also by rapid thermal processing.

Figure 24:
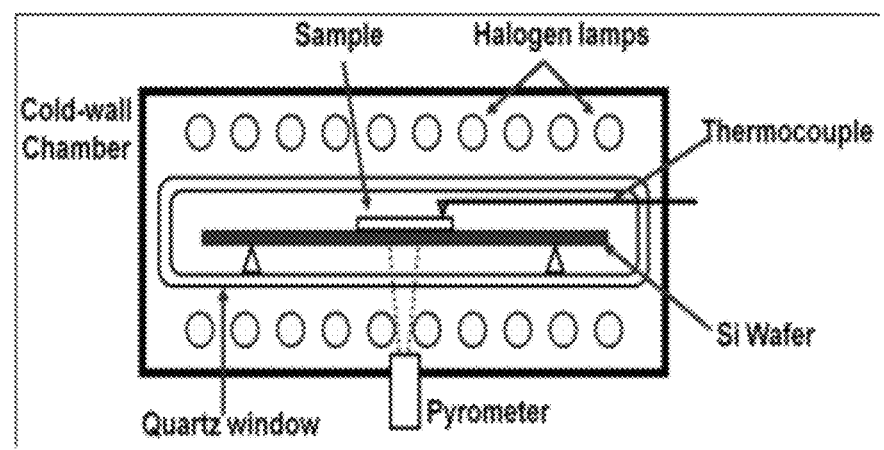
FIG. 24: Diagram of an RTP system with tungsten-halogen lamps as the heating source.

The polysulfone structure may degrades at temperatures >180° C. while the meso-porous alumina requires a formation temperature up to 400° C. However, it was found experimentally that high temperature formation of γ-alumina on polysulfone can be achieved with rapid thermal processing as shown in FIG. 24.

The instant disclosure demonstrates a first-time ever combination of the selectivity and stability of inorganic microporous membranes and the cost/flexibility of polymer materials with exceptionally high $CO_2$ permeance and $CO_2/N_2$ selectivity for $CO_2$ capture.

Carbon Capture Process with the Proposed Membrane

Figure 25:
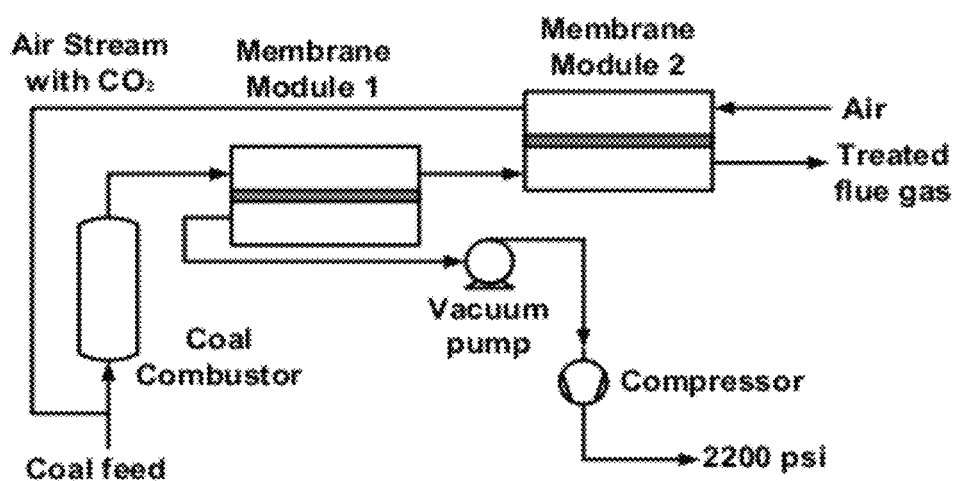
FIG. 25: Flow diagram of the carbon capture process with the proposed membrane.

The carbon capture process (FIG. 25) contains two membrane stages in which in the first stage $CO_2$ is removed from flue gas by evacuation; in the second stage remaining $CO_2$ is removed using an air sweep such that the 90% capture target is met. The entrance sweep flow is the same as used in the current plant; the $CO_2$-enriched stream is used for combustion. The 95% pure $CO_2$, captured in the first stage is then compressed to 2200 psi (150 atm). Both membrane stages use the same novel inorganic/polymer composite membrane, fully stable, with exceptionally high $CO_2$ permeance and selectivity. The process produces a flue gas with 18-25% $CO_2$. This is substantially higher than 13.2% in the current process, and needed for sufficient driving force in the membrane separation. Operation with the feed stream at atmospheric pressure avoids additional compression costs, and allows for cheap membrane housing. The process is simple and effective, using 2 membrane units, 1 vacuum pump, and 1 compressor system.

Meso Porous γ-Alumina

Boehmite sol will be prepared by hydrolysis of aluminum tri-sec-butoxide (ATSB), followed by nitric acid peptization, and purification by centrifugation. The membrane thickness will be controlled to <1 μm by mixing the obtained aqueous dispersions with aqueous 3 wt % PVP (polyvinylpyrrolidone, K-15) in a 3 to 2 volume ratio. This mixture is dip-coated on the polysulfone, followed by rapid infrared drying at ~100° C. followed by membrane formation by RTP. In the RTP treatment, the supported membrane is typically heated to a set temperature of up to 400° C. with a 10° C./second ramp rate and a 1 minute hold before natural cooling. The high thermal capacity of the support facilitates the rapid heating and cooling cycle. The RTP treatment parameters are chosen to create a structure that is similar to what is normally obtained in conventional thermal processing (CTP). During the ramping and isothermal hold, $N_2$ and $O_2$ are supplied to the RTP unit at atmospheric pressure and flow rates of 8000 and 2000 SCCM (standard cubic centimeter per minute), respectively.

Figure 20:
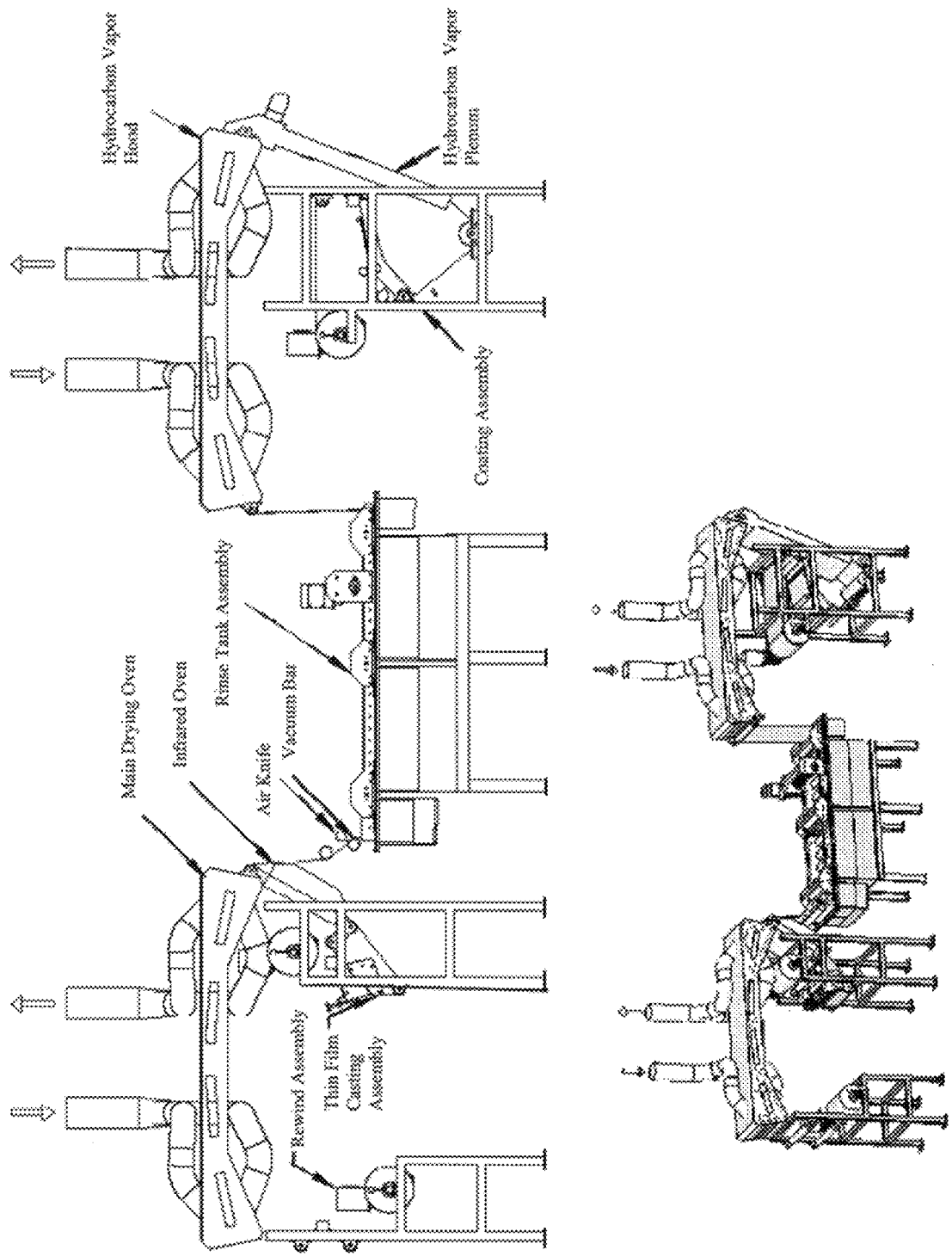
FIG. 20: Schematic of a continuous coating machine.

FIG. 20 shows the equipment set-up of an MPT RTP-600XP (Modular Process Technology Corp.) that is used for lab-scale samples. Such samples are placed in the center of a 6 inch diameter silicon wafer and inside a quartz chamber. Arrays of tungsten-halogen lamps outside both the top and bottom of the chamber act as the heating source to achieve double sided heating with ramping rates ranging from 0 to 150° C./s and with a temperature range between 250 and 1300° C. A thermocouple placed in direct contact with the sample is used to monitor the sample surface temperature with ±2° C. accuracy. The RTP also monitors temperature by an optical pyrometer. Dip-coating, drying and RTP are all performed at class 100 clean room conditions to minimize the risk of airborne particulate contamination. For the continuous set-up, we will use long tubular halogen lamps and adjust the heating rate and top temperature by relative velocity with respect to the membrane and perpendicular distance from the membrane, respectively.

Variations to increase the permeance from baseline 3,000 GPU to prototype 6,000 GPU include: (1) reducing thickness from 500 nm to 200 nm and (2) realizing a more perpendicular orientation of the slit pore plane. Reducing thickness has the additional advantage of increasing flexibility of the polysulfone-inorganic-PDMS sandwich. The pore-orientation of normal meso-porous γ-alumina is ~30° with respect to the deposition surface. We hope to achieve a more favorable orientation in the optimization of continuous fabrication, and possibly by self-organizing additives.

Micro-Porous Modification

In the alkoxide technique, the alumina precursor is prepared in two steps: (1) Poly-condensation of aluminum tri-sec-butoxide (ATSB) in 2-propanol (i-PrOH) with 2,4-pentanedione (acetylacetone, acacH) which also acts as chelating agent, and (2) hydrolysis by adding aqueous nitric acid ($HNO_3$).

The chemicals are ATSB: Aldrich, 97%, i-PrOH: Merck, 99.7%, acacH: Fluka, >98%, and $HNO_3$: Merck, 65%. For lab-scale experiments, the precursor solution of Step 1 is prepared by dissolving 10 mmoles of ATSB and 3.5 mmol of acacH into 200 mmol of i-PrOH under magnetic stirring. After mixing for 60 min, the hydrolysis is carried out by adding 0.2 mL of 0.5N $HNO_3$ drop-wise. The resulting yellowish solutions, is then covered and stirred vigorously. It is deposited onto supported meso-porous γ-alumina by spin coating before gelation occurs. The thus modified membrane is maintained under atmospheric conditions for another 12 hrs to achieve full hydrolysis, followed by calcination in stationary air inside alumina crucibles in a muffle furnace. The heating schedule used in the first experiments was 400° C. for 3 hrs with heating and cooling rates of 0.5° C./min. For the proposed work, we will apply RTP techniques. For larger scale and continuous fabrication, spin coating will be replaced by dip coating. These changes are expected to further improve the membrane quality.

Variations to increase the permeance from baseline 3,000 GPU to prototype 12,000 GPU include changing micro-pore surface affinity by using other oxide compositions and decreasing modification thickness. For instance, titania is known to show a similar moderate affinity for $CO_2$ as γ-alumina. In addition, the possibility to carry out modifications as shown in FIG. 22 with titania has been demonstrated before. The thickness may be controlled with precursor formulation.

Application of PDMS

The PDMS top coating will be prepared from a base resin such as Sylgard® 184 (Dow Corning Corporation) mixed with the accompanying crosslinking agent and diluted in Isopar G. The latter has a carbon number of ~9 for a flash temperature that allows safe continuous operation. We currently apply a weight ratio of 1:0.1:16 base:cross-linker:solvent. The PDMS solution is filtered with a 0.2 μm mesh screen. For lab-scale samples, we use spin coating at 3,000 rpm. For larger samples and continuous production, we will use film or dip coating and control thickness by dilution and tangential deposition rate. PDMS coating is dried and cured quickly by infrared heating under $N_2$. 200 nm thick continuous PDMS can now be routinely made. At that thickness, PDMS is no longer resistive w.r.t. the membranes while it retains the defect abatement effect.

The PDMS deposition protocol is stable on lab scale, and most development efforts will go in developing a continuous coating process. Thickness will be adjusted by viscosity through base resin concentration. There may be minor effects of the solvent and crosslinker on transport properties.

Membrane Characterization

Transport

We may measure the $CO_2$ permeance and $CO_2/N_2$ selectivity for the prototype membrane for comparison with those obtained from the laboratory size membrane using the flue gas comprising 13.2% $CO_2$, 17.3% $H_2O$, 67.2% $N_2$, 2.3% $O_2$ as well as 300 ppm $SO_2$. This is to show that the scale-up membrane may have the same performance as the laboratory size membrane, i.e., a very high $CO_2$ permeance of at least 6,000 GPU and a very high $CO_2/N_2$ selectivity of about 400 (optimal) at 58° C. and 1 atm feed pressure.

Ellipsometry Characterization of Thickness and Composition

The membranes may be characterized by spectroscopic ellipsometry to obtain, non-destructively, an accurate thickness, and a semi-quantitative porosity estimate, $\phi_p$. We will use a WVASE 32 instrument from J.A. Woollam Co. Inc., Lincoln, Nebr. It measures the change of polarization that results when electromagnetic radiation reflects from a substrate or the thin film layer(s) on top. This technique is particularly suitable for the thin multi-layer structures that we prepare. Measurements are obtained for wavelengths of 300-1800 nm with 5 nm intervals, and reflection angles of 65, 70 and 75°. Membrane data are then obtained by non-linear parameter fitting [WVASE 32], using separate support data, and representing the membrane as a Cauchy layer with an intermix layer between the support and the membrane. Surface roughness is included for the interpretation of the support and supported membrane measurements. A grading porosity can be obtained as a function of perpendicular position in the membrane through interpretation of the refractive index.

Permeation Porometry of Connected Membrane Meso porosity

Permeation porometry (PP) may be used to obtain the characteristic pore size of meso-porous layers. In this method, the membrane is first saturated for 48 hours by allowing cyclohexane (CH) or water to condense in the pores of the membrane and support. After saturation, the relative vapor pressure is reduced gradually with a step size of 0.01 by mixing the saturated gas flow with pure $N_2$ (on the permeate side) and 99.993% $O_2$ (on the feed side). Pores open in the order of decreasing radii until the water or CH partial pressure approaches 0. At each step in the $O_2$ permeance, $f_{O_2}$, is determined by monitoring the $O_2$ concentration in the permeate by gas chromatography (GC) (CP4900 MicroGC, 10 m Molsieve 5 Å column, He carrier, Varian Inc.). Assuming cylindrical pores, the pore size where capillary condensation of cyclohexane occurs can be calculated using the Kelvin equation:

$$\ln(p_{H_2O|CH}^{rel}) = -\frac{n\gamma_{lg}V^{mol}\cos(\theta)}{r_K RT} \quad (5)$$

where n is a geometric factor, $\gamma_{lg}$ is the liquid-vapor surface tension, $V^{mol}$ is the molar volume of the condensable gas, $\theta$ is the condensate-solid contact angle (assumed to be zero), $r_K$ is the Kelvin radius, R is the gas constant, and T is the temperature. We will conduct the experiment in desorption mode for which n=2. Inflections in $f_{O_2}$ vs. $p_{H_2O|CH}^{rel}$ are used to obtain the characteristic pore diameter, $\varnothing_p$, of the membrane and support layers. In addition, $f_{O_2}$ can be used to estimate the membrane porosity, $\phi_{p,m}$, and tortuosity, $\tau_m$.

Membrane Material High-Pressure, High-Temperature Sorption Characterization

State-of-the-art BET equipment (ASAP 2020, Micromeritics) and a Cahn Thermax 500 high pressure thermogravimetric analysis (TGA) setup will be used in the sorption characterization of bulk membrane material. In the latter method, samples are held at isothermal conditions while the pressure is increased and decreased stepwise from 0.1 to 5 MPa. After each step, the pressure is held constant for several hours until the signal becomes stable and a datum point is obtained by averaging the weight measurements, one per second, over 30 minutes. Substantial buoyancy corrections are obtained by measuring the samples in an "inert" Ar atmosphere at otherwise similar conditions. Micro-pore saturation versus $CO_2$ chemical potential will be described in terms of a mean-field Langmuir expression. This provides essential input to the membrane transport modeling.

Initial Results

Synthesis of Membranes

Figure 26:
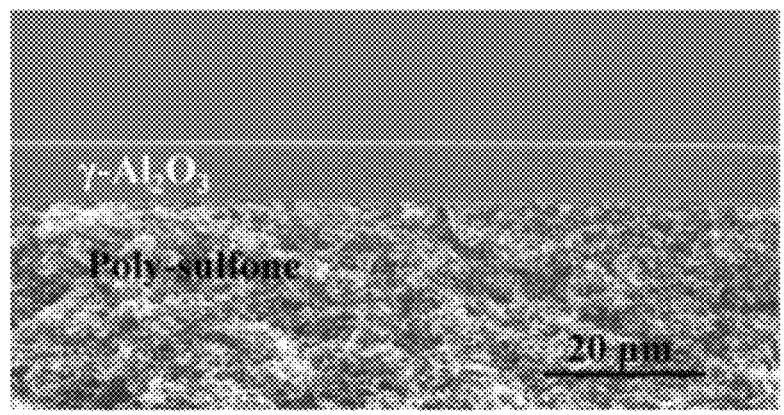
FIG. 26: SEM cross-section of a 10 μm γ-alumina membrane on polysulfone support.

The defect-free membranes are ideally selective for $CO_2$ with respect to all other light gases; (it even has a selectivity of 50 for $H_2$). This effect is ascribed to selective sorption of $CO_2$ in the nano-slit pores which causes >60% saturation so that the permeation of other gases is effectively blocked. In addition, the alumina surface and the nano-slit morphology offer a very favorable combination of the right $CO_2$ affinity and high in-plane mobility. Application of the PDMS top-layer increases the selectivity from <10 to, detection-limited, >550. This effect is ascribed to blocking of non-selective highly permeable defects that remove membrane driving force over a much larger area. Membranes as shown in FIG. 1 on defect-free ceramic supports have been tested in several gas compositions and temperatures up to 130° C. No adverse effects were found for up to 10% $H_2O$, Ar, and up to 0.1% $SO_2$. We have demonstrated the feasibility of using a rapid thermal processing (RTP) technique for inorganic membranes on polymer supports, see FIG. 26. It was found that no performance degradation occurred with respect to reference membranes. The structural integrity of <500 nm thick membranes remained fully preserved during mild flexing of the support. The use of RTP techniques also led to better membrane properties with 3,000 GPU $CO_2$ permeance and, especially reduction of the fabrication time, and hence cost.

REFERENCES

1. W. S. W. Ho and K. K. Sirkar, Eds., *Membrane Handbook*, Chapman & Hall, New York (1992); Kluwer Academic Publishers, Boston, reprint edition (2001).
2. D. Shekhawat, D. R. Luebke, and Henry W. Pennline, "A Review of Carbon Dioxide Selective Membranes: A Topical Report," NETL Report, DOE/NETL-2003/1200, Dec. 1, 2003.
3. L. M. Robeson, "The Upper Bound Revisited,", *J. Membr. Sci.*, 320 390-400 (2008).
4. T. C. Merkel, H. Lin, X. Wei, and R. Baker, "Power Plant Post-Combustion Carbon Dioxide Capture: An Opportunity for Membranes," *J. Membr. Sci.*, 359 126-139 (2010).
5. S. Shelley, "Capturing $CO_2$: Membrane Systems Move Forward," *Chem. Eng. Prog.*, 105 42-47 (2009).
6. G. T. Rochelle, "Amine Scrubbing for $CO_2$ Capture," *Science*, 325 1652-54 (2009).
7. A. Kohl and F. Riesenfeld, *Gas Purification*, 3rd edition, Gulf Publishing Company, Houston, Tex. (1979).
8. H. Verweij, Y. S. Lin, and J. H. Dong, "Micro-porous silica and zeolite membranes for hydrogen purification," *MRS Bulletin*, 31 [10] 756-64 (2006).

9. J. C. White, P. K. Dutta, K. Shqau, and H. Verweij, "Synthesis of Ultrathin Zeolite Y Membranes and their Application for Separation of Carbon Dioxide and Nitrogen Gases", *Langmuir,* 26 [12], 10287-10293 (2010).
10. M. L. Mottern, K. Shqau, and H. Verweij, "Permeation Porometry: Effect of Probe Diffusion in the Condensate," *J. Membr. Sci.,* 313 [1] 2-8 (2008).
11. L. Zhang, I. S. Park, K. Shqau, W. S. W. Ho, and H. Verweij, "Supported Inorganic Membranes: Promises and Challenges," *JOM-J. Met.,* 61 [4] 61-71 (2009).
12. T. Kuzniatsova, M. L. Mottern, K. Shqau, D. Yu, and H. Verweij, "Micro-structural Optimization of Supported γ-Alumina Membranes," *J. Membrane Sci.,* 316 [1] 80-88 (2008).
13. N. E. Benes, G. Spijksma, H. Verweij, H. Wormeester, and B. Poelsema, "$CO_2$ Sorption of a Thin Silica Layer Determined by Spectroscopic Ellipsometry," *AIChE J.,* 47 [5] 1212-18 (2001).
14. M. L. Mottern, F. Tyholdt, A. Ulyashin, A. T. J. van Helvoort, H. Verweij, and R. Bredesen, "Textured ITO Thin Films by Chemical Solution Deposition and Rapid Thermal Processing," *Thin Solid Films,* 515 [7-8] 3918-26 (2007).
15. S. J. Doong and W. S. W. Ho, "Sorption of Organic Vapors in Polyethylene," *Ind. Eng. Chem. Res.,* 30 1351-61 (1991).
16. S. J. Doong and W. S. W. Ho, "Diffusion of Hydrocarbons in Polyethylene," *Ind. Eng. Chem. Res.,* 31 1050 (1992).
17. S. J. Doong, W. S. W. Ho, and R. P. Mastondrea, "Prediction of Flux and Selectivity in Pervaporation through a Membrane," *J. Membr. Sci.,* 107 129 (1995).
18. Y.-F. Li, H.-X. Yang, L.-C. Zhou, S.-Y. Yang, J.-G. Liu, A.-J. Hu, and L. Fan, "Synthesis and Properties of PMR Matrix Resins of Poly(pyrrolone-benzimidazole)s," *High Perform. Polym.,* 16 55-68 (2004).
19. J.-G. Liu, L.-F. Wang, H.-X. Yang, H.-S. Li, Y.-F. Li, L. Fan, and S.-Y. Yang, "Synthesis and Characterization of New Polybenzimidazopyrrolones Derived from Pyridine-Bridged Aromatic Tetraamines and Dianhydrides," *J. Polym. Sci. Part A: Polym. Chem.,* 42 1845-1856 (2004).
20. A. J. Burggraaf, L. Cot, *Fundamentals of Inorganic Membrane Science and Technology,* Elsevier, New York, 1996.
21. D. Lee, C. Yu, K. Lee, Synthesis of Pd particle-deposited microporous silica membranes via a vacuum-impregnation method and their gas permeation behavior, *J. Coll. Interface Sci.* 325 (2008) 447-452.
22. B. A. McCool, W. J. DeSisto, Synthesis and characterization of silica membranes prepared by pyridine-catalyzed atomic layer deposition, *Ind. Eng. Chem. Res.* 43 (2004) 2478-2484.
23. D. Cassidy, S. Higgins, B. A. McCool, W. J. DeSisto, Atomic layer deposition as a tool to modify mesoporous silica membranes, *ECS Trans.* 16 [4] (2008) 151-157.
24. B. Zhang, C. Wang, L. Lang, R. Cui, X. Liu, Selective defect-patching of zeolite membranes using chemical liquid deposition at organic/aqueous interfaces, *Adv. Funct. Mater.* 18 (2008) 3434-3443.
25. M. Nomura, T. Yamaguchi, S. Nakao, Silicalite membranes modified by counterdiffusion CVD technique, *Ind. Eng. Chem. Res.* 36 (1997) 4217-4233.
26. J. Choi, H. Jeong, M. A. Snyder, J. A. Stoeger, R. I. Masel, M. Tsapatsis, Grain boundary defect elimination in a zeolite membrane by rapid thermal processing, *Science,* 325 (2009) 590-593.
27. Y. Zhang, A. M. Avila, B. Tokay, H. H. Funke, J. L. Falconer, R. D. Noble, Blocking defects in SAPO-34 membranes with cyclodextrin, *J. Membr. Sci.* 358 (2010) 7-12.
28. J. M. S. Henis, M. K. Tripodi, A novel approach to gas separations using composite hollow fiber membranes, *Sep. Sci. Technol.* 15 [4] (1980) 1059-1068.
29. L. A. Utracki, *Polymer Blends Handbook,* volume 1, Kluwer Academic Publishers, Boston, 2002.
30. B. D. Bhide, S. A. Stern, Permeability of silicone polymers to hydrogen, *J. Appl. Polym. Sci.* 42 (1991) 2397-2403.
31. H. Matsuda, H. Yanagishita, H. Negishi, D. Kitamoto, T. Ikegami, K. Haraya, T. Nakane, Y. Idemoto, N. Koura, T. Sano, Improvement of ethanol selectivity of silicalite membrane in pervaporation by silicone rubber coating, *J. Membr. Sci.* 210 (2002) 433-437.
32. J. Petersen, M. Matsuda, K. Haraya, Capillary carbon molecular sieve membranes derived from Kapton for high temperature gas separation, *J. Membr. Sci.* 131 (1997) 85-94.
33. K. Shqau, M. L. Mottern, D. Yu, H. Verweij, Preparation of defect-free porous alumina membrane supports by colloidal filtration, Proceedings PCM 2005, Brugge, Belgium, Oct. 20-21, 2005.
34. A. Nijmeijer, H. Kruidhof, R. Bredesen, H. Verweij, Preparation and properties of hydrothermally stable γ-alumina membranes, *J. Am. Ceram. Soc.* 84 [1] (2001) 136-140.
35. M. L. Mottern, G. T. Quickel, J. Y. Shi, D. Yu, H. Verweij, Processing and properties of homogeneous supported γ-alumina membranes, in: Y. S. (Jerry) Lin (Ed.), Proc. 8th Int. Conf. Inorganic Membranes, Jul. 18-22, 2004, Cincinnati, Ohio, USA, Adams Press, Chicago, pp. 26-29.
36. M. C. Schillo, I. Park, W. V. Chiu, H. Verweij, Rapid thermal processing of inorganic membranes, *J. Membr. Sci.* 362 (2010) 127-133.
37. R. S. A. de Lange, J. H. A. Hekkink, K. Keizer, A. J. Burggraaf, Formation and characterization of supported microporous ceramic membranes prepared by sol-gel modification techniques, *J. Membr. Sci.* 99 (1995) 57-75.
38. X. Feng, P. Shao, R. Y. M. Huang, G. Jian, R. Xu, A study of silicone rubber/polysulfone composite membranes: correlating $H_2/N_2$ and $O_2/N_2$ permselectivities, *Sep. Purif. Technol.* 27 (2002) 211-223.
39. H. Verweij, Ceramic membranes: Morphology and transport, *J. Mater. Sci.* 38 [23] (2003) 4677-4695.
40. M. T. Snider, K. Shqau, H. Verweij, High-pressure gas sorption studies on silica membrane materials, to be published.
41. P. Jha, L. W. Mason, J. D. Way, Characterization of silicone rubber membrane materials at low temperature and low pressure conditions, *J. Membr. Sci.* 272 (2006) 125-136.
42. E. D. Westre, M. V. Arena, A. A. Deckert, J. L. Brand, S. M. George, Surface diffusion of tetramethylsilane and neopentane on Ru(001), *Surf. Sci.* 233 (1990) 293-307.
43. N. E. Benes, H. J. M. Bouwmeester, H. Verweij, Multicomponent lattice gas diffusion, *Chem. Eng. Sci.* 57 [14] (2002) 2673-2678.
44. M. W. J. Luiten, N. E. Benes, C. Huiskes, H. Kruidhof, A. Nijmeijer, Robust method for micro-porous silica membrane fabrication, *J. Membr. Sci.* 348 (2010) 1-5.
45. T. C. Merkel, V. I. Bondar, K. Nagai, B. D. Freeman, I. Pinnau, Gas sorption, diffusion, and permeation in poly(dimethylsiloxane), *J. Polym. Sci., Part B: Polym. Phys.* 38 (2000) 415-434.
46. J. Huang, J. Zou, W. S. W. Ho, Carbon dioxide capture using a $CO_2$-selective facilitated transport membrane, *Ind. Eng. Chem. Res.* 47 (2008) 1261-1267.

47. G. Xomeritakis, C. Y. Tsai, Y. B. Jiang, C. J. Brinker, Tubular ceramic-supported sol-gel silica-based membranes for flue gas carbon dioxide capture and sequestration, *J. Membr. Sci.* 341 (2009) 30-36.
48. V. Boffa, J. E. ten Elshof, R. Garcia, D. H. A. Blank, Microporous niobia-silica membranes: Influence of sol composition and structure on gas transport properties, *Microporous Mesoporous Mater.* 118 (2009) 202-209.
49. G. Hougham, P. E. Cassidy, K. Johns, T. Davidson (Eds.), Fluoropolymers 2: Properties, Kluwer Academic/Plenum Publishers, New York, 1999.

The invention claimed is:

1. A membrane comprising:
    a substrate;
    a support layer on the substrate, the support layer comprising a plurality of pores;
    a selective layer on the support layer, the selective layer having a plurality of substantially unconnected pores in fluid communication with the pores of the support layer; and
    a permeable layer on the selective layer,
    wherein the support layer comprises a first polymer and the permeable layer comprises a second polymer, and
    wherein the membrane has a $CO_2:N_2$ selectivity of at least 7.5 at 55° C. and 1.24 atm feed pressure.

2. The membrane of claim 1, wherein the substrate is fibrous.

3. The membrane of claim 1, wherein the substrate comprises a non-woven fabric.

4. The membrane of claim 3, wherein the non-woven fabric comprises a polyester.

5. The membrane of claim 1, wherein the first polymer comprises a polymer selected from the group consisting of cross-linked polymers and copolymers, phase separated polymers and copolymers, porous condensed polymers, polyamides, polyimides, polypyrrolones, polyesters, sulfone-based polymers, polymeric organosilicones, fluorinated polymers, and polyolefinic species.

6. The membrane of claim 5, wherein the first polymer comprises a sulfone-based polymer.

7. The membrane of claim 1, wherein the selective layer comprises an inorganic material.

8. The membrane of claim 7, wherein the inorganic material comprises an inorganic material selected from the group consisting of alumina, silica, titania, zirconia, metal oxides, transition-metal oxides, palladium, platinum, nickel, transition-metal catalysts, transition-metals adsorbed on nonreactive supports, zeolites, clays, metal alloys, composites of metal, composites of nonmetals, and mixtures thereof.

9. The membrane of claim 8, wherein the inorganic material comprises zeolite Y.

10. The membrane of claim 1, wherein the second polymer comprises a polymer operable to increase the selectivity of fluid separation by the membrane.

11. The membrane of claim 10, wherein the second polymer comprises a polymer selected from the group consisting of cross-linked polymers and copolymers, phase separated polymers and copolymers, porous condensed polymers, polyamides, polyimides, polypyrrolones, polyesters, sulfone-based polymers, polymeric organosilicones, fluorinated polymers, and polyolefinic species.

12. The membrane of claim 11, wherein the polymeric organosilicone comprises a polymeric organosilicone selected from the group consisting of polydimethylsiloxane, polydiethylsiloxane, polydi-iso-propylsiloxane, polydiphenylsiloxane, and either partially fluorinated or perfluorinated derivatives thereof.

13. The membrane of claim 1, wherein the membrane is selectively permeable for a fluid selected from the group consisting of hydrogen, helium, nitrogen, argon, carbon dioxide, carbon monoxide, oxygen, air, methane, hydrogen sulfide, sulfur dioxide, sulfur trioxide, nitrogen oxides, ammonia, fluorine, chlorine, bromine, hydrogen chloride, water, alcohols, gaseous hydrocarbons, non-gaseous hydrocarbons, gaseous olefins, non-gaseous olefins, and acetylene.

14. The membrane of claim 1, wherein the membrane is selectively permeable to a fluid selected from the group consisting of carbon dioxide, hydrogen sulfide, sulfur dioxide, sulfur trioxide, nitrogen oxide, hydrogen chloride, water, and combinations thereof.

15. The membrane of claim 1, wherein the membrane has a $CO_2:N_2$ selectivity of about 400 at 58° C. and 1 atm feed pressure.

16. The membrane of claim 1, wherein the membrane has a $CO_2$ permeance of from 35 to 6000 GPU.

17. The membrane of claim 1, wherein the membrane has a $CO_2:N_2$ selectivity of at least 20 at 55° C. and 1.24 atm feed pressure.

* * * * *